(12) United States Patent
Xie et al.

(10) Patent No.: US 11,132,780 B2
(45) Date of Patent: Sep. 28, 2021

(54) TARGET DETECTION METHOD, TRAINING METHOD, ELECTRONIC DEVICE, AND COMPUTER-READABLE MEDIUM

(71) Applicant: Huawei Technologies Co., Ltd., Shenzhen (CN)

(72) Inventors: Lingxi Xie, Beijing (CN); Kaiwen Duan, Beijing (CN); Qi Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 16/791,806

(22) Filed: Feb. 14, 2020

(65) Prior Publication Data

US 2021/0256680 A1 Aug. 19, 2021

(51) Int. Cl.
| | | |
|---|---|---|
| *G06K 9/00* | (2006.01) |
| *G06T 7/00* | (2017.01) |
| *G06T 7/70* | (2017.01) |
| *G06T 7/80* | (2017.01) |
| *G06K 9/46* | (2006.01) |
| *G01S 17/06* | (2006.01) |
| *G06N 3/08* | (2006.01) |
| *G06N 20/10* | (2019.01) |
| *G01S 17/89* | (2020.01) |

(52) U.S. Cl.
CPC ............ *G06T 7/0002* (2013.01); *G01S 17/06* (2013.01); *G01S 17/89* (2013.01); *G06K 9/4671* (2013.01); *G06N 3/084* (2013.01); *G06N 20/10* (2019.01); *G06T 7/70* (2017.01); *G06T 7/80* (2017.01); *G06T 2207/20081* (2013.01); *G06T 2207/20084* (2013.01)

(58) Field of Classification Search
CPC ........... G06T 7/0002; G06T 7/80; G06T 7/70; G06T 2207/20081; G06T 2207/20084; G06N 20/10; G06N 3/084; G06K 9/4671; G01S 17/06; G01S 17/89
USPC ....... 382/103, 159, 144, 149, 126, 147, 150, 382/257, 155, 201, 206; 348/148
See application file for complete search history.

(56) References Cited

U.S. PATENT DOCUMENTS

| | | | | |
|---|---|---|---|---|
| 5,608,816 A | * | 3/1997 | Kawahara | ............ G01N 21/956 348/126 |
| 8,811,725 B2 | * | 8/2014 | Yokono | .............. G06K 9/00288 382/159 |

(Continued)

FOREIGN PATENT DOCUMENTS

| | | |
|---|---|---|
| CN | 110163640 A | 8/2019 |
| CN | 110490256 A | 11/2019 |

(Continued)

OTHER PUBLICATIONS

Law, H., "Cornernet: Detecting Objects as Paired Keypoints," In Proceedings of the European Conference on Computer Vision, 2018, pp. 1-17.

*Primary Examiner* — Charlotte M Baker
(74) *Attorney, Agent, or Firm* — Conley Rose, P.C.

(57) ABSTRACT

A target detection method comprises performing corner point feature extraction processing on an input image to obtain a pair of target corner points, generating a target frame based on the pair of target corner points, and outputting a target detection result of a target object when determining that a calibration area in the target frame comprises a target feature point.

38 Claims, 26 Drawing Sheets

(56) References Cited

U.S. PATENT DOCUMENTS

| | | | |
|---|---|---|---|
| 2008/0130982 A1* | 6/2008 | Kitamura | G06T 7/001 382/144 |
| 2012/0134576 A1* | 5/2012 | Sharma | G06K 9/6249 382/155 |
| 2015/0262343 A1* | 9/2015 | Lee | G06T 5/006 348/148 |
| 2018/0205965 A1 | 7/2018 | Chen et al. | |
| 2020/0374600 A1 | 11/2020 | Xu et al. | |
| 2021/0051317 A1* | 2/2021 | Yan | H04N 17/002 |

FOREIGN PATENT DOCUMENTS

| | | |
|---|---|---|
| CN | 111931764 A | 11/2020 |
| WO | 2014079058 A1 | 5/2014 |

\* cited by examiner

TARGET DETECTION METHOD, TRAINING METHOD, ELECTRONIC DEVICE, AND COMPUTER-READABLE MEDIUM

TECHNICAL FIELD

This application relates to the field of computer vision, and in particular, to a target detection method, a training method, an electronic device, and a computer-readable medium.

BACKGROUND

Computer vision is an integral part of various intelligent/autonomous systems in application fields, such as the manufacturing field, the inspection field, the document analysis field, the medical diagnosis field, and the military field, and is about how to use a camera/video camera and a computer to obtain required data and information of a photographed object. Figuratively, a computer is equipped with an eye (a camera/video camera) and a brain (an algorithm) to recognize, track, and measure a target in place of a human eye, thereby enabling the computer to sense an environment. Because sensing can be considered as extracting information from a sensory signal, the computer vision can also be considered as the science of studying how to enable an artificial system to perform "sensing" in an image or multidimensional data. Generally, the computer vision uses various imaging systems to obtain input information in place of visual organs, and then the computer processes and explains the input information in place of a brain. An ultimate research goal of the computer vision is enabling the computer to observe and understand the world as human beings to be able to autonomously adapt to an environment. Target detection is a commonly used technology in the field of computer vision.

The target detection is detecting a position and a category of a semantic object (such as a human being, a building, or a car) in an image or a video. The target detection is not difficult for a human being, and a target object in an image is easily positioned and classified by sensing modules in different colors in the image. However, a computer is confronted with a Red Green Blue (RGB) pixel matrix, and it is difficult to directly obtain an abstract concept of an object from the image and position the object. In addition, sometimes, a plurality of objects are mixed with a cluttered background, which makes target detection more difficult. With the help of a powerful capability of deep learning, the target detection has achieved relatively great success. Target detection methods are classified into two main types: two-stage (two-stage) method and one-stage (one-stage) method. A technical solution of the two-stage method mainly includes the following steps: performing preliminary regression and binary classification (foreground and background) on a candidate area (anchor) to obtain a sensing area (region of interest (ROI)). Features inside the ROI are obtained, and further regression and classification are performed using the features in the ROI to implement a target detection task. However, in the two-stage method, the target detection task is divided into two stages, and steps are cumbersome. Unlike the two-stage method, in the one-stage method, regression and classification are directly performed on a candidate area, so that a target can be detected at one stage. However, the one-stage method has a disadvantage of a high erroneous detection rate. A target detection algorithm used currently is usually difficult to meet both a high recall rate requirement and a low erroneous detection rate requirement. In actual application, for example, in an unmanned scenario, to ensure security, a target detection algorithm needs to ensure both a high recall rate and a low erroneous detection rate. Therefore, a target detection method for reducing an erroneous detection rate in a high recall rate needs to be studied.

SUMMARY

Embodiments of this application disclose a target detection method, a training method, an electronic device, and a computer-readable medium. One target frame is determined using two corner points, one internal point, and one internal area. Internal information in the target frame can be sensed at very low costs. Therefore, an erroneous target frame can be effectively removed, and an erroneous detection rate is low.

According to a first aspect, an embodiment of this application provides a target detection method. The method may include: performing corner point feature extraction processing on an input image to obtain a pair of target corner points, where the pair of target corner points include a first corner point and a second corner point, both the first corner point and the second corner point correspond to a target category, and the first corner point is a top-left corner point in the input image and the second corner point is a bottom-right corner point in the input image, or the first corner point is a top-right corner point in the input image and the second corner point is a bottom-left corner point in the input image, generating a target frame based on the pair of target corner points, where the target frame is a rectangular frame, and the first corner point and the second corner point correspond to two vertices on a diagonal line of the target frame, and outputting a target detection result of a target object when determining that a calibration area in the target frame includes a target feature point, where the target object is included in the input image and a category of the target object is the target category, the target feature point is a feature point obtained by performing key point feature extraction processing on the input image and corresponds to the target category, and the target detection result includes at least one of position information of the target frame, the target category, and a confidence level of the target frame. The target object is included in the target frame.

In this embodiment of this application, when the calibration area in the target frame includes the target feature point, the target frame is kept. Internal information in the target frame can be sensed at very low costs, and an erroneous detection rate can be effectively reduced.

In an optional implementation, after the generating a target frame based on the pair of target corner points, the method further includes: removing the target frame when the calibration area does not include the target feature point.

In this implementation, an erroneous target frame may be accurately removed, thereby reducing an erroneous detection rate.

In an optional implementation, before the determining that a calibration area in the target frame includes a target feature point, the method further includes: performing the key point feature extraction processing on the input image to obtain positions and categories of key feature points in the input image, where the target feature point is included in the key feature points, and the determining that a calibration area in the target frame includes a target feature point includes: obtaining a key feature point corresponding to the target category from the key feature points, to obtain at least one key feature point, determining whether at least one key feature point located in the calibration area exists in the at least one key feature point, and if the at least one key feature point exists, determining that the calibration area includes the target feature point.

In this implementation, a key point feature in the input image is extracted to determine whether the calibration area in the target frame includes the target feature point, and further remove an erroneous target frame.

In an optional implementation, the performing the key point feature extraction processing on the input image to obtain positions and categories of key feature points in the input image includes: performing the key point feature extraction processing on the input image to obtain a key point heatmap, where a size of the key point heatmap is different from a size of the input image, and the key point heatmap is used to determine the positions and the categories of the key feature points in the input image, and mapping coordinates corresponding to the key feature points in the key point heatmap to the input image to obtain the positions and the categories of the key feature points in the input image. The key point heatmap includes information about the positions and the categories of the key feature points.

In this implementation, the positions and categories of the key feature points in the input image may be accurately and quickly obtained.

In an optional implementation, the performing the key point feature extraction processing on the input image to obtain a key point heatmap includes: performing key point feature extraction on the input image to obtain a key point feature map, where the key point feature map is used to represent the key point features extracted from the input image, and performing convolution processing on the key point feature map to obtain the key point heatmap.

In this implementation, the key point heatmap that can accurately represent the positions and the categories of the key feature points in the input image is obtained by performing convolution processing on the key point feature map, and this operation is simple.

In an optional implementation, the performing key point feature extraction on the input image to obtain a key point feature map includes: performing convolution processing on the input image to obtain an initial feature map, and performing center pooling processing on the initial feature map to obtain the key point feature map, where the center pooling processing includes: performing left pooling and right pooling on the initial feature map to obtain a first key point feature map, performing top pooling and bottom pooling on the initial feature map to obtain a second key point feature map, and combining the first key point feature map and the second key point feature map to obtain the key point feature map.

In this implementation, a key point feature in the input image can be accurately and quickly extracted by performing center pooling processing on the initial feature map.

In an optional implementation, the performing left pooling and right pooling on the initial feature map to obtain a first key point feature map includes: performing convolution processing on the initial feature map to obtain a first feature map, and sequentially performing the left pooling and the right pooling on the first feature map to obtain the first key point feature map, or sequentially performing the right pooling and the left pooling on the first feature map to obtain the first key point feature map.

In this implementation, the left pooling and the right pooling are performed on the first feature map, so that information other than a position of a key feature point may be obtained, so that there is an opportunity to obtain semantic information, of the key feature point, that is more easily distinguished from another category.

In an optional implementation, the performing corner point feature extraction processing on an input image to obtain a pair of target corner points includes: performing the convolution processing on the input image to obtain the initial feature map, performing cascade corner pooling processing on the initial feature map to obtain a first corner point feature map and a second corner point feature map, where the first corner point feature map is used to represent each top-left corner point or each top-right corner point of the input image, the second corner point feature map is used to represent each bottom-right corner point or each bottom-left corner point of the input image, and the cascade corner pooling processing includes: performing first convolution processing on the initial feature map to obtain a second feature map, performing left pooling and top pooling on the second feature map to obtain the first corner point feature map, performing second convolution processing on the initial feature map to obtain a third feature map, and performing right pooling and bottom pooling on the third feature map to obtain the second corner point feature map, separately performing convolution processing on the first corner point feature map and the second corner point feature map to obtain a first corner heatmap and a second corner heatmap, where the first corner heatmap is used to represent a position and a category of each top-left corner point or each bottom-right corner point, and the second corner heatmap is used to represent a position and a category of each bottom-right corner point or each bottom-left corner point, and obtaining corner points corresponding to a same category in the first corner heatmap and the second corner heatmap, to obtain the target corner points.

In this implementation, a corner point feature is extracted in a cascade corner pooling manner, which not only provides semantic information of an edge of an object for the corner point feature, but also provides rich semantic information of an interior of the object, so that a corner point is better detected.

In an optional implementation, the cascade corner pooling processing further includes: performing third convolution processing on the initial feature map to obtain a fourth feature map, and the performing left pooling and top pooling on the second feature map to obtain the first corner point feature map includes: performing the left pooling on the second feature map to obtain a fifth feature map, combining the fifth feature map and the fourth feature map to obtain a sixth feature map, and performing top pooling on the sixth feature map to obtain the first corner point feature map.

In this implementation, left pooling is first performed before top pooling, so that an obtained corner point feature includes richer semantic information.

In an optional implementation, before the performing top pooling on the sixth feature map to obtain the first corner point feature map, the method further includes: performing convolution processing and batch normalization on the sixth feature map to obtain a processed sixth feature map, and the performing top pooling on the sixth feature map to obtain the first corner point feature map includes: performing top pooling on the processed sixth feature map to obtain the first corner point feature map.

In an optional implementation, after the generating a target frame based on the pair of target corner points, the method further includes: when a size of the target frame exceeds a target threshold, using a first area in the target frame as the calibration area, or when a size of the target frame does not exceed the target threshold, using a second area in the target frame as the calibration area, where a ratio of an area of the second area to an area of the target frame is greater than a ratio of an area of the first area to the area of the target frame.

In this implementation, the calibration area is determined based on a size of the target frame, so that a relatively small calibration area can be generated in a relatively large target frame, a relatively large calibration area can be generated in a relatively small target frame, and an erroneous target frame can be more accurately removed.

In an optional implementation, the generating a target frame based on the pair of target corner points includes: generating a rectangular frame using the first corner point and the second corner point as vertices, to obtain the target frame. Two vertices on a diagonal of the target frame are respectively the first corner point and the second corner point.

In an optional implementation, both a central point of the first area and a central point of the second area coincide with a central point of the target frame, and both the first area and the second area are rectangular areas.

In an unlimited application scenario, a comprehensive effect of selecting a central area of the target frame as the calibration area is the best.

According to a second aspect, an embodiment of this application provides another target detection method. The method may include: collecting an image of an ambient environment using a camera, to obtain a target image, performing corner point feature extraction processing on the target image to obtain a pair of target corner points, where the pair of target corner points include a first corner point and a second corner point, both the first corner point and the second corner point correspond to a target category, and the first corner point is a top-left corner point in the target image and the second corner point is a bottom-right corner point in the target image, or the first corner point is a top-right corner point in the target image and the second corner point is a bottom-left corner point in the target image, generating a target frame based on the pair of target corner points, where the target frame is a rectangular frame, and the first corner point and the second corner point correspond to two vertices on a diagonal line of the target frame, and obtaining a category of a target object in the target frame and a position of the target object in the target image when determining that a calibration area in the target frame includes a target feature point, where the target feature point is a feature point obtained by performing key point feature extraction processing on the target image and corresponds to the target category, and the target object belongs to the target category.

In this embodiment of this application, it is determined whether a calibration area in each target frame includes a key feature point, an erroneous target frame can be effectively removed, and target detection accuracy can be improved.

In an optional implementation, after the generating a target frame based on the pair of target corner points, the method further includes: removing the target frame when the calibration area does not include the target feature point.

In this implementation, an erroneous target frame may be accurately removed, thereby reducing an erroneous detection rate.

In an optional implementation, before the determining that a calibration area in the target frame includes a target feature point, the method further includes: performing the key point feature extraction processing on the target image to obtain positions and categories of key feature points in the target image, where the target feature point is included in the key feature points, and the determining that a calibration area in the target frame includes a target feature point includes: obtaining a key feature point corresponding to the target category from the key feature points, to obtain at least one key feature point, determining whether at least one key feature point located in the calibration area exists in the at least one key feature point, and if the at least one key feature point exists, determining that the calibration area includes the target feature point.

In this implementation, a key point feature in the target image is extracted to determine whether the calibration area in the target frame includes the target feature point, and further remove an erroneous target frame.

In an optional implementation, after the obtaining a category of a target object in the target frame and a position of the target object in the target image, the method further includes: when the target category is an obstacle, obtaining a target point cloud, corresponding to the target frame, in original point clouds collected using a laser radar, where each point in the original point clouds corresponds to one pixel in the target image, and all pixels in the target image that correspond to all points in the target point cloud are located in the target frame, and determining a position of the target object based on the target point cloud.

In this implementation, the position of the target object may be accurately determined using the target point cloud.

According to a third aspect, an embodiment of this application provides a training method. The method may include: inputting a training sample into a convolutional neural network for processing, to obtain a target processing result, where the target processing result includes a first corner heatmap, a second corner heatmap, an embedding vector map, a first offset matrix, a second offset matrix, a reference key point heatmap, and a third offset matrix, the first corner heatmap is used to represent a position and a category of each top-left corner point in the training sample, the second corner heatmap is used to represent a position and a category of each bottom-right corner point in the training sample, the embedding vector map is used to represent a matching status between each top-left corner point and each bottom-right corner point, the first offset matrix is used to represent an offset value lost when the training sample is mapped to the first corner heatmap, the second offset matrix is used to represent an offset value lost when the training sample is mapped to the second corner heatmap, the reference key point heatmap is used to represent a position and a category of each key point in the training sample, and the third offset matrix is used to represent an offset value lost when the training sample is mapped to the reference key point heatmap, determining a loss corresponding to the training sample based on the target processing result and a standard result, where the standard result is a processing result expected to be obtained by processing the training sample using the convolutional neural network, and updating a parameter of the convolutional neural network through an optimization algorithm using the loss corresponding to the training sample.

In this embodiment of this application, a convolutional neural network that performs a target detection task based on two corner points and one key feature point may be obtained through training, and one target frame is determined using three key points and one calibration area using the convolutional neural network obtained through training, so that a large quantity of erroneous detection frames can be effectively removed, thereby improving detection accuracy.

In an optional implementation, the standard result includes a first standard corner heatmap, a second standard corner heatmap, a first standard offset matrix, a second standard offset matrix, a standard key point heatmap, and a third standard offset matrix, the first standard corner heatmap is used to represent a real position and category of each top-left corner point, the second standard corner heatmap is used to represent a real position and category of each bottom-right corner point, the first standard offset matrix is used to represent a real offset value lost when the training sample is mapped to the first corner heatmap, the second standard offset matrix is used to represent a real offset value lost when the training sample is mapped to the second corner heatmap, the standard key point heatmap is used to represent a real position and category of each key point, and the third standard offset matrix is used to represent a real offset value lost when the training sample is mapped to the standard key point heatmap, and the determining a loss corresponding to the training sample based on the target processing result and a standard result includes: calculating a first loss representing a difference between the first corner heatmap and the first standard corner heatmap, calculating a second loss representing a difference between the second corner heatmap and the second standard corner heatmap, calculating a third loss based on the embedding vector map and a score loss function, where the score loss function is used to make a distance between vectors of a pair of corner points belonging to a same category as small as possible and make a distance between vectors of corner points belonging to different categories as large as possible, calculating a fourth loss representing a difference between the first offset matrix and the first standard offset matrix, calculating a fifth loss representing a difference between the second offset matrix and the second standard offset matrix, calculating a sixth loss representing a difference between the third offset matrix and the third standard offset matrix, calculating a seventh loss representing a difference between the reference key point heatmap and the standard key point heatmap, and using a weighted sum of the first loss to the seventh loss as the loss corresponding to the training sample.

In this implementation, a convolutional neural network that can accurately extract corner point features and key point features may be obtained through training.

According to a fourth aspect, an embodiment of this application provides an electronic device, including a processor and a memory. The memory is configured to store code, and the processor is configured to perform the following operations using the code stored in the memory: performing corner point feature extraction processing on an input image to obtain a pair of target corner points, where the pair of target corner points include a first corner point and a second corner point, both the first corner point and the second corner point correspond to a target category, and the first corner point is a top-left corner point in the input image and the second corner point is a bottom-right corner point in the input image, or the first corner point is a top-right corner point in the input image and the second corner point is a bottom-left corner point in the input image, generating a target frame based on the pair of target corner points, where the target frame is a rectangular frame, and the first corner point and the second corner point correspond to two vertices on a diagonal line of the target frame, and outputting a target detection result of a target object when determining that a calibration area in the target frame includes a target feature point, where the target object is included in the input image and a category of the target object is the target category, the target feature point is a feature point obtained by performing key point feature extraction processing on the input image and corresponds to the target category, and the target detection result includes at least one of position information of the target frame, the target category, and a confidence level of the target frame.

In an optional implementation, the processor is further configured to: after generating the target frame based on the pair of target corner points, remove the target frame when the calibration area does not include the target feature point.

In an optional implementation, the processor is further configured to: before it is determined that the calibration area in the target frame includes the target feature point, perform the key point feature extraction processing on the input image to obtain positions and categories of key feature points in the input image, where the target feature point is included in the key feature points. The processor is specifically configured to: obtain a key feature point corresponding to the target category from the key feature points, to obtain at least one key feature point, determine whether at least one key feature point located in the calibration area exists in the at least one key feature point, and if the at least one key feature point exists, determine that the calibration area includes the target feature point.

In an optional implementation, the processor is specifically configured to: perform the key point feature extraction processing on the input image to obtain a key point heatmap, where a size of the key point heatmap is different from a size of the input image, and the key point heatmap is used to determine the positions and the categories of the key feature points in the input image, and map coordinates corresponding to the key feature points in the key point heatmap to the input image to obtain the positions and the categories of the key feature points in the input image. The key point heatmap includes information about the positions and the categories of the key feature points.

In an optional implementation, the processor is specifically configured to: perform key point feature extraction on the input image to obtain a key point feature map, where the key point feature map is used to represent the key point features extracted from the input image, and perform convolution processing on the key point feature map to obtain the key point heatmap.

In an optional implementation, the processor is specifically configured to: perform convolution processing on the input image to obtain an initial feature map, and perform center pooling processing on the initial feature map to obtain the key point feature map, where the center pooling processing includes: performing left pooling and right pooling on the initial feature map to obtain a first key point feature map, performing top pooling and bottom pooling on the initial feature map to obtain a second key point feature map, and combining the first key point feature map and the second key point feature map to obtain the key point feature map.

In an optional implementation, the processor is specifically configured to: perform convolution processing on the initial feature map to obtain a first feature map, and sequentially perform the left pooling and the right pooling on the first feature map to obtain the first key point feature map, or sequentially perform the right pooling and the left pooling on the first feature map to obtain the first key point feature map.

In an optional implementation, the processor is specifically configured to: perform the convolution processing on the input image to obtain the initial feature map, perform cascade corner pooling processing on the initial feature map to obtain a first corner point feature map and a second corner point feature map, where the first corner point feature map is used to represent each top-left corner point or each top-right corner point of the input image, the second corner point feature map is used to represent each bottom-right corner point or each bottom-left corner point of the input image, and the cascade corner pooling processing includes: performing first convolution processing on the initial feature map to obtain a second feature map, performing left pooling and top pooling on the second feature map to obtain the first corner point feature map, performing second convolution processing on the initial feature map to obtain a third feature map, and performing right pooling and bottom pooling on the third feature map to obtain the second corner point feature map, separately perform convolution processing on the first corner point feature map and the second corner point feature map to obtain a first corner heatmap and a second corner heatmap, where the first corner heatmap is used to represent a position and a category of each top-left corner point or each bottom-right corner point, and the second corner heatmap is used to represent a position and a category of each bottom-right corner point or each bottom-left corner point, and obtain corner points corresponding to a same category in the first corner heatmap and the second corner heatmap, to obtain the target corner points.

In an optional implementation, the cascade corner pooling processing further includes: performing third convolution processing on the initial feature map to obtain a fourth feature map. The processor is specifically configured to: perform the left pooling on the second feature map to obtain a fifth feature map, and combine the fifth feature map and the fourth feature map to obtain a sixth feature map, and perform top pooling on the sixth feature map to obtain the first corner point feature map.

In an optional implementation, the processor is further configured to: before performing the top pooling on the sixth feature map to obtain the first corner point feature map, perform convolution processing and batch normalization on the sixth feature map to obtain a processed sixth feature map. The processor is specifically configured to perform top pooling on the processed sixth feature map to obtain the first corner point feature map.

In an optional implementation, the processor is further configured to: after generating the target frame based on the pair of target corner points, when a size of the target frame exceeds a target threshold, use a first area in the target frame as the calibration area, or when a size of the target frame does not exceed the target threshold, use a second area in the target frame as the calibration area, where a ratio of an area of the second area to an area of the target frame is greater than a ratio of an area of the first area to the area of the target frame.

In an optional implementation, both a central point of the first area and a central point of the second area coincide with a central point of the target frame, and both the first area and the second area are rectangular areas.

According to a fifth aspect, an embodiment of this application provides a self-driving apparatus, including a camera, a processor, and a memory. The camera is configured to collect an image of an ambient environment using a camera, to obtain a target image. The memory is configured to store code and the target image. The processor is configured to perform the following operations by reading the code stored in the memory: performing corner point feature extraction processing on the target image to obtain a pair of target corner points, where the pair of target corner points include a first corner point and a second corner point, both the first corner point and the second corner point correspond to a target category, and the first corner point is a top-left corner point in the target image and the second corner point is a bottom-right corner point in the target image, or the first corner point is a top-right corner point in the target image and the second corner point is a bottom-left corner point in the target image, generating a target frame based on the pair of target corner points, where the target frame is a rectangular frame, and the first corner point and the second corner point correspond to two vertices on a diagonal line of the target frame, and obtaining a category of a target object in the target frame and a position of the target object in the target image when determining that a calibration area in the target frame includes a target feature point, where the target feature point is a feature point obtained by performing key point feature extraction processing on the target image and corresponds to the target category, and the target object belongs to the target category.

In an optional implementation, the processor is further configured to: after generating the target frame based on the pair of target corner points, remove the target frame when the calibration area does not include the target feature point.

In an optional implementation, the processor is further configured to: before it is determined that the calibration area in the target frame includes the target feature point, perform the key point feature extraction processing on the target image to obtain positions and categories of key feature points in the target image, where the target feature point is included in the key feature points. The processor is specifically configured to: obtain a key feature point corresponding to the target category from the key feature points, to obtain at least one key feature point, determine whether at least one key feature point located in the calibration area exists in the at least one key feature point, and if the at least one key feature point exists, determine that the calibration area includes the target feature point.

In an optional implementation, the self-driving apparatus further includes: a laser radar, configured to collect point cloud data to obtain original point clouds. The processor is further configured to: when the target category is an obstacle, obtain a target point cloud, corresponding to the target frame, in the original point clouds collected using the laser radar, where each point in the original point clouds corresponds to one pixel in the target image, and all pixels in the target image that correspond to all points in the target point cloud are located in the target frame, and determine a position of the target object based on the target point cloud.

According to a sixth aspect, an embodiment of this application provides a computer device, including a processor and a memory. The memory is configured to store code, and the processor is configured to perform the following operations by reading the code stored in the memory: inputting a training sample into a convolutional neural network for processing, to obtain a target processing result, where the target processing result includes a first corner heatmap, a second corner heatmap, an embedding vector map, a first offset matrix, a second offset matrix, a reference key point heatmap, and a third offset matrix, the first corner heatmap is used to represent a position and a category of each top-left corner point in the training sample, the second corner heatmap is used to represent a position and a category of each bottom-right corner point in the training sample, the embedding vector map is used to represent a matching status between each top-left corner point and each bottom-right corner point, the first offset matrix is used to represent an offset value lost when the training sample is mapped to the first corner heatmap, the second offset matrix is used to represent an offset value lost when the training sample is mapped to the second corner heatmap, the reference key point heatmap is used to represent a position and a category of each key point in the training sample, and the third offset matrix is used to represent an offset value lost when the training sample is mapped to the reference key point heatmap, determining a loss corresponding to the training sample based on the target processing result and a standard result, where the standard result is a processing result expected to be obtained by processing the training sample using the convolutional neural network, and updating a parameter of the convolutional neural network through an optimization algorithm using the loss corresponding to the training sample.

In an optional implementation, the standard result includes a first standard corner heatmap, a second standard corner heatmap, a first standard offset matrix, a second standard offset matrix, a standard key point heatmap, and a third standard offset matrix, the first standard corner heatmap is used to represent a real position and category of each top-left corner point, the second standard corner heatmap is used to represent a real position and category of each bottom-right corner point, the first standard offset matrix is used to represent a real offset value lost when the training sample is mapped to the first corner heatmap, the second standard offset matrix is used to represent a real offset value lost when the training sample is mapped to the second corner heatmap, the standard key point heatmap is used to represent a real position and category of each key point, and the third standard offset matrix is used to represent a real offset value lost when the training sample is mapped to the standard key point heatmap. The processor is specifically configured to: calculate a first loss representing a difference between the first corner heatmap and the first standard corner heatmap, calculate a second loss representing a difference between the second corner heatmap and the second standard corner heatmap, calculate a third loss based on the embedding vector map and a score loss function, where the score loss function is used to make a distance between vectors of a pair of corner points belonging to a same category as small as possible and make a distance between vectors of corner points belonging to different categories as large as possible, calculate a fourth loss representing a difference between the first offset matrix and the first standard offset matrix, calculate a fifth loss representing a difference between the second offset matrix and the second standard offset matrix, calculate a sixth loss representing a difference between the third offset matrix and the third standard offset matrix, calculate a seventh loss representing a difference between the reference key point heatmap and the standard key point heatmap, and use a weighted sum of the first loss to the seventh loss as the loss corresponding to the training sample.

According to a seventh aspect, an embodiment of this application provides a computer-readable storage medium, where the computer storage medium stores a computer program, and the computer program includes a program instruction, and when the program instruction is executed by a processor, the processor performs the method in the first aspect to the third aspect and the optional implementations.

According to an eighth aspect, an embodiment of this application provides a chip, where the chip includes a processor and a data interface, and the processor reads, using the data interface, an instruction stored in a memory to perform the method according to the first aspect to the third aspect and the optional implementations.

BRIEF DESCRIPTION OF DRAWINGS

To describe the technical solutions in the embodiments of this application or in the background more clearly, the following briefly describes the accompanying drawings required for describing the embodiments of this application or the background.

FIG. 14A and FIG. 14B-1 to FIG. 14B-3 are flowcharts of a corner point feature extraction method according to Embodiment 4 of this application.

DESCRIPTION OF EMBODIMENTS

Figure 1:
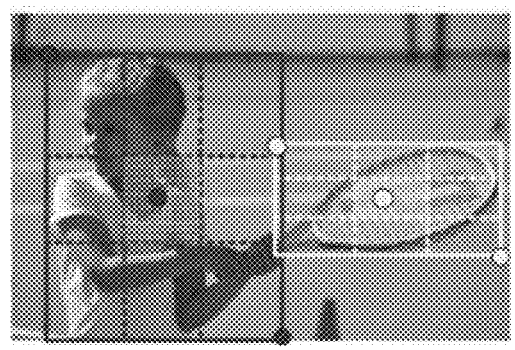
FIG. 1 is a schematic diagram of a relationship among an internal area, a key feature point, and a target frame according to an embodiment of this application.

The following describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Target detection, also referred to as target extraction, is image segmentation that is based on geometrical and statistical features of a target, and combines segmentation and recognition of the target. Accuracy and real-time performance of the target detection are important capabilities of an entire system. Especially in a complex scenario, automatic target extraction and recognition are particularly important when a plurality of targets need to be processed in real time. Essence of the target detection is positioning a plurality of targets, in other words, a plurality of target objects need to be positioned in an image, including classification and positioning. For example, target detection is performed on an image, an obtained result is several animals, and a position of each animal corresponds to a rectangular frame. With development of computer technologies and wide application of computer vision principles, real-time tracking and researching of targets using computer image processing technologies are becoming more popular. Dynamic real-time tracking and positioning of targets have wide application value in aspects such as an intelligent transportation system, an intelligent monitoring system, military target detection, and surgical instrument positioning in medical navigation surgery. A target detection method provided in the embodiments of this application can be applied to scenarios such as image processing, intelligent robot interaction, and self-driving. The following briefly describes application of the target detection method provided in the embodiments of this application in the image processing scenario, the intelligent robot interaction scenario, and the self-driving scenario.

Image processing scenario: An image processing apparatus (such as a mobile phone or a tablet computer) performs target detection on a collected image to obtain classification and positioning of all targets in the image, and further segments a target (such as a portrait) in the image to perform an image processing operation, for example, adjust a depth of field, change a background, keep only a color of an area in which the target object is located, or blur an image area outside the area in which the target object is located. For example, after a user takes an image using a mobile terminal, the mobile terminal performs target detection on the image, determines a portrait area, and keeps only a color of the portrait area.

Intelligent robot interaction scenario: Intelligent robots are to enter innumerable families in the future. To be a human assistant, an intelligent robot first needs to be able to sense an ambient environment and perform a corresponding action. In actual application, the intelligent robot may collect an image of the ambient environment, and perform target detection on the collected image to position a target. For example, a host in a room is doing housework. In this case, the host needs a bowl, and asks a robotic butler to hand him the bowl. After receiving an instruction, the robotic butler first detects an ambient environment, finds a position of the bowl, and then performs a series of subsequent actions. The robotic butler detects the ambient environment. In a process of finding the position of the bowl, an image of the ambient environment needs to be collected, and target detection is performed on the collected image to position the bowl.

Self-driving scenario: A self-driving apparatus (for example, a vehicle) performs target detection on a collected image or video in real time to position a pedestrian, an obstacle, a vehicle, and the like, and then executes a corresponding driving policy. In actual application, the self-driving apparatus may learn a surrounding traffic condition using video information or an image collected by a camera, and draw a safe and reliable route to navigate for a road ahead.

In the foregoing scenario, the target detection apparatus (for example, the image processing apparatus or the self-driving apparatus) may determine one target frame using three key feature points extracted from an image and one internal area of the image, so that a large quantity of erroneous detection frames can be effectively removed, thereby improving detection accuracy. FIG. 1 is a schematic diagram of a relationship among an internal area, three key feature points, and a target frame according to an embodiment of this application. In FIG. 1, a black rectangular frame is a target frame (a person), three black dots are three key feature points for determining the target frame, and an area with a shade in the black rectangular frame is an internal area of the target frame. A white rectangular frame is another target frame (a tennis racket), three white dots are three key feature points for determining the target frame, and an area with a shade in the white rectangular frame is an internal area of the target frame. The internal area of the target frame may be understood as a calibration area in the target frame.

The following describes the method provided in this application from a model training side and a model application side.

A training method for a convolutional neural network provided in the embodiments of this application relates to computer vision processing, and may be specifically applied to a target detection method such as data training, machine learning, and deep learning. Symbolized and formalized intelligent information modeling, extraction, preprocessing, training, and the like are performed on training data (for example, an input image in this application) to finally obtain a trained convolutional neural network. In addition, the foregoing trained convolutional neural network may be used in the target detection method provided in the embodiments of this application, to input input data (for example, the input image in this application) into the trained convolutional neural network to obtain output data (for example, a target detection result in this application). It should be noted that the training method for a convolutional neural network and the target detection method that are provided in the embodiments of this application are disclosures generated based on a same concept, or may be understood as two parts of a system or two stages of an entire process, such as a model training stage and a model application stage.

The embodiments of this application relate to application of a large quantity of convolutional neural networks. For ease of understanding, the following first describes related concepts such as a related term in the embodiments of this application and a convolutional neural network.

(1) A convolutional neural network is a deep convolutional neural network with a convolutional structure. The convolutional neural network includes a feature extractor including a convolution layer and a sub-sampling layer. The feature extractor may be considered as a filter, and a convolution process may be considered as using a trainable filter to perform convolution on an input image or a convolution feature plane (feature map), to output a convolution feature plane, where the convolution feature plane may also be referred to as a feature map. The convolution layer is a neuron layer, in a convolutional neural network that performs convolution processing on an input signal. At the convolution layer of the convolutional neural network, a neuron may be connected only to some of neurons of a neighboring layer. One convolution layer usually includes several feature planes, and each feature plane may include some rectangularly arranged neurons. Neurons in a same feature plane share a weight, and a weight matrix corresponding to the weight shared herein is a convolution kernel. Sharing a weight may be understood as that a manner of extracting image information is unrelated to a position. A principle implied herein is that statistical information of a part of an image is the same as those of other parts. This means that image information learned in a part can also be used in another part. Therefore, the same learned image information can be used for all positions on the image. At a same convolution layer, a plurality of convolution kernels may be used to extract different image information. Usually, a larger quantity of convolution kernels indicates richer image information reflected by a convolution operation.

The convolution kernel may be initialized in a form of a matrix of a random size. In a training process of the convolutional neural network, the convolution kernel may obtain a proper weight through learning. In addition, a direct benefit of sharing a weight is reducing connections between layers of the convolutional neural network, while reducing a risk of overfitting.

(2) Loss Function

In a process of training a convolutional neural network, because it is expected that an output of the convolutional neural network is as close as possible to a really desired predicted value, a predicted value of the current network and a really desired target value may be compared, and then, a weight vector of each layer of the convolutional neural network may be updated based on a difference between the predicted value of the current network and the really desired target value, an initialization process is usually performed before a first update, a parameter is preconfigured for each layer of the convolutional neural network. For example, if the predicted value of the network is high, the weight vector is adjusted to make the predicted value of the network lower and is continuously adjusted until the convolutional neural network can predict the really desired target value or a value very close to the really desired target value. Therefore, it is required to predefine "how to compare the predicted value and the target value", the difference between the predicted value and the target value is a loss function or an objective function, and the function is an important equation used to measure the difference between the predicted value and the target value. The loss function is used as an example, a higher output value (loss) of the loss function indicates a larger difference, and therefore, training for the convolutional neural network becomes a process of reducing the loss as much as possible.

(3) Back Propagation Algorithm

A convolutional neural network may modify a size of a parameter in the convolutional neural network in a training process using an error back propagation (BP) algorithm, so that an error loss between a predicted value output by the convolutional neural network and a really desired target value becomes less. Specifically, an input signal is transferred forwards until an error loss occurs on an output, and the parameter in the initial convolutional neural network is updated using back propagation error loss information, so that the error loss converges. The back propagation algorithm is a back propagation motion dominated by an error loss, and is intended to obtain an optimal parameter of the convolutional neural network, for example, a weight matrix, namely, a convolution kernel of a convolution layer.

The following describes a system architecture provided in an embodiment of this application.

Figure 2:
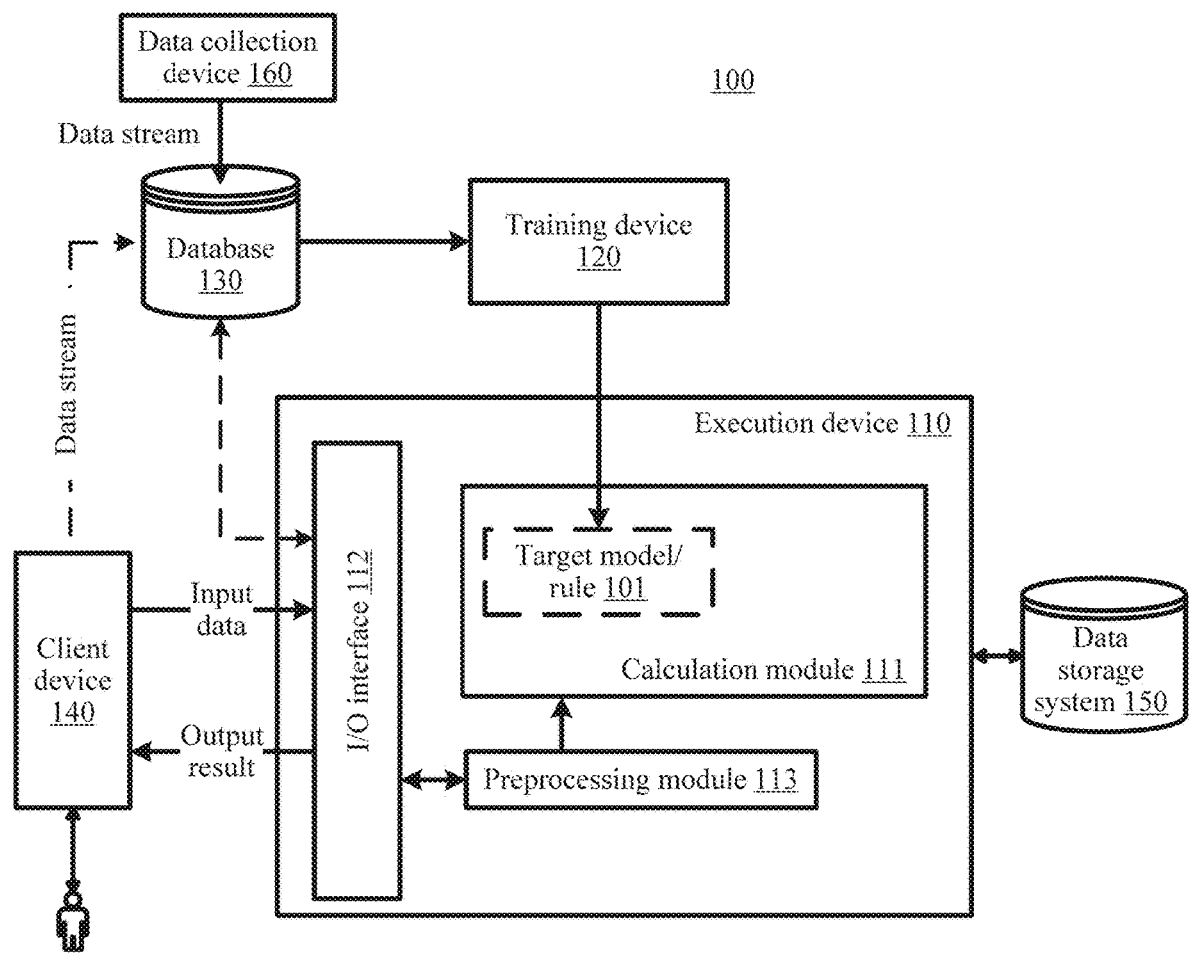
FIG. 2 shows a system architecture according to an embodiment of this application.

Referring to FIG. 2, an embodiment of this application provides a system architecture 100. As shown in the system architecture 100, a data collection device 160 is configured to collect training data. In this embodiment of this application, the training data includes one or more labeled images (namely, training samples) and real results corresponding to the one or more labeled images, namely, ideal results expected to be obtained by processing the one or more labeled images using a convolutional neural network. The training data may be stored in a database 130, and a training device 120 may obtain a target model/rule 101 (101 is a model obtained through training at a training stage described above, and may be a convolutional neural network used to implement a target detection operation) through training based on training data maintained in the database 130. One labeled image corresponds to one real result (also referred to as a standard result), namely, ground truth. The following further describes in detail, in Embodiment 1, how the training device 120 obtains the target model/rule 101 based on training data. The target model/rule 101 can be used to implement the target detection method provided in the embodiments of this application, a target detection result can be obtained by inputting image information obtained after related preprocessing is performed on an input image into the target model/rule 101. The target model/rule 101 in this embodiment of this application may be specifically a convolutional neural network obtained through training. In this embodiment provided in this application, the convolutional neural network is obtained by training an initialized convolutional neural network. It should be noted that, in actual application, the training data maintained in the database 130 does not necessarily come from collection of the data collection device 160, or may be received from another device. In addition, it should be noted that the training device 120 does not necessarily perform training on the target model/rule 101 completely based on the training data maintained in the database 130, or may obtain training data from a cloud or another place to perform model training. The foregoing description should not be used as a limitation on this embodiment of this application.

The target model/rule 101 obtained through training by the training device 120 may be applied to different systems or devices, for example, applied to an execution device 110 shown in FIG. 2. The execution device 110 may be a terminal, such as a mobile phone terminal, a tablet computer, a notebook computer, an augmented reality (AR) device, a virtual reality (VR) device, or a vehicle-mounted terminal, or may be a server or the like. In FIG. 2, an input/output (I/O) interface 112 is configured for the execution device 110 to exchange data with an external device. A user may input data into the I/O interface 112 using a client device 140. The input data in this embodiment of this application may include: an input image that may be an image collected by the execution device 110 using the data collection device 160, may be an image in the database 130, or may be an image from the client device 140. In this embodiment of this application, the execution device 110 and the client device 140 may be a same device.

A preprocessing module 113 is configured to perform preprocessing based on the input data (for example, the input image) received by the I/O interface 112. In this embodiment of this application, the preprocessing module 113 may be configured to implement one or more operations such as image filtering, image preprocessing enhancement, image preprocessing smoothing, and image preprocessing restoration, and is further configured to implement another preprocessing operation. This is not limited in this application.

In a process in which the execution device 110 preprocesses the input data, or in a process in which a calculation module 111 of the execution device 110 performs related processing such as calculation, the execution device 110 may invoke data, code, and the like in a data storage system 150 to implement corresponding processing, or may store data, an instruction, and the like that are obtained through corresponding processing in the data storage system 150.

Finally, the I/O interface 112 returns a processing result, such as the foregoing obtained target detection result, to the client device 140 to provide the processing result for the user.

It should be noted that the training device 120 may obtain a corresponding target model/rule 101 through training based on different training data for different objectives or tasks. The corresponding target model/rule 101 may be used to implement the foregoing objectives or complete the foregoing tasks to provide a required result for the user.

In the case shown in FIG. 2, the user may manually give input data, and the manually giving may be performed through an interface provided by the I/O interface 112. In another case, the client device 140 may automatically send the input data to the I/O interface 112. If a user's grant is required for the client device 140 to automatically send the input data, the user may set corresponding permission in the client device 140. The user may view, on the client device 140, a result output by the execution device 110. A specific presentation form may be specifically display, sound, an action, and the like. The client device 140 may also be used as a data collection end, collect input data input into the I/O interface 112 and an output result output from the I/O interface 112 shown in the figure as new sample data, and store the new sample data in the database 130. Certainly, alternatively, the client device 140 may not perform collection, and the I/O interface 112 directly stores input data input into the I/O interface 112 and an output result output from the I/O interface 112 shown in the figure as new sample data into the database 130.

It should be noted that FIG. 2 is only a schematic diagram of a system architecture according to an embodiment of the present disclosure. A position relationship among a device, a component, a module, and the like shown in FIG. 2 constitutes no limitation. For example, in FIG. 2, the data storage system 150 is an external memory relative to the execution device 110, and in another case, the data storage system 150 may be disposed in the execution device 110. In this application, the target model/rule 101 obtained through training based on training data may be a convolutional neural network used for a target detection task.

As described in the foregoing basic concepts, a convolutional neural network is a deep convolutional neural network with a convolutional structure, and is a deep learning architecture. The deep learning architecture means learning of a plurality of layers at different abstraction layers using a machine learning algorithm. As a deep learning architecture, the CNN is a feed-forward artificial convolutional neural network, and neurons in the feed-forward artificial convolutional neural network can respond to images input into the neurons.

Figure 3A:
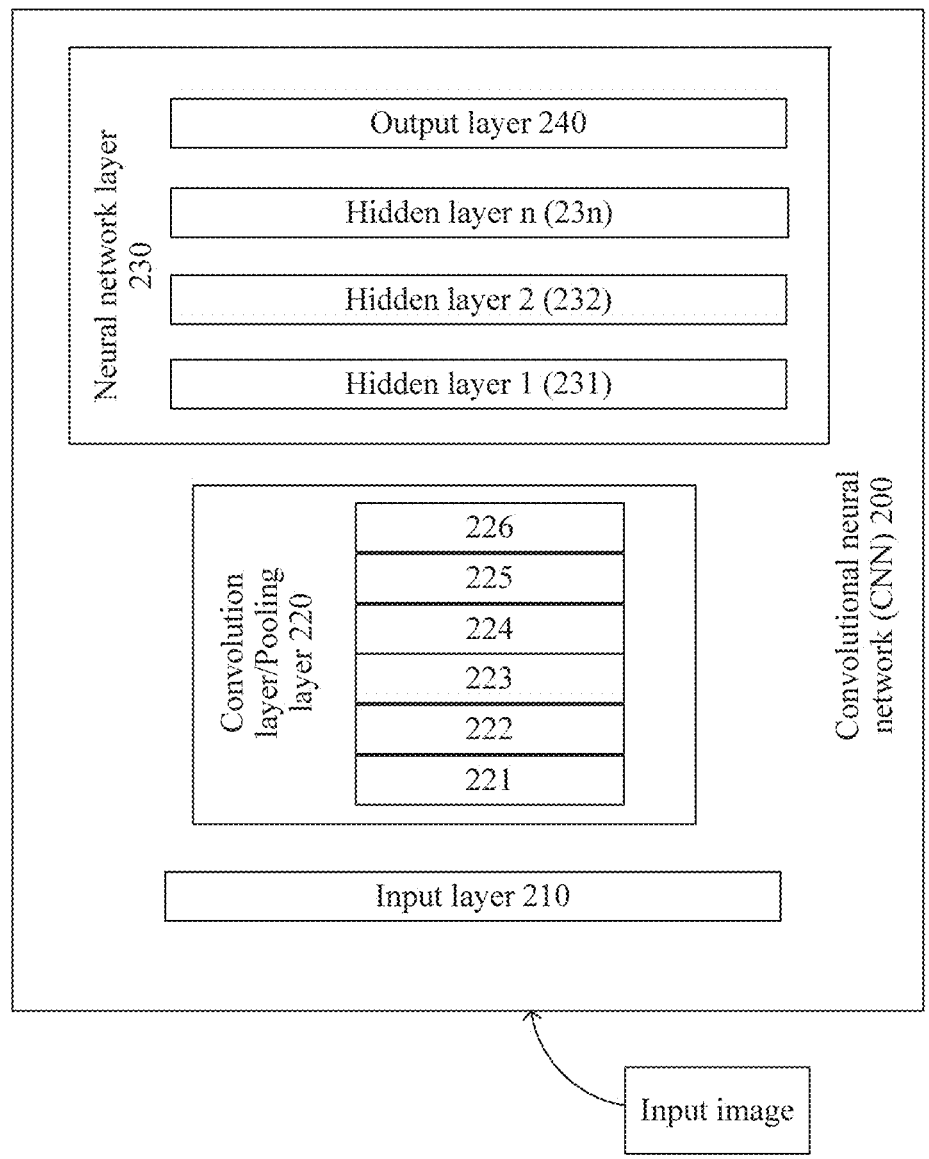
FIG. 3A is a schematic structural diagram of a convolutional neural network according to an embodiment of this application.

As shown in FIG. 3A, a convolutional neural network (CNN) 200 may include an input layer 210, a convolution layer/pooling layer 220 (where the pooling layer is optional), and a convolutional neural network layer 230.

Convolution Layer/Pooling Layer 220:

Convolution Layer:

As shown in FIG. 3A, the convolution layer/pooling layer 220 may include, for example, layers 221 to 226. For example, in an implementation, the layer 221 is a convolution layer, the layer 222 is a pooling layer, the layer 223 is a convolution layer, the layer 224 is a pooling layer, the layer 225 is a convolution layer, and the layer 226 is a pooling layer. In another implementation, the layers 221 and 222 are convolution layers, the layer 223 is a pooling layer, the layers 224 and 225 are convolution layers, and the layer 226 is a pooling layer. An output of a convolution layer may be used as a subsequent input of a pooling layer, or may be used as an input of another convolution layer to continue to perform a convolution operation.

The following uses the convolution layer 221 as an example to describe an internal working principle of a convolution layer.

The convolution layer 221 may include a plurality of convolution operators, and the convolution operator is also referred to as a convolution kernel. A function of the convolution operator in image processing is equivalent to a filter for extracting specific information from an input image matrix. The convolution operator may be essentially a weight matrix, and this weight matrix is usually predefined. In a process of performing a convolution operation on an image, depending on a value of a stride, in the weight matrix, processing is usually performed on the input image in a horizontal direction in a unit of one pixel or in units of two pixels to complete working of extracting a specific feature from the image. A size of the weight matrix needs to be related to a size of the image. It should be noted that a depth dimension of the weight matrix is the same as a depth dimension of the input image. In a process of performing a convolution operation, the weight matrix is extended to an entire depth of the input image. The depth dimension is a channel dimension, and corresponds to a quantity of channels. Therefore, after convolution with a single weight matrix is performed, a convolutional output of a single depth dimension is generated. However, in most cases, a single weight matrix is not used, but a plurality of weight matrices of a same size (rows×columns) are used, namely, a plurality of isotype matrices. An output of each weight matrix is stacked to form a depth dimension of a convolutional image, and it may be understood that the dimension herein depends on the foregoing "plurality of". Different weight matrices may be used to extract different features in the image, for example, one weight matrix is used to extract edge information of the image, another weight matrix is used to extract a specific color of the image, and a further weight matrix is used to blur unneeded noise in the image. Sizes (rows× columns) of the plurality of weight matrices are the same, sizes of feature maps extracted using the plurality of weight matrices with a same size are the same, and then the extracted plurality of feature maps with a same size are combined to form an output of a convolution operation.

Weight values in these weight matrices need to be obtained through a large amount of training in actual application. Each weight matrix formed using the weight values obtained through training may be used to extract information from an input image, so that the convolutional neural network 200 performs correct prediction.

When the convolutional neural network 200 has a plurality of convolution layers, an initial convolution layer (for example, 221) usually extracts a relatively large quantity of general features. The general features may also be referred to as low-level features and correspond to high-resolution feature maps. As a depth of the convolutional neural network 200 becomes larger, features extracted at a subsequent convolution layer (for example, 226) become more complex. For example, features such as high-level semantics correspond to low-resolution feature maps, and features with higher semantics are more applicable to a to-be-resolved problem.

Pooling Layer:

A quantity of training parameters often needs to be reduced. Therefore, a pooling layer often needs to be periodically introduced after a convolution layer. At the layers 221 to 226 shown in 220 in FIG. 3A, one convolution layer may be followed by one pooling layer, or a plurality of convolution layers may be followed by one or more pooling layers. In an image processing process, a sole purpose of the pooling layer is reducing a space size of an image. The pooling layer may include an average pooling operator and/or a maximum pooling operator, and may be used to sample an input image to obtain an image with a relatively small size, or may be used to perform down-sampling on a feature map input at the convolution layer, to obtain a feature map with a relatively small size. The average pooling operator may calculate pixel values in an image in a specific range to generate an average value as an average pooling result. The maximum pooling operator may take a pixel with a maximum value in a specific range as a maximum pooling result. In addition, as the size of the weight matrix in the convolution layer needs to be related to the size of the image, an operator in the pooling layer also needs to be related to the size of the image. A size of an image output after processing using the pooling layer may be less than a size of an image input into the pooling layer, and each pixel in the image output by the pooling layer represents an average value or a maximum value of a corresponding sub-area of the image input into the pooling layer. The embodiments of this application provide two new pooling manners: cascade corner pooling and center pooling. The two pooling manners are described in detail subsequently.

Convolutional Neural Network Layer 230:

After processing is performed by the convolution layer/pooling layer 220, the convolutional neural network 200 is not ready to output required output information, because the convolution layer/pooling layer 220 only extracts features and reduces parameters brought by an input image, as mentioned above. However, in order to generate final output information (target detection results or other related information), the convolutional neural network 200 needs to generate a target detection result using the convolutional neural network layer 230. Therefore, the convolutional neural network layer 230 may include a plurality of hidden layers (for example, 231, 232, and 23n shown in FIG. 3A) and an output layer 240. Parameters included in the plurality of hidden layers may be obtained through pre-training based on related training data of a specific task type. For example, the task type may include target detection, image semantic segmentation, image classification, and super-resolution image reconstruction. The hidden layer may perform a series of processing on the feature map output from the convolution layer/pooling layer 220 to obtain a target detection result. A process of obtaining a target detection result from a feature map output by the convolution layer/pooling layer 220 is described in detail subsequently, and is not described in detail herein.

The output layer 240 is after the plurality of hidden layers in the convolutional neural network layer 230, in other words, a last layer of the entire convolutional neural network 200 is the output layer 240. The output layer 240 has a loss function similar to a classification cross entropy, and the loss function is specifically used to calculate a prediction error. Once forward propagation of the entire convolutional neural network 200 (as shown in FIG. 3A, propagation from 210 to 240 is forward propagation) is completed, back propagation (as shown in FIG. 3A, propagation from 240 to 210 is back propagation) starts to update weight values and deviations of the layers mentioned above, to reduce a loss of the convolutional neural network 200 and an error between a result (namely, the foregoing image processing result) output using the output layer by the convolutional neural network 200 and an ideal result.

It should be noted that the convolutional neural network 200 shown in FIG. 3A is merely an example of a convolutional neural network. In specific application, the convolutional neural network may further exist in a form of another network model.

The following describes a hardware structure of a chip provided in an embodiment of this application.

Figure 3B:
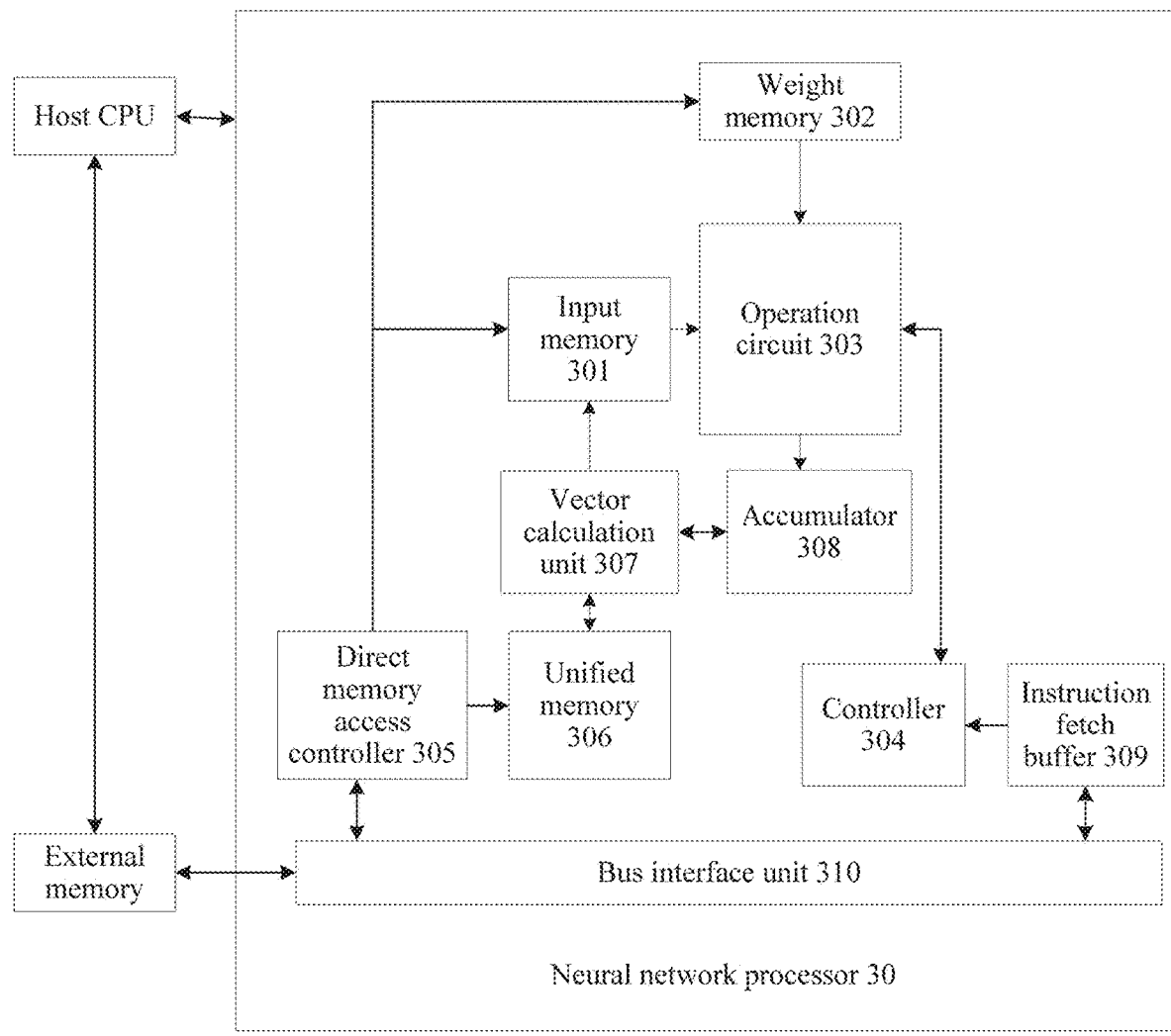
FIG. 3B is a schematic diagram of a hardware structure of a chip according to an embodiment of the present disclosure.

FIG. 3B is a hardware structure of a chip according to an embodiment of the present disclosure. The chip includes a convolutional neural network processor 30. The chip may be disposed in the execution device 110 shown in FIG. 2 to complete calculation work of the calculation module 111. The chip may be alternatively disposed in the training device 120 shown in FIG. 2 to complete training work of the training device 120 and output a target model/rule 101. Algorithms of the layers in the convolutional neural network shown in FIG. 3A may be implemented in the chip shown in FIG. 3B.

The convolutional neural network processor 30 may be a convolutional neural-network processing unit (NPU), a tensor processing unit (TPU), a graphics processing unit (GPU), or any processor suitable for large-scale exclusive OR operation processing. The NPU is used as an example. The NPU may be mounted, as a coprocessor, onto a central processing unit (CPU), namely, a host CPU, and the host CPU allocates a task, such as an image processing task, to the NPU. A core part of the NPU is an operation circuit 303, and the operation circuit 303 is controlled by a controller 304 to extract matrix data from a memory (301 and 302) and perform a multiplication and addition operation.

In some implementations, the operation circuit 303 includes a plurality of processing elements (PE). In some implementations, the operation circuit 303 is a two-dimensional systolic array. The operation circuit 303 may be further a one-dimensional systolic array or another electronic circuit that can perform mathematical operations such as multiplication and addition. In some implementations, the operation circuit 303 is a general-purpose matrix processor.

For example, it is assumed that there is an input matrix A, a weight matrix B, and an output matrix C. The operation circuit 303 takes a weight value of the matrix B from the weight memory 302, and caches the weight value of the matrix B on each PE in the operation circuit 303. The operation circuit 303 takes input data of the matrix A from the input memory 301, and performs a matrix operation based on the input data of the matrix A and the weight value of the matrix B, and an obtained partial result or final result of the matrix is stored in an accumulator (accumulator) 308. The input data may be an input image, and the weight matrix is a convolution kernel. Weight data may also be referred to as a weight matrix.

A unified memory 306 is configured to store input data and output data. The weight matrix is directly transferred to the weight memory 302 using a direct memory access controller (DMAC) 305. The input data is also transferred to the unified memory 306 using the DMAC. The output data is a target detection result.

A bus interface unit (BIU) 310 is used for interaction between the DMAC and an instruction fetch buffer 309. The bus interface unit 301 is further used by the instruction fetch buffer 309 to obtain an instruction from an external memory. The bus interface unit 301 is further used by the direct memory access controller 305 to obtain original data of the input matrix A or the weight matrix B from the external memory.

The DMAC is mainly configured to: transfer the input data in an external memory DDR to the unified memory 306, or transfer the weight data to the weight memory 302, or transfer the input data to the input memory 301.

A vector calculation unit 307 may include a plurality of operation processing elements. If required, further processing is performed on an output of the operation circuit 303, such as vector multiplication, vector addition, an exponential operation, a logarithmic operation, and a size comparison. The vector calculation unit 307 is mainly used for calculation at a non-convolution layer or a fully connected layer (FC) of the convolutional neural network, and may specifically process calculation in pooling, normalization, or the like. For example, the vector calculation unit 307 may apply a non-linear function to an output of the operation circuit 303, such as a vector of cumulative values, to generate an active value. In some implementations, the vector calculation unit 307 generates a normalized value, or a combined value, or both a normalized value and a combined value.

In some implementations, the vector calculation unit 307 stores a processed vector in the unified memory 306. In some implementations, a vector processed by the vector calculation unit 307 can be used as an active input of the operation circuit 303, for example, for use at a subsequent layer of the convolutional neural network. As shown in FIG. 3A, if a current processing layer is a hidden layer 1 (231), the vector processed by the vector calculation unit 307 can also be used for calculation at a hidden layer 2 (232).

The instruction fetch buffer 309 connected to the controller 304 is configured to store an instruction used by the controller 304.

The unified memory 306, the input memory 301, the weight memory 302, and the instruction fetch buffer 309 are all on-chip memories. The external memory may be independent of the NPU hardware architecture.

An operation at each layer of the convolutional neural network shown in FIG. 3A may be performed by the operation circuit 303 or the vector calculation unit 307.

Figure 4:
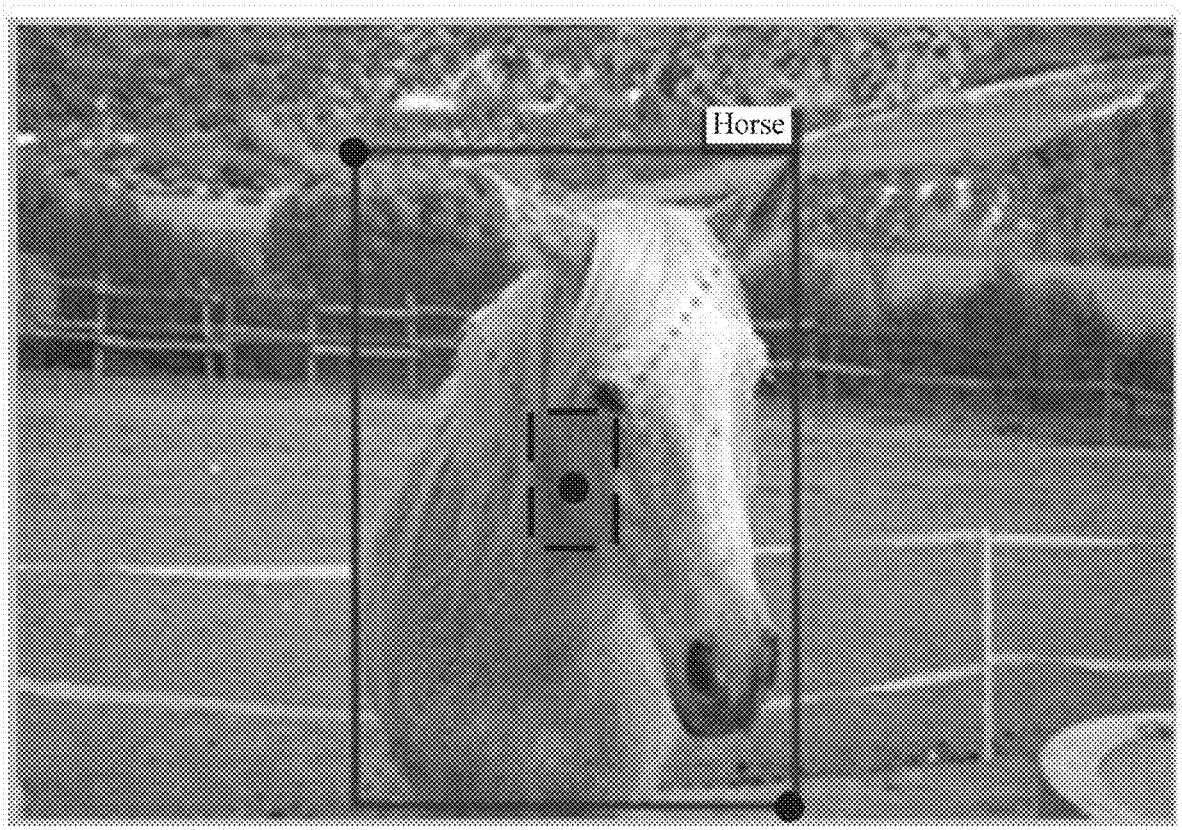
FIG. 4 is a schematic diagram of a relationship among a target frame, a calibration area, a corner point, and a key point according to an embodiment of this application.

An embodiment of this application proposes a target detection method that is based on key point triplets. A main principle of the method is shown in FIG. 4, and one target frame is determined using three key points (a top-left corner point, a bottom-right corner point, and an internal point) and one calibration area (namely, an internal area). In FIG. 4, a large black rectangular area is a target frame formed using a top-left corner point and a bottom-right corner point, a small rectangular area (namely, a dashed-line rectangular frame in FIG. 4) is a calibration area, a black dot in the small rectangular area represents an internal point, and black dots at a top-left corner and a bottom-right corner of the large black rectangular area respectively represent a top-left corner point and a bottom-right corner point. It should be understood that the electronic device may alternatively determine one target frame using one calibration area and three key points: a bottom-right corner point, a top-left corner point, and an internal point. Because the two manners of determining the target frame are the same, the following only uses the top-left corner point and the bottom-right corner point as an example for description. The internal point and the internal area may be any key point in the target frame and a corresponding area. The three key points are feature points extracted from the image. In this embodiment of this application, the electronic device may perform a plurality of types of processing such as a convolution operation, pooling, and batch normalization (BN) on an input image, to obtain top-left corner points, bottom-right corner points, and internal points in the input image, and then generate a target frame. The electronic device corresponds to the foregoing execution device. In this application, the electronic device means an execution device, namely, an execution body of the target detection method.

In actual application, the calibration area may be any area in the target frame, and the calibration area may be correspondingly set based on an actual target detection task. In other words, the electronic device may predefine a position and a size of the calibration area in the target frame. In an unlimited application scenario, a central point has a best comprehensive performance effect. Therefore, in this embodiment of this application, a central point and a central area are used as an example for description. If the target frame is accurate, a probability that the central point can be detected in the central area of the target frame is very high, and vice versa. Therefore, the electronic device may generate the target frame in the following manner: first generating an initial target frame using two corner points: a top-left corner point and a bottom-right corner point, defining one central area for each initial target frame, and then determining whether the central area of each initial target frame includes a central point, if yes, keeping the target frame, and if no, deleting the target frame. In this embodiment of this application, it is determined whether a central area of each target frame includes a central point, so that a network can have a capability of sensing internal information of the target frame at very low costs, and therefore, an erroneous target frame can be effectively removed.

The following further describes in detail, in Embodiment 1, how the training device 120 obtains the target model/rule 101 based on training data, in other words, how to obtain, through training based on training data, a convolutional neural network used to implement the target detection method provided in the embodiments of this application.

Embodiment 1

Figure 5:
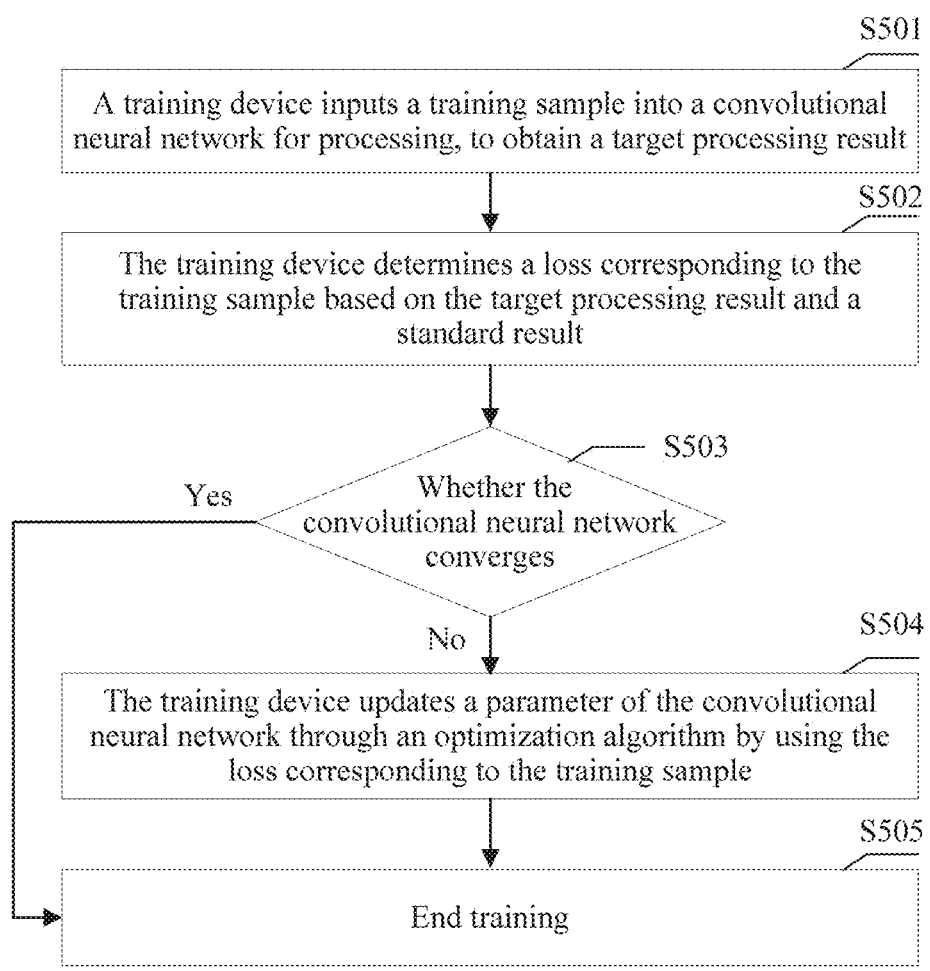
FIG. 5 is a training method for a convolutional neural network according to an embodiment of this application.

FIG. 5 is a training method 500 for a convolutional neural network according to Embodiment 1 of this application. The method may include the following steps.

S501. A training device inputs a training sample into a convolutional neural network for processing, to obtain a target processing result.

The target processing result includes a first corner heatmap, a second corner heatmap, an embedding vector map, a first offset matrix, a second offset matrix, a reference key point heatmap, and a third offset matrix, the first corner heatmap is used to represent a position and a category of each top-left corner point in the training sample, the second corner heatmap is used to represent a position and a category of each bottom-right corner point in the training sample, the embedding vector map is used to represent a matching status between each top-left corner point and each bottom-right corner point, the first offset matrix is used to represent an offset value lost when the training sample is mapped to the first corner heatmap, the second offset matrix is used to represent an offset value lost when the training sample is mapped to the second corner heatmap, the reference key point heatmap is used to represent a position and a category of each key point in the training sample, and the third offset matrix is used to represent an offset value lost when the training sample is mapped to the reference key point heatmap. The embedding vector map includes a first embedding vector map and a second embedding vector map.

Figure 6A:
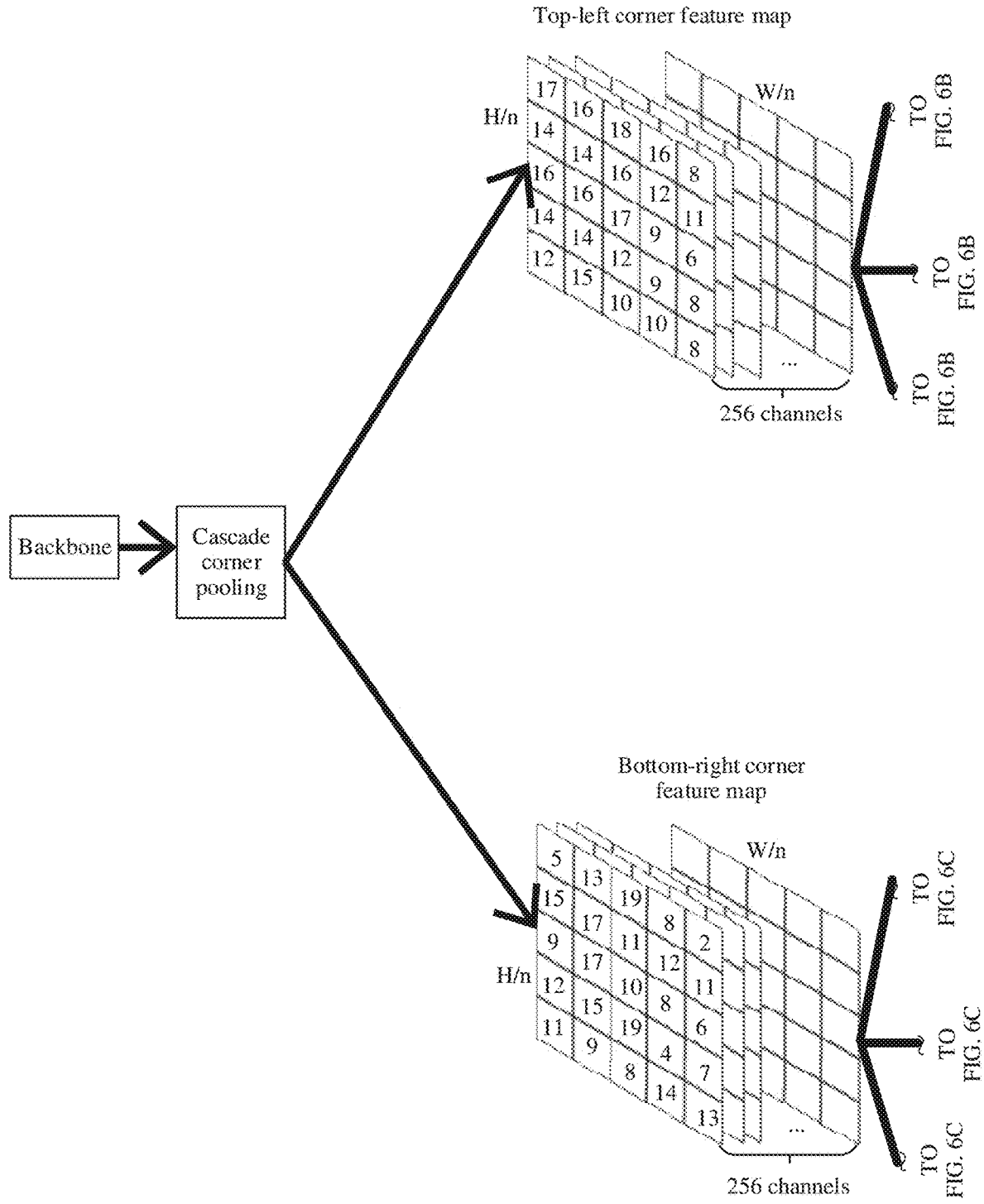
FIG. 6A, FIG. 6B, and FIG. 6C are a schematic diagram of a process in which a training sample is processed to obtain a corner heatmap, an embedding vector map, and an offset matrix according to an embodiment of this application.
Figure 6B:
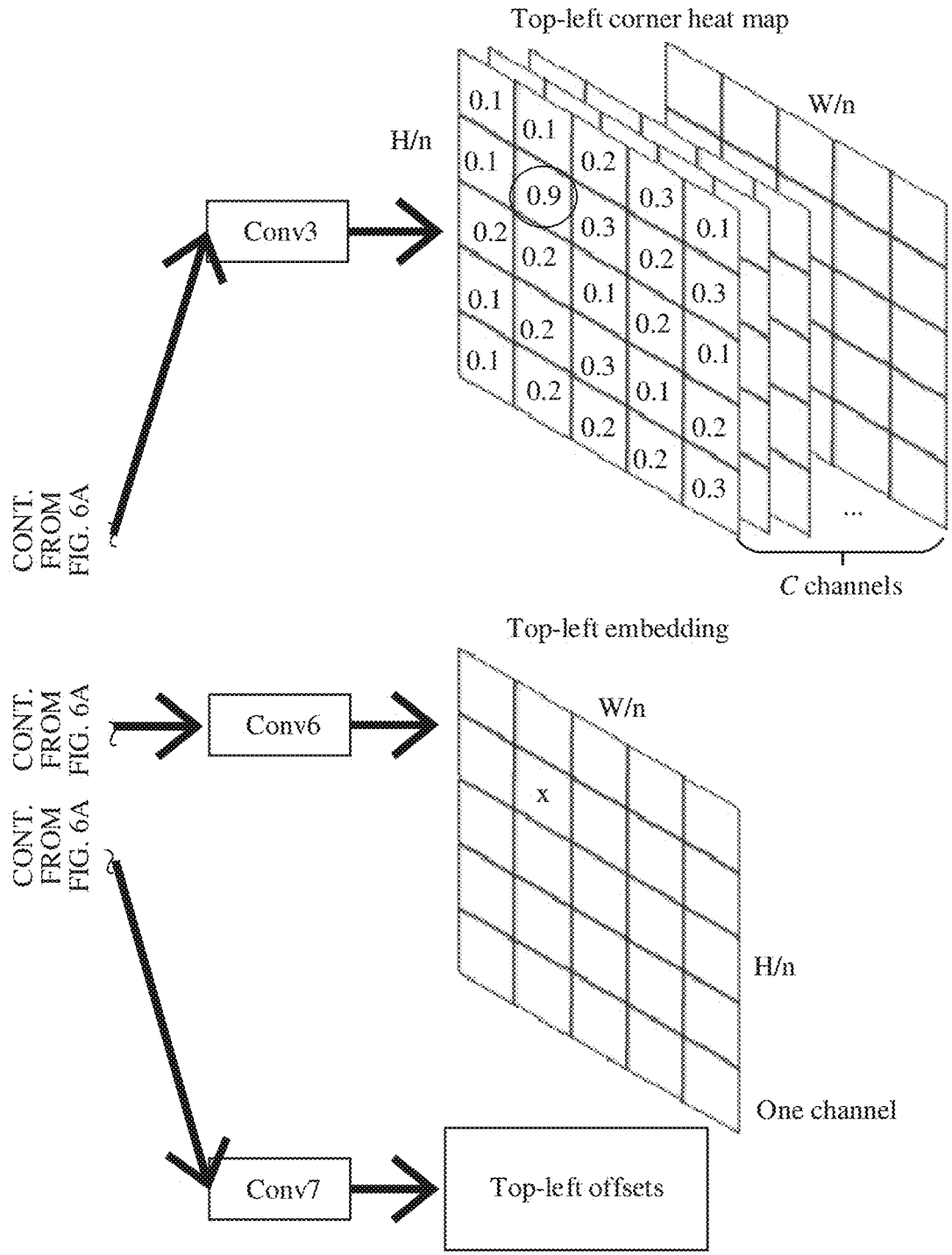
Figure 6C:
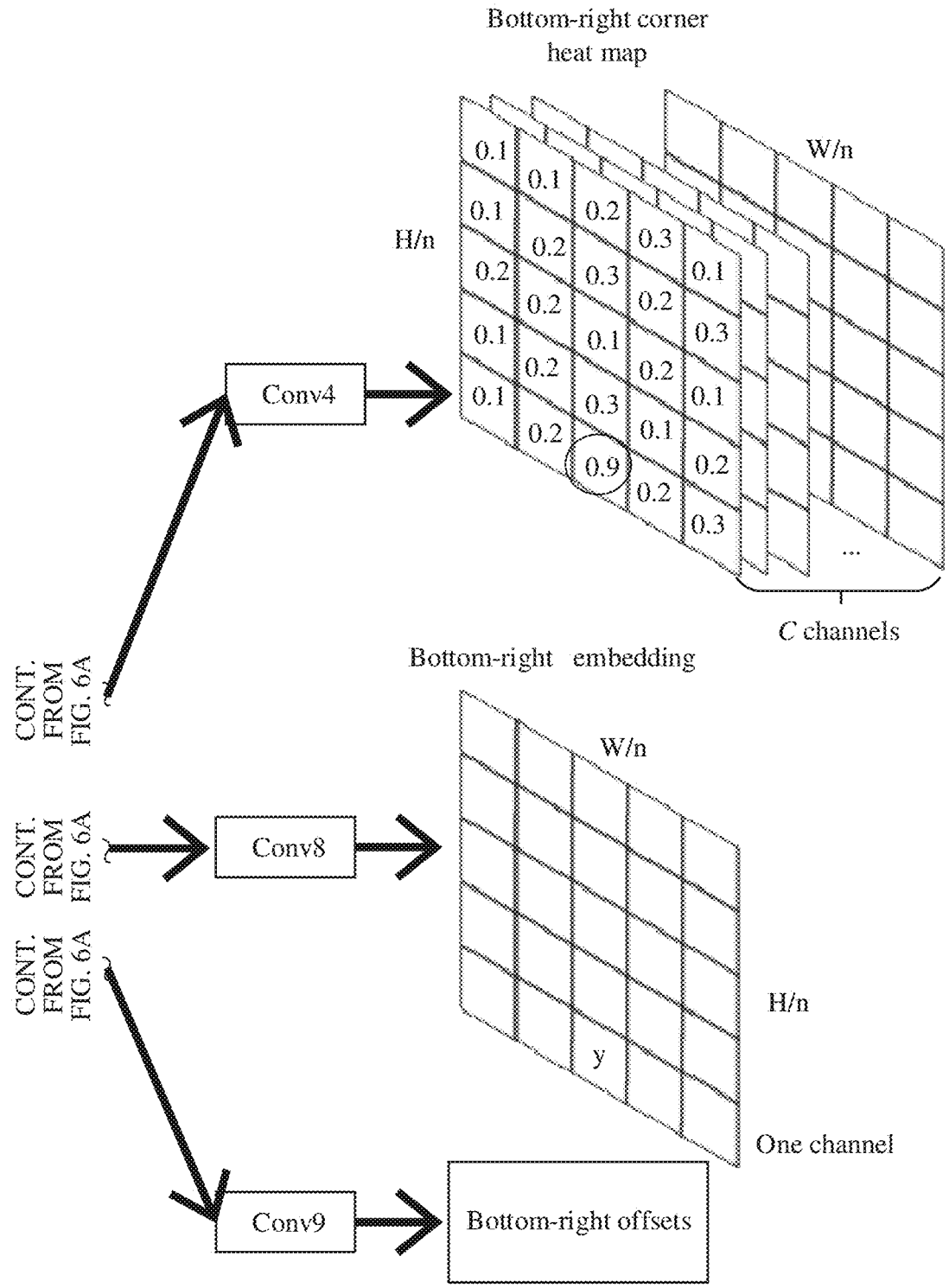

The first corner heatmap and the second corner heatmap may be a top-left corner heatmap and a bottom-right corner heatmap, and the first corner heatmap and the second corner heatmap predict a category and position of each of a top-left corner point and a bottom-right corner point in the training sample. FIG. 6A, FIG. 6B, and FIG. 6C are a schematic diagram of a process in which a training sample is processed to obtain a corner heatmap, an embedding vector map, and an offset matrix according to an embodiment of this application. In FIG. 6A, FIG. 6B, and FIG. 6C, a top-left corner heatmap is the first corner heatmap, a bottom-right corner heatmap is the second corner heatmap, a top-left embedding vector map is the first embedding vector map, a bottom-right embedding vector map is the second embedding vector map, a top-left offset matrix is the first offset matrix, a bottom-right offset matrix is the second offset matrix, Conv3, Conv6, Conv7, Conv4, Conv8, and Conv9 represent different convolution processing, and n is a scaling multiple of a corner heatmap with respect to an input image. As shown in FIG. 6A, FIG. 6B, and FIG. 6C, a backbone network (Backbone) of a convolutional neural network performs feature extraction on the input image to obtain an initial feature map, performs corner pooling or cascade corner pooling on the initial feature map to obtain a first corner feature map and a second corner feature map, separately performs different convolution processing on the first corner feature map to obtain a first corner heatmap, a first embedding vector map, and a first offset matrix, and separately performs different convolution processing on the second corner feature map to obtain a second corner heatmap, a second embedding vector map, and a second offset matrix. FIG. 6A, FIG. 6B, and FIG. 6C show a structure of a corner heatmap, each corner heatmap is one three-dimensional matrix with a size of $$C \times \frac{H}{n} \times \frac{W}{n},$$

C is a total quantity of categories (a quantity of corresponding channels), W is a width of the training sample (namely, the input image), H is a height of the training sample, and n is a multiple of scaling down a size $$\left(C_i, \frac{H_i}{n}, \frac{W_i}{n}\right)$$

in of the training sample to a size of the corner heatmap. An element at a position in the corner heatmap represents a confidence level, the confidence level represents a probability that the element at the position $$\left(C_i, \frac{H_i}{n}, \frac{W_i}{n}\right)$$

in the corner heatmap is a top-left corner point or a bottom-right corner point, and a category of the corner point is $C_i$. In FIG. 6A, FIG. 6B, and FIG. 6C, a corner heatmap includes C channels, each channel corresponds to one category, and there are a total of C categories. In this application, a corner point may be a top-left corner point and a bottom-right corner point, or may be a top-right corner point and a bottom-left corner point. In this application, the corner heatmap may be a top-left corner heatmap and a bottom-right corner heatmap, or may be a top-right corner heatmap and a bottom-left corner heatmap.

Each corner point has one corresponding embedding vector (Embedding), and a distance between a top-left corner point and a bottom-right corner point may be calculated using an embedding vector map (Embeddings). The embedding vector map is used to represent a similarity between corner points belonging to a same object. Optionally, a length and a width of the first embedding vector map are the same as those of the first corner heatmap, and a length and a width of the second embedding vector map are the same as those of the second corner heatmap. For example, both the first corner heatmap and the second corner heatmap are three-dimensional matrices:

$$C \times \frac{H}{n} \times \frac{W}{n},$$

both the first embedding vector map and the second embedding vector map are two-dimensional matrices:

$$\frac{H}{n} \times \frac{W}{n},$$

an element at an $s^{th}$ row and a $t^{th}$ column on any channel in the first corner heatmap corresponds to an element at an $s^{th}$ row and a $t^{th}$ column in the first embedding vector map, and an element at an $s^{th}$ row and a $t^{th}$ column on any channel in the second corner heatmap corresponds to an element at an $s^{th}$ row and a $t^{th}$ column in the second embedding vector map, where s and t are integers greater than 0. Optionally, the training device sets a threshold. If a distance between two embedding vectors corresponding to two corner points is less than the threshold, it indicates that the top-left corner point and the bottom-right corner point belong to a same object, and therefore, a target frame may be formed. If the distance between the two embedding vectors is greater than the threshold, it indicates that the top-left corner point and the bottom-right corner point do not belong to a same object, and therefore, a target frame cannot be formed. FIG. 6A, FIG. 6B, and FIG. 6C further show a relationship between a corner heatmap and an embedding vector map. For example, the electronic device needs to determine whether two corner points (one top-left corner point and one bottom-right corner point) belong to a same object. Specifically, "x" corresponding to the top-left corner point in a top-left embedding vector map (Top-left embedding) and "y" corresponding to the bottom-right corner point in a bottom-right embedding vector map (Bottom-right embedding) are obtained. The two vectors may be respectively considered as projection, in multidimensional feature space, obtained after a series of convolution operations are performed on the top-left corner point and the bottom-right corner point. An embedding distance between the two corner points indicates whether the two corner points belong to a same object, and a smaller distance may indicate a larger possibility that the two corner points belong to a same object.

Figure 7A:
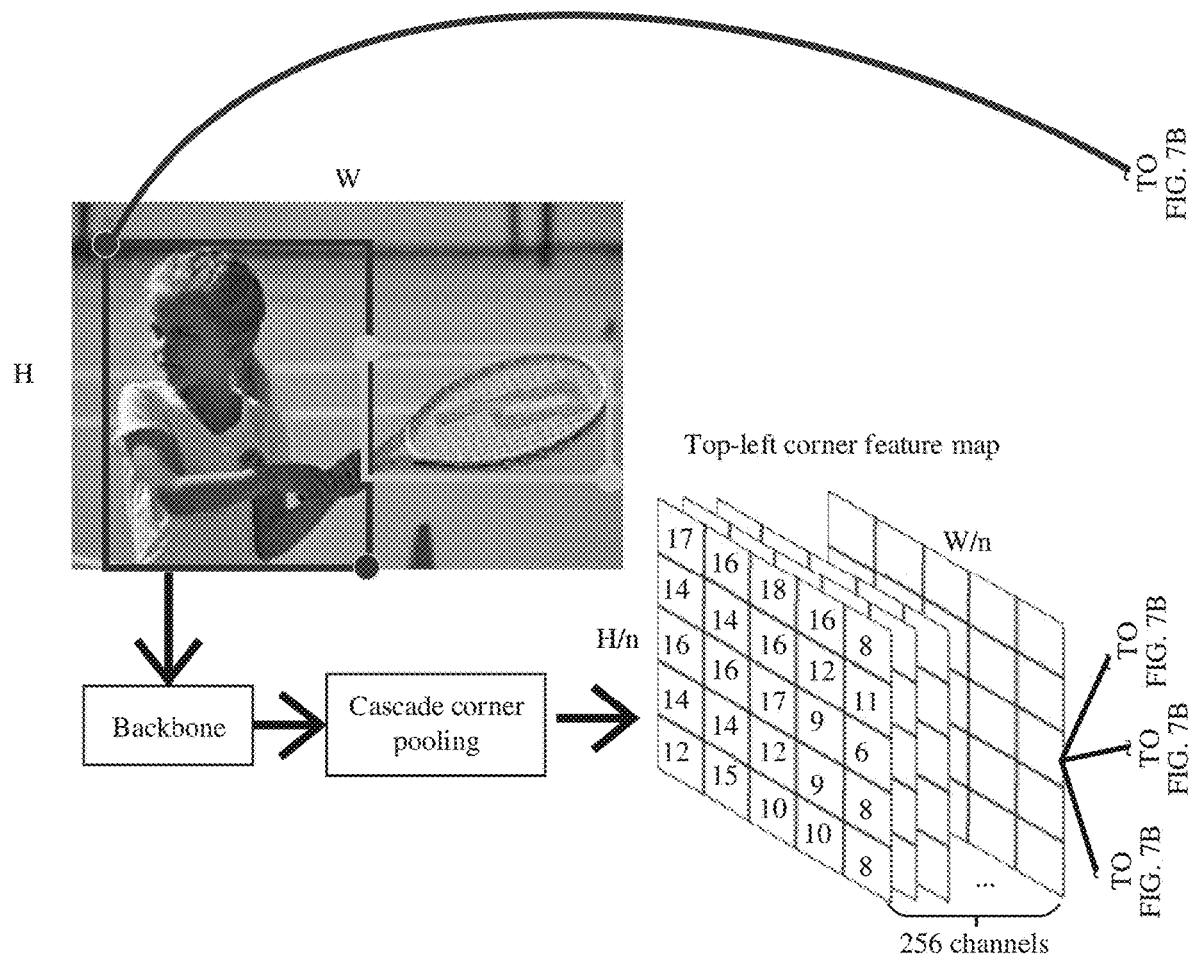
FIG. 7A and FIG. 7B are another schematic diagram of a process in which a training sample is processed to obtain a corner heatmap, an embedding vector map, and an offset matrix according to an embodiment of this application.
Figure 7B:
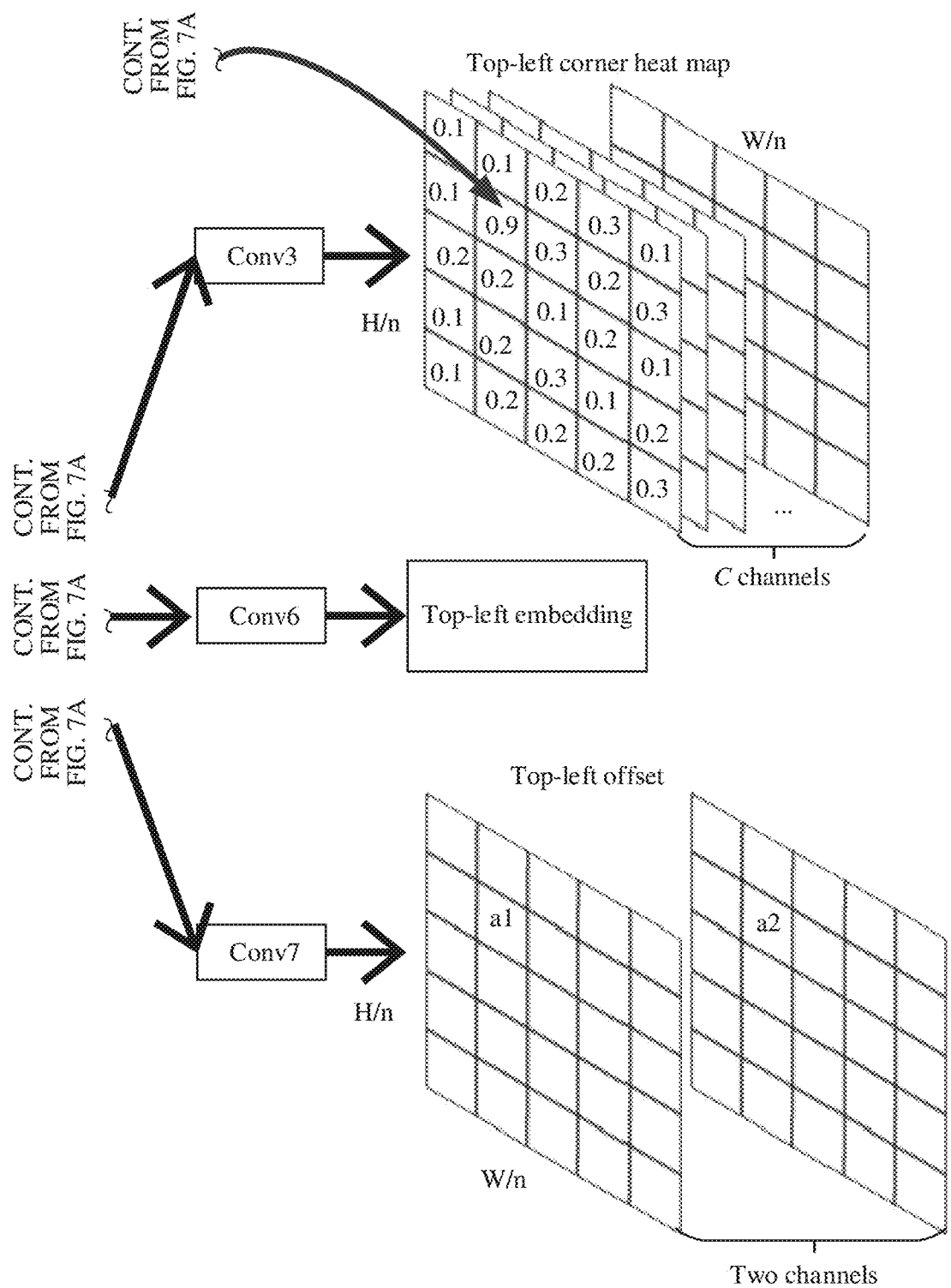

The first offset matrix (offsets) represents information lost when the input image is mapped to the first corner heatmap, and when a corner point position is remapped to the input image from the first corner heatmap, the lost information may be compensated for. The second offset matrix represents information lost when the input image is mapped to the second corner heatmap, and when a corner point position is remapped to the input image from the second corner heatmap, the lost information may be compensated for. The third offset matrix represents information lost when the input image is mapped to the reference key point corner heatmap, and when a key point position is remapped to the input image from the reference key point corner heatmap, the lost information may be compensated for. Optionally, the first corner heatmap and the first offset matrix are of a same length and width, but are of different channel dimensions. The second corner heatmap and the second offset matrix are of a same length and width, and elements with same coordinates are in a one-to-one correspondence. The reference key point corner heatmap and the third offset matrix are of a same size, but are of different channel dimensions. For example, both the first corner heatmap and the second corner heatmap are three-dimensional matrices:

$$C \times \frac{H}{n} \times \frac{W}{n},$$

the first onset matrix, the second offset matrix, and the third offset matrix are all three-dimension matrices:

$$2 \times \frac{H}{n} \times \frac{W}{n},$$

and an element at an $s^{th}$ row and a $t^{th}$ column on any channel in the first corner heatmap corresponds to a first element at an $s^{th}$ row and a $t^{th}$ column on a first channel of the first offset matrix and a second element at an 5th row and a $t^{th}$ column on a second channel of the second offset matrix. In other words, an offset corresponding to an element at an $s^{th}$ row and a $t^{th}$ column on any channel in the first corner heatmap is (the first element, the second element). It should be understood that both a correspondence between the second corner heatmap and the second offset matrix and a correspondence between the third corner heatmap and the third offset matrix are the same as a correspondence between the first corner heatmap and the first offset matrix. FIG. 7A and FIG. 7B are another schematic diagram of a process in which a training sample is processed to obtain a corner heatmap, an embedding vector map, and an offset matrix according to an embodiment of this application. FIG. 7A and FIG. 7B show a relationship between an input image, a corner heatmap, and an offset matrix. As shown in FIG. 7A and FIG. 7B, a position at which the top-left corner point of the input image is mapped in the top-left corner heatmap is a position of 0.9 at which an arrow in FIG. 7A and FIG. 7B points, and offsets corresponding to the position are a1 and a2. The offset matrix includes two channels. Prediction of a corner point is performed on a corner heatmap. After the corner point prediction is completed, a position of the corner point is finally remapped to the input image. There is a proportional scaling relationship between a size of the input image and a size of the corner heatmap, and information is lost when the input image is mapped to the corner heatmap. As shown in FIG. 7A and FIG. 7B, when there is a quadruple scaling relationship between the size of the input image and the size of the corner heatmap, a position (102, 102) in the input image is mapped to the corner heatmap at coordinates $(\lfloor 102/4 \rfloor, \lfloor 102/4 \rfloor) = (25, 25)$, and if compensation is not performed, the coordinates are remapped to the input image at $(25 \times 4, 25 \times 4) = (100, 100)$. Therefore, the convolutional neural network needs to predict the offset to compensate for the lost information. "[v]" represents performing rounding down on v. For example, if an offset corresponding to coordinates in the corner heatmap is offset=(a1, a2), coordinates obtained by remapping from the corner heatmap to the input image become (25+a1, 25+a2). Likewise, prediction of a key point (for example, a central point) is performed on a key point heatmap. After the key point prediction is completed, to enable a position of the key point to be finally remapped to the input image, the third offset matrix needs to be used to compensate for a position to which the position of the key point is mapped in the input image. It should be understood that the electronic device may map the corner heatmap and the key point heatmap to the input image in a similar manner.

Figure 8:
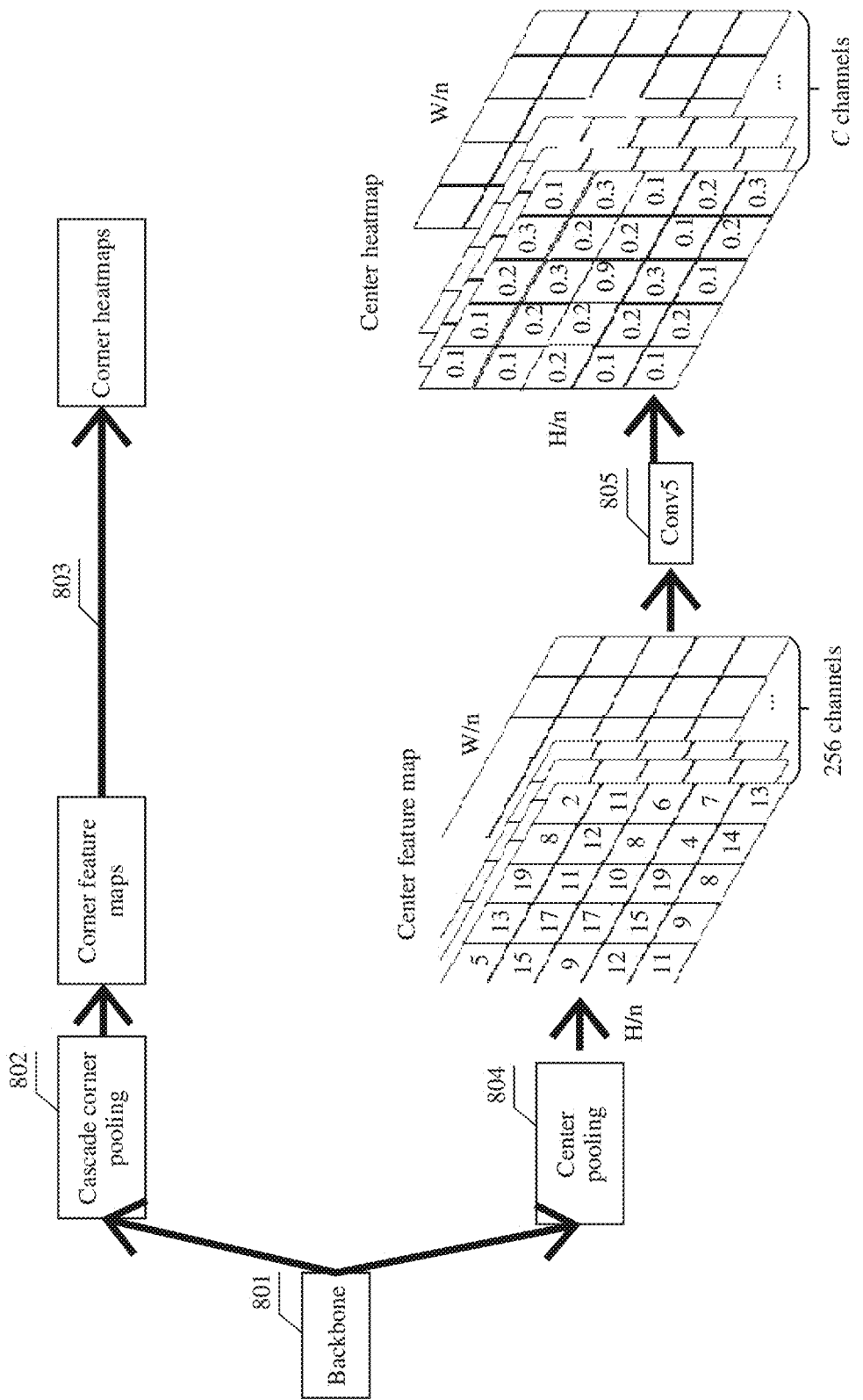
FIG. 8 is a schematic diagram of a process in which a training sample is processed to obtain a corner heatmap and a key point heatmap according to an embodiment of this application.

The reference key point heatmap is a heatmap obtained by the training device by performing key point feature extraction processing on the training sample. The reference key point heatmap and the corner heatmap are of a same size. FIG. 8 is a schematic diagram of a process in which a training sample is processed to obtain a corner heatmap and a key point heatmap according to an embodiment of this application. As shown in FIG. 8, a processing process of step 801 to step 803 corresponds to a process of obtaining a corner heatmap through processing in FIG. 6A, FIG. 6B, and FIG. 6C. Details are not described herein again. Step 801 is performing feature extraction processing on the training sample to obtain an initial feature map, step 804 is performing center pooling on the initial feature map to obtain a key point feature map, and step 805 is performing convolution processing (Conv5 in FIG. 8) on the key point feature map to obtain a key point heatmap. Subsequently, implementations of step 804 and step 805 are further described. Details are not described herein temporarily.

S502. The training device determines a loss corresponding to the training sample based on the target processing result and a standard result.

The standard result (also referred to as a real result) is a processing result expected to be obtained by processing the training sample using the convolutional neural network. The training device may calculate a loss value corresponding to the training sample using a loss function corresponding to a target detection task performed using the convolutional neural network. As described in the foregoing basic concepts, the loss function defines "how to compare the predicted value and the target value", in other words, the loss function is an important equation used to measure the difference between the predicted value and the target value. In this embodiment of this application, the target processing result of the training sample corresponds to the predicted value, and the standard result of the training sample corresponds to the target value. A higher output value (loss) of the loss function indicates a larger difference between the target detection result and the standard result, and therefore, training for the convolutional neural network becomes a process of reducing the loss as much as possible.

The standard result includes a first standard corner heatmap, a second standard corner heatmap, a first standard offset matrix, a second standard offset matrix, a standard key point heatmap, and a third standard offset matrix, the first standard corner heatmap is used to represent a real position and category of each top-left corner point, the second standard corner heatmap is used to represent a real position and category of each bottom-right corner point, the first standard offset matrix is used to represent a real offset value lost when the training sample is mapped to the first corner heatmap, the second standard offset matrix is used to represent a real offset value lost when the training sample is mapped to the second corner heatmap, the standard key point heatmap is used to represent a real position and category of each key point, and the third standard offset matrix is used to represent a real offset value lost when the training sample is mapped to the standard key point heatmap.

Optionally, an implementation in which the training device determines a loss corresponding to the training sample based on the target processing result and a standard result is: calculating a first loss representing a difference between the first corner heatmap and the first standard corner heatmap, calculating a second loss representing a difference between the second corner heatmap and the second standard corner heatmap, calculating a third loss based on the embedding vector map and a score loss function, where the score loss function is used to make a distance between vectors of a pair of corner points belonging to a same category as small as possible and make a distance between vectors of corner points belonging to different categories as large as possible, calculating a fourth loss representing a difference between the first offset matrix and the first standard offset matrix, calculating a fifth loss representing a difference between the second offset matrix and the second standard offset matrix, calculating a sixth loss representing a difference between the third offset matrix and the third standard offset matrix, calculating a seventh loss representing a difference between the reference key point heatmap and the standard key point heatmap, and using a weighted sum of the first loss to the seventh loss as the loss corresponding to the training sample. The following describes how to calculate the loss corresponding to the training sample using the loss function.

Optionally, the loss function corresponding to the target detection task performed by the convolutional neural network is:

$$L = AL_{det} + BL_{cor} + CL_{pull} + DL_{push} + EL_{off1} FL_{off2} \quad (1),$$ where A, B, C, D, E, and F are all constant items (that is, weight factors), $L_{det}$ is a loss (corresponding to a sum of a first loss and a second loss) between a corner heatmap obtained by processing the training device by the training device and a standard corner heatmap, $L_{cor}$ is a loss (corresponding to a seventh loss) between a reference key point heatmap and a standard key point heatmap, $L_{pull}$ and $L_{push}$ correspond to a score loss function, $L_{off1}$ is a sum (corresponding to a sum of a fourth loss and a fifth loss) of a loss between the first offset matrix and the first standard offset matrix and a loss between the second offset matrix and the second standard offset matrix, and $L_{off2}$ is a loss (corresponding to a sixth loss) between the third offset matrix and the third standard offset matrix.

During training, it is assumed that $\hat{p}_{cij}$ is a confidence level of a corner point with a position (i, j) in a corner heatmap, and a category of the corner point is C (namely, this position is on a $C^{th}$ channel). It is additionally assumed that $y_{cij}$ is ground-truth (namely, a real confidence level), and complies with Gaussian distribution using (i, j) as a center.

Optionally, $$L_{det} = \frac{-1}{N} \sum_{c=1}^{C} \sum_{i=1}^{H} \sum_{j=1}^{W} \begin{cases} (1-\hat{p}_{cij})^{\alpha} \log(\hat{p}_{cij}), & \text{if } y_{cij} = 1 \\ (1-y_{cij})^{\beta} (\hat{p}_{cij})^{\alpha} \log(1-\hat{p}_{cij}), & \text{otherwise} \end{cases} \quad (2)$$

where

C is a quantity of channels (namely, a total quantity of categories), H is a height of the input image, W is a width of the input image, N is a quantity of objects in the input image, both $\alpha$ and $\beta$ are hyperparameters, for example, $\alpha=2$ and $\beta=4$, $y_{cij}$ is a real label of a position (i, j) in a corner heatmap, and the label may be processed using a non-normalized Gaussian function.

During training, to implement the foregoing training objective, a constraint needs to be added (corresponding to $L_{pull}$), so that an embedding distance between a pair of corner points belonging to a same object is as small as possible, and a further constraint (corresponding to $L_{push}$) is added, so that an embedding distance between corner points belonging to different objects is as large as possible. Embedding losses include a pull loss for pulling corner points of a same category and a push loss for push corner points of different categories. The following is mainly implemented: A score of a same category is learned to approach an average score, and a distance between scores of different categories is learned to be greater than or equal to 1.

Optionally, $$L_{pull} = \frac{1}{N} \sum_{k=1}^{N} [(e_{tk} - e_k)^2 + (e_{bk} - e_k)^2]. \quad (3)$$

Optionally $$L_{push} = \frac{1}{N(N-1)} \sum_{k=1}^{N} \sum_{j=1, j \neq k}^{N} \max(0, \Delta - |e_k - e_j|). \quad (4)$$

N is a quantity of objects in the input image, $e_{tk}$ represents a score of a top-left object k, $e_{bk}$ represents a score of a bottom-right object k, $e_k$ represents an average of $e_{tk}$ and $e_{bk}$, and $\Delta$ is a margin, and may be 1 herein, or may be another value.

Optionally, $$L_{off1} = \frac{1}{N} \sum_{k=1}^{N} SmoothL1Loss(o_k, \overline{o_k}), \quad (5)$$

where $$o_k = \left( \frac{x_k}{n} - \left\lfloor \frac{x_k}{n} \right\rfloor, \frac{y_k}{n} - \left\lfloor \frac{y_k}{n} \right\rfloor \right)$$

is ground-truth (namely, the first standard offset matrix or the second standard offset matrix), $o_k$ is a real offset value of coordinates $(x_k, y_k)$ in the input image, and $\overline{o_k}$ is a predicted offset value (namely, the first offset matrix or the second offset matrix). $L_{off2}$ is similar to $L_{off1}$. For $L_{off2}$, $o_k$ is the third standard offset matrix, and $o_k$ is the third offset matrix.

S503. The training device determines whether the convolutional neural network converges.

If yes, S505 is performed. Otherwise, S504 is performed. That the training device determines whether the convolutional neural network converges may be determining whether a quantity of times of updating a parameter of the convolutional neural network, namely, a quantity of times of performing 5404, reaches an iteration threshold, or determining whether a loss value of the convolutional neural network is less than a loss threshold. The loss value of the convolutional neural network is an error that is between the target detection result output by the convolutional neural network and the standard result and that is obtained by the training device through calculation using the loss function of the convolutional neural network. For different training tasks of the training device, loss functions of the convolutional neural network are different. The iteration threshold may be a quantity of iteration times preset by the training device, for example, 10,000 or 20,000. The loss threshold may be preset by the training device, for example, 0.5, 0.05, or 0.005. If the difference between the image processing result output by the convolutional neural network and the standard result is less than the loss threshold, training is ended.

S504. The training device updates a parameter of the convolutional neural network through an optimization algorithm using the loss corresponding to the training sample.

The training device may update the parameter of the convolutional neural network through a back propagation algorithm using the obtained loss value. For example, the parameter of the convolutional neural network is updated through a stochastic gradient descent algorithm using the loss value corresponding to the training sample. It should be understood that after the loss corresponding to the training sample is obtained, the training device may update the parameter of the convolutional neural network in a plurality of manners. Details are not described herein. Optionally, before performing step S501, the training device may initialize the convolutional neural network. Initializing the convolutional neural network includes initializing parameters of convolution kernels of convolution layers of the convolutional neural network and parameters of other layers (for example, a pooling layer, a convolutional neural network layer, and a fully connected layer). The training device may initialize the convolutional neural network using any initialization method, for example, using a method such as Gaussian distribution random sampling or uniform distribution random sampling.

S505. End training.

The training method in FIG. 5 may be specifically performed by the training device 120 shown in FIG. 2. The input image (namely, the training sample) in the method 500 may be the training data maintained in the database 130 shown in FIG. 2. Optionally, before S501 is performed, image preprocessing may be performed on the training sample, and the training sample processed in S501 is a training sample obtained after the image preprocessing. An image preprocessing operation on the training sample may be performed in the training device 120, or may be performed in advance by another function module before the training sample is input into the training device 120, in other words, image preprocessing is performed on the training sample received or obtained from the database 130, for example, in S501, to obtain a training sample obtained after the image preprocessing as an input of the training device 120, and S501 to S505 are performed by the training device 120.

Optionally, the method 500 may be processed by a CPU, or may be jointly processed by a CPU and aGPU, or may not use a GPU, but use another processor suitable for convolutional neural network calculation, which is not limited in this application.

In this embodiment of this application, a convolutional neural network that performs a target detection task based on two corner points and one key feature point may be obtained through training, and the execution device determines one target frame using three key points and one calibration area using the convolutional neural network obtained through training, so that a large quantity of erroneous detection frames can be effectively removed, thereby improving detection accuracy.

In the foregoing embodiment, a training method for obtaining, through training, a convolutional neural network used to implement a target detection task is described. The following describes a method for performing a target detection task using the convolutional neural network obtained through training.

Embodiment 2

Figure 9:
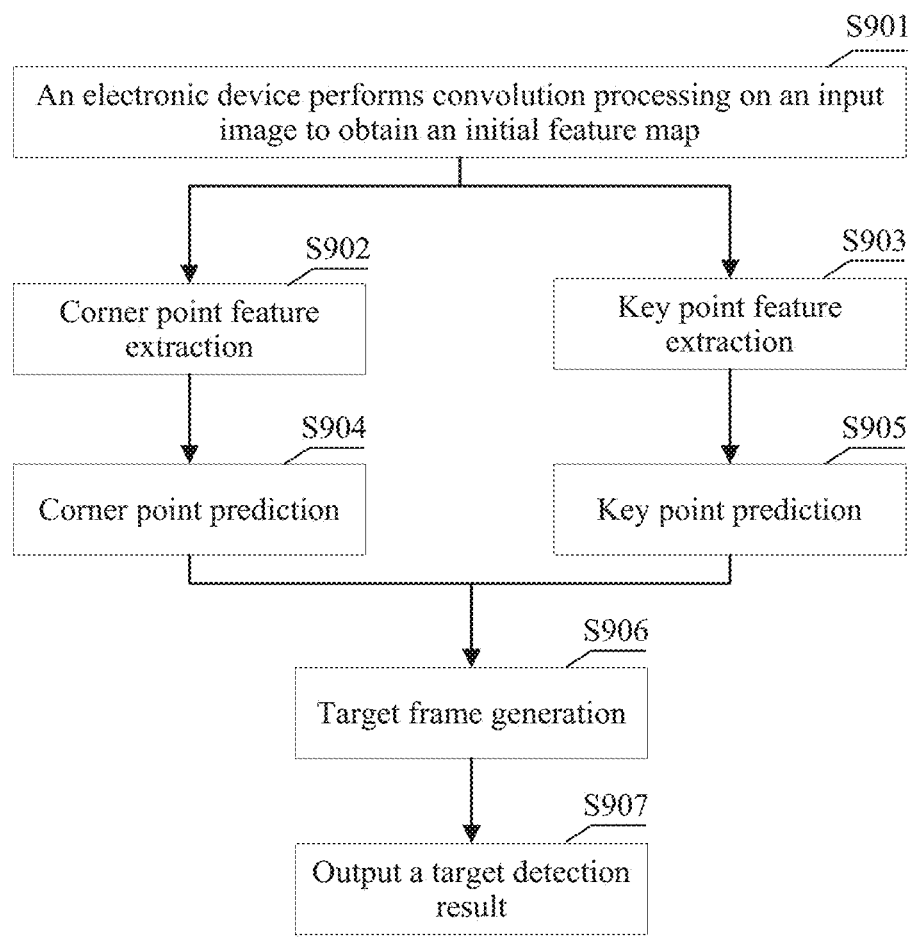
FIG. 9 is a flowchart of a target detection method according to an embodiment of this application.

FIG. 9 shows a target detection method according to Embodiment 2 of this application. The method may include the following steps.

S901. An electronic device performs convolution processing on an input image to obtain an initial feature map.

Optionally, the electronic device inputs the input image into a backbone network (Backbone) of a convolutional neural network, and performs convolution processing to obtain an initial feature map. The backbone network may be a network such as VGG 16 or Hourglass. Step S901 corresponds to processing performed by the backbone in FIG. 6A, FIG. 6B, and FIG. 6C to FIG. 8.

S902. The electronic device performs corner point feature extraction on the initial feature map to obtain a first corner feature map and a second corner feature map.

Optionally, the electronic device performs corner pooling or cascade corner pooling on the initial feature map to obtain the first corner feature map and the second corner feature map. The first corner feature map corresponds to a top-left corner feature map in FIG. 7A and FIG. 7B, and the second corner feature map corresponds to a bottom-right corner feature map in FIG. 7A and FIG. 7B. An implementation of the cascade corner pooling is described subsequently.

S903. The electronic device performs key point feature extraction on the initial feature map to obtain a key point feature map.

Optionally, the electronic device performs center pooling on the initial feature map to obtain the key point feature map. An implementation of the center pooling is described in detail subsequently. S903 corresponds to step 804 in FIG. 8.

S904. The electronic device separately performs convolution processing on the first corner feature map and the second corner feature map to obtain a first corner heatmap and a second corner heatmap.

S904 corresponds to step 803 in FIG. 8 and Conv3 and Conv4 in FIG. 6B and FIG. 6C.

S905. The electronic device performs convolution processing on the key point feature map to obtain a key point heatmap.

S905 corresponds to step 805 in FIG. 8.

S906. The electronic device generates a target frame based on the first corner heatmap, the second corner heatmap, and the key point heatmap.

Each corner heatmap is one three-dimensional matrix with a size of $$C \times \frac{H}{n} \times \frac{W}{n}.$$

An element at a position $$\left(C_i, \frac{H_i}{n}, \frac{W_i}{n}\right)$$

in the corner heatmap represents a confidence level, the confidence level represents a probability that the element at the position $$\left(C_i, \frac{H_i}{n}, \frac{W_i}{n}\right)$$

in the corner heatmap is a top-left corner point or a bottom-right corner point, and a category of the corner point is $C_i$. An element at a position $$\left(C_i, \frac{H_i}{n}, \frac{W_i}{n}\right)$$

in the first corner heatmap represents a probability (also referred to as a confidence level) that a top-left corner point is at the position, and a category of the corner point is $C_i$. An element at a position $$\left(C_i, \frac{H_i}{n}, \frac{W_i}{n}\right)$$

in the second corner heatmap represents a probability (also referred to as a confidence level) that a bottom-right corner point is at the position, and a category of the corner point is $C_i$. It may be understood that the electronic device may obtain coordinates (positions) of top-left corner points and categories corresponding to the top-left corner points based on the first corner heatmap, and may obtain coordinates (positions) of bottom-right corner points and categories corresponding to the bottom-right corner points based on the second corner heatmap. For example, coordinates that are in the first corner heatmap and that correspond to a probability that exceeds a first threshold are used as coordinates of a top-left corner point, coordinates that are in the second corner heatmap and that correspond to a probability that exceeds the first threshold are used as coordinates of a bottom-right corner point. The first threshold may be 0.6, 0.75, 0.8, 0.9, or the like. The electronic device may determine the top-left corner point and/or the bottom-right corner point based on the corner heatmaps in a plurality of manners. This is not limited in this embodiment of this application.

Optionally, before performing step S906, the electronic device performs convolution processing on a first corner point feature map (corresponding to Conv6 in FIG. 6B) to obtain a first embedding vector map (corresponding to top-left embedding in FIG. 6B), and performs convolution processing on a second corner point feature map to obtain a second embedding vector map (corresponding to bottom-right embedding in FIG. 6A). In actual application, after obtaining the first corner heatmap and the second corner heatmap, the electronic device may combine, in a pairwise manner, a top-left corner point and a bottom-right corner point belonging to a same object (category) to obtain a plurality of groups of corner point pairs. The electronic device may determine, using an embedding vector map, whether two corner points belong to a same category. Optionally, the electronic device sets a threshold. If a distance between an embedding vector corresponding to a top-left corner point in the first embedding vector map and an embedding vector corresponding to a bottom-right corner point in the second embedding vector map is less than the threshold, it indicates that the top-left corner point and the bottom-right corner point belong to a same category, and therefore, a target frame may be formed. If the distance between the embedding vectors is greater than the threshold, it indicates that the top-left corner point and the bottom-right corner point do not belong to a same category, and therefore, a target frame cannot be formed. FIG. 6A, FIG. 6B, and FIG. 6C further show a correspondence between a corner heatmap and an embedding vector map. As shown in FIG. 6A, FIG. 6B, and FIG. 6C, an element in an ellipse in the first corner heatmap corresponds to one top-left corner point, an embedding vector corresponding to the top-left corner point in the first embedding vector map is x, an element in an ellipse in the second corner heatmap corresponds to one bottom-right corner point, and an embedding vector corresponding to the bottom-right corner point in the second embedding vector map is y. The electronic device may calculate a distance between the embedding vector x and the embedding vector y. If the distance between the embedding vector x and the embedding vector y is greater than a threshold, it indicates that the top-left corner point and the bottom-right corner point do not belong to a same category. Otherwise, it indicates that the top-left corner point and the bottom-right corner point belong to a same category.

That the electronic device generates a target frame based on the first corner heatmap, the second corner heatmap, and the key point heatmap may include: obtaining corner points corresponding to a same category in the first corner heatmap and the second corner heatmap, to obtain a pair of target corner points, and when a calibration area in the target frame corresponding to two corner points in the pair of target corner points includes a target feature point, keeping the target frame, or when the calibration area does not include the target feature point, removing the target frame. The target feature point is included in the key feature points, and the target feature point and the two corner points in the pair of target corner points correspond to a same category. It should be understood that if the calibration area includes at least one key feature point corresponding to the target category, the target frame is kept. Otherwise, the target frame is removed. In actual application, the electronic device may obtain corner points corresponding to a same category in the first corner heatmap and the second corner heatmap, to obtain a plurality of pairs of corner points, obtain one target frame for each pair of corner points, and determine whether a calibration area in each target frame includes at least one key feature point with a same category as that corresponding to the target frame, and if yes, output a target detection result, and if no, remove the target frame. The following describes how to determine the calibration area in the target frame.

S907. The electronic device outputs the target detection result.

The target detection result includes at least one of position information of the target frame, a category corresponding to the target frame, and a confidence level of the target frame. The position information of the target frame may be coordinates of two corner points in the pair of target corner points. The category corresponding to the target frame may be categories of the two corner points corresponding to the target frame. The foregoing pair of target corner points is used as an example, a confidence level of the target frame obtained for the pair of target corner points may be a weighted sum of confidence levels of the two corner points in the pair of target corner points and a confidence level of the target feature point. For example, a confidence level of a top-left corner point in the pair of target corner points is 0.7, a confidence level of a bottom-right corner point is 0.8, the confidence level of the target feature point is 0.9, and the confidence level of the target frame is (0.7+0.8+0.9)/3=0.8. Optionally, before performing step S803, the electronic device may perform key point feature extraction processing on the input image to obtain a position, a category, and a confidence level of each key feature point in the input image. The target feature point is included in the key feature points. Optionally, referring to FIG. 8, an implementation in which the electronic device performs key point feature extraction processing on the input image to obtain a position, a category, and a confidence level of each key feature point in the input image is: performing convolution processing on the input image to obtain an initial feature map, performing center pooling processing (namely, Center Pooling) on the initial feature map to obtain the key point feature map (namely, Center Pooling), performing convolution processing (namely, Conv5) on the key point feature map to obtain the key point heatmap (namely, Center heatmap), and mapping coordinates corresponding to the key feature points in the key point heatmap to the input image to obtain the positions and the categories of the key feature points in the input image. The key point heatmap may be one three-dimensional matrix with a size of $$C \times \frac{H}{n} \times \frac{W}{n}.$$

An element at a position $$\left(C_i, \frac{H_i}{n}, \frac{W_i}{n}\right)$$

in the key point heatmap represents a confidence level, the confidence level represents a probability (namely, a confidence level) that the element at the position $$\left(C_i, \frac{H_i}{n}, \frac{W_i}{n}\right)$$

in the key point heatmap is a key feature point, and a category of the key feature point is $C_i$. It may be understood that the electronic device may obtain a confidence level of each top-left corner point from the first corner heatmap, may obtain a confidence level of each bottom-right corner point from the second corner heatmap, and obtain a confidence level of each key feature point from the key point heatmap, so that the confidence level of the target frame may be calculated.

Figure 10:
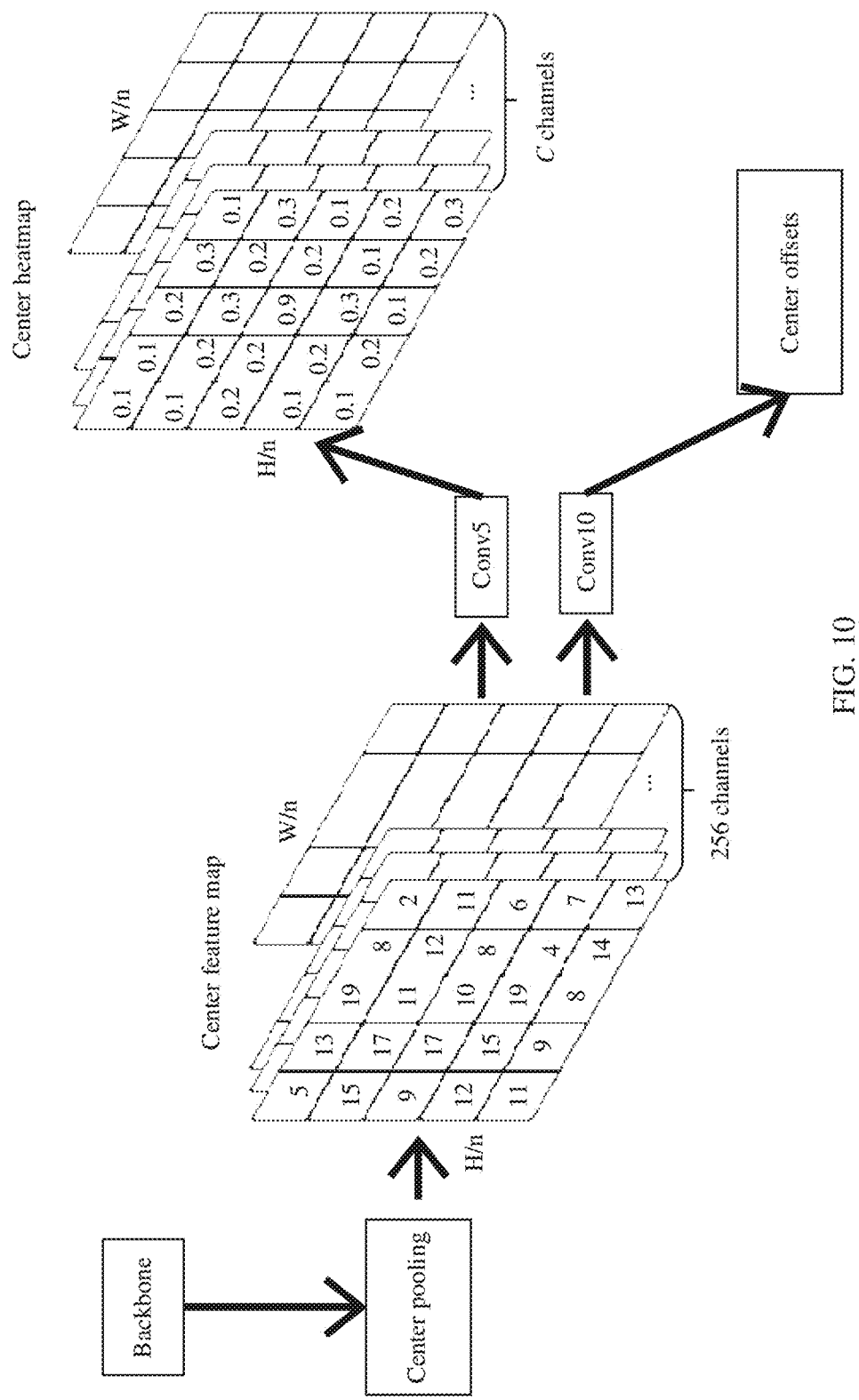
FIG. 10 is another schematic diagram of a process in which an input image is processed to obtain a key point heatmap and an offset matrix according to an embodiment of this application.

FIG. 10 is another schematic diagram of a process in which an input image is processed to obtain a key point heatmap and an offset matrix according to an embodiment of this application. As shown in FIG. 10, after obtaining the key point feature map, the electronic device may perform different convolution processing (namely, Conv5 and Conv10) on the key point feature map to obtain a key point heatmap and an offset matrix (namely, Center offsets in FIG. 10). Optionally, the electronic device may map coordinates of each key feature point in the key point heatmap to the input image based on the offset matrix corresponding to the key point heatmap. Each group of coordinates in the key point heatmap corresponds to one group of offset values in an offset matrix corresponding to the key point heatmap. The electronic device may accurately map each group of coordinates to the input image using each group of offset values corresponding to each group of coordinates. A manner in which the electronic device maps the key point heatmap to the input image may be the same as a manner in which the corner heatmap is mapped to the input image.

In this embodiment of this application, an initial target frame is first generated using two corner points: a top-left corner point and a bottom-right corner point, and then it is determined whether a central area of each initial target frame includes a key feature point. If yes, the target frame is kept, and if no, the target frame is deleted. Internal information in the target frame can be sensed at very low costs, so that an erroneous target frame can be effectively removed.

Embodiment 3

Figure 11:
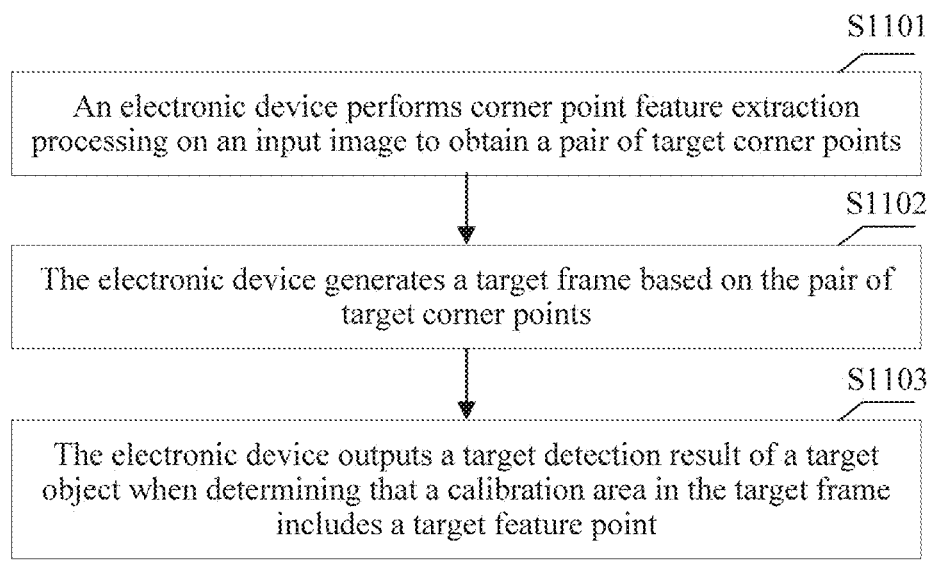
FIG. 11 is another flowchart of a target detection method according to an embodiment of this application.

FIG. 11 is a flowchart of a target detection method according to Embodiment 3 of this application. The method may include the following steps.

S1101. An electronic device performs corner point feature extraction processing on an input image to obtain a pair of target corner points.

The pair of target corner points include a first corner point and a second corner point, both the first corner point and the second corner point correspond to a target category, and the first corner point is a top-left corner point in the input image and the second corner point is a bottom-right corner point in the input image, or the first corner point is a top-right corner point in the input image and the second corner point is a bottom-left corner point in the input image.

Optionally, that an electronic device performs corner point feature extraction processing on an input image to obtain a pair of target corner points may be: performing the corner point feature extraction processing on the input image to obtain a first corner heatmap and a second corner heatmap, where the first corner heatmap is used to represent a position and a category of each top-left corner point in the input image, and the second corner heatmap is used to represent a position and a category of each bottom-right corner point in the input image, and obtaining corner points corresponding to a same category in the first corner heatmap and the second corner heatmap, to obtain the pair of target corner points. For the implementation in which the electronic device performs the corner point feature extraction processing on the input image to obtain a first corner heatmap and a second corner heatmap, refer to FIG. 6A, FIG. 6B, FIG. 6C, FIG. 7A, and FIG. 7B. Specifically, the electronic device performs first corner point feature extraction processing on the input image to obtain a first corner point feature map, where the first corner point feature map is used to represent the top-left corner points extracted from the input image, performs convolution processing on the first corner feature map to obtain the first corner heatmap, performs second corner point feature extraction processing on the input image to obtain a second corner point feature map, where the second corner point feature map is used to represent the bottom-right corner points extracted from the input image, and performs convolution processing on the second corner point feature map to obtain the second corner heatmap.

S1102. The electronic device generates a target frame based on the pair of target corner points.

That the electronic device generates a target frame based on the pair of target corner points may be generating the target frame when the pair of target corner points belong to a same category. The target frame is a rectangular frame, and the first corner point and the second corner point correspond to two vertices on a diagonal line of the target frame. That the electronic device generates a target frame based on the pair of target corner points may be generating one rectangular frame based on two corner points in the pair of target corner points, where coordinates of each corner point correspond to coordinates of one vertex of the rectangular frame, or may be generating one circular frame based on two corner points in the pair of target corner points, where a connection line between coordinates of the two corner points is a diameter of the circular frame, or may be generating another type of target frame.

S1103. The electronic device outputs a target detection result of a target object when determining that a calibration area in the target frame includes a target feature point.

The target object is included in the input image, and a category of the target object is the target category. The target object may be a person, an animal, an object, or the like. The target feature point is a feature point obtained by performing key point feature extraction processing on the input image and corresponds to the target category, the key point feature extraction processing is different from the corner point feature extraction processing, and the target detection result includes at least one of position information of the target frame, the target category, and a confidence level of the target frame. An implementation of performing the key point feature extraction processing on the input image is described in detail subsequently. Optionally, before performing step S1103, the electronic device may perform the key point feature extraction processing on the input image to obtain a position, a category, and a confidence level of each key feature point in the input image. The target feature point is included in the key feature points. Two corner points in the pair of target corner point correspond to the target category. It should be understood that if the calibration area includes at least one key feature point corresponding to the target category, the target frame is kept. Otherwise, the target frame is removed. In actual application, the electronic device may obtain corner points corresponding to a same category in the first corner heatmap and the second corner heatmap, to obtain a plurality of pairs of corner points, obtain one target frame for each pair of corner points, and determine whether a calibration area in each target frame includes at least one key feature point with a same category as that corresponding to the target frame, and if yes, output a target detection result, and if no, remove the target frame. In some embodiments, the determining that a calibration area in the target frame includes a target feature point may be: obtaining a key feature point corresponding to the target category from the key feature points, to obtain at least one key feature point, determining whether at least one key feature point located in the calibration area exists in the at least one key feature point, and if the at least one key feature point exists, determining that the calibration area includes the target feature point.

S1104. The electronic device removes the target frame when the calibration area does not include the target feature point.

In this embodiment of this application, when the calibration area in the target frame includes the target feature point, the electronic device outputs the target detection result, and when the calibration area does not include the target feature point, deletes the target frame. A large quantity of erroneous detection frames can be effectively removed, thereby improving detection accuracy.

A size of the calibration area (for example, a central area) in the target frame affects the target detection result. If the calibration area is smaller than the target frame, many small-size erroneous target frames cannot be removed. If the calibration area is greater than the target frame, many large-size erroneous target frames cannot be removed. Therefore, an embodiment of this application provides an adjustable calibration area definition method. The electronic device may calculate coordinates of two corner points in the calibration area using the following formula:

$$\begin{cases} ctl_x = \dfrac{(\Delta + 1)tl_x + (\Delta - 1)br_x}{2\Delta} \\ ctl_y = tl_y \\ cbr_x = \dfrac{(\Delta - 1)tl_x + (\Delta + 1)br_x}{2\Delta} \\ cbr_y = \dfrac{(\Delta + 1)tl_y + (\Delta - 1)br_y}{2\Delta}, \end{cases} \quad (6)$$

where $tl_x$ and $br_x$ represent horizontal coordinates of a top-left corner point and a bottom-right corner point of the generated target frame, $tl_y$ and $br_y$ represent vertical coordinates of the top-left corner point and the bottom-right corner point of the target frame, $ctl_x$ and $cbr_x$ represent horizontal coordinates of a top-left corner point and a bottom-right corner point of the calibration area, $ctl_y$ and $cbr_y$ represent vertical coordinates of the top-left corner point and the bottom-right corner point of the calibration area, $\Delta$ is a scaling factor, and a value range of $\Delta$ is positive odd numbers, and may be set based on an actual requirement. The electronic device determines coordinates of four corner points of the calibration area according to Formula (6), so that a relatively small calibration area can be generated in a relatively large target frame, and a relatively large calibration area can be generated in a relatively small target frame.

Figure 12:
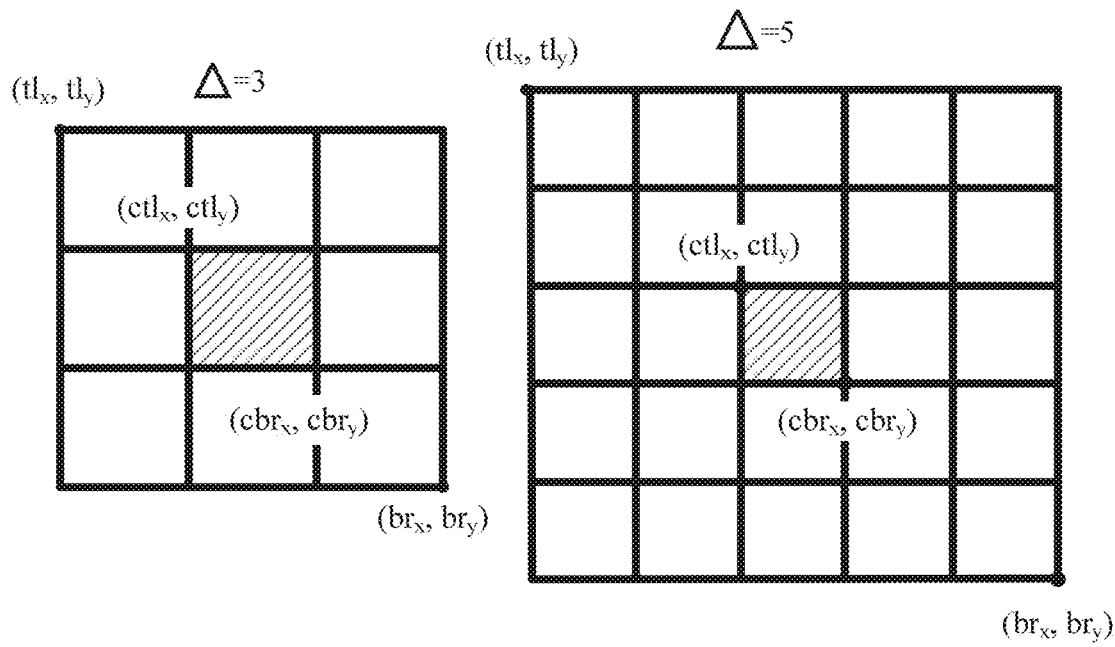
FIG. 12 is a schematic diagram of a calibration area in a target frame according to an embodiment of this application.

In an optional implementation, the electronic device may determine the calibration area based on a size of the generated target frame. A specific manner is: when the size of the target frame exceeds a target threshold, using a first area in the target frame as the calibration area, and when the size of the target frame does not exceed the target threshold, using a second area in the target frame as the calibration area, where a ratio of an area of the second area to an area of the target frame is greater than a ratio of an area of the first area to the area of the target frame. The target threshold may be 22,500 (namely, a product of a length and a width of the target frame), 25,000, 30,000, or the like. The length of the target frame may be a quantity of pixels corresponding to any side with a larger length in four sides of the target frame, and the width of the target frame may be a quantity of pixels corresponding to one side with a smaller length in the four sides of the target frame. It should be understood that, in actual application, a user may configure the target threshold in the electronic device based on an actual requirement. Optionally, both a central point of the first area and a central point of the second area coincide with a central point of the target frame, and both the first area and the second area are rectangular areas. The electronic device may determine the first area using Formula (6), where Δ is a first value, and may also determine the second area using Formula (6), where Δ is a second value, and the second value is less than the first value. It should be understood that the electronic device may determine coordinates of four corner points of the calibration area based on coordinates of four corner points of the target frame using Formula (6), and may adjust a value of Δ based on the size of the target frame. FIG. 12 is a schematic diagram of a calibration area in a target frame according to an embodiment of this application. As shown in FIG. 12, a size of a smaller target frame on the left does not exceed the target threshold, and Δ is 3, a size of a larger target frame on the right exceeds the target threshold, and Δ is 5.

Figure 13:
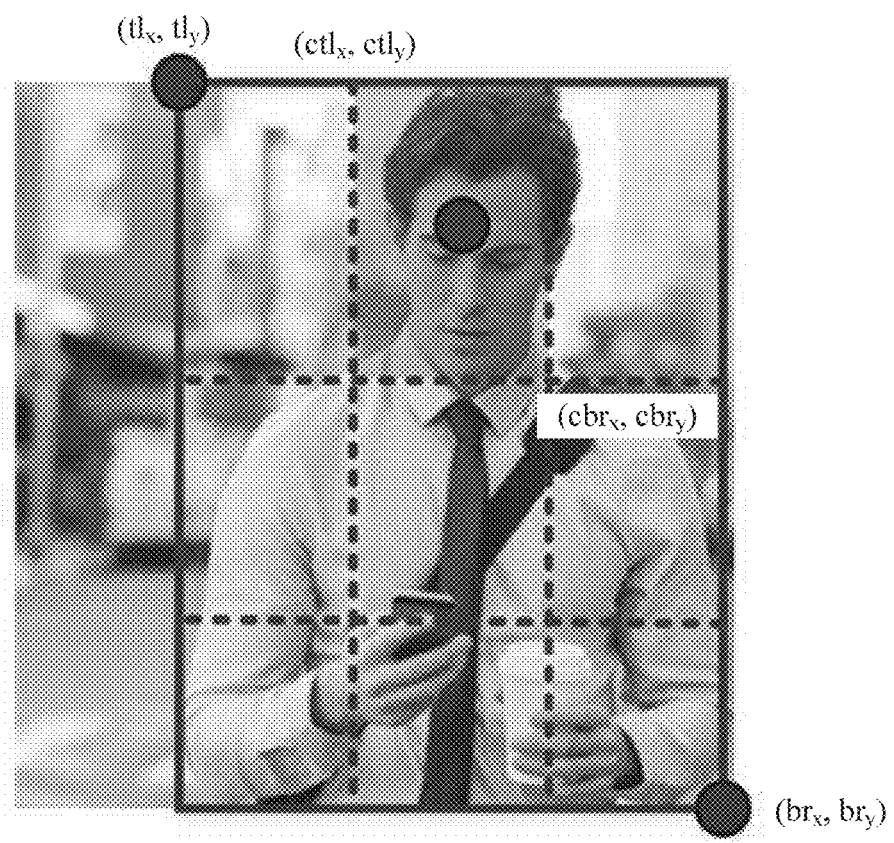
FIG. 13 is another schematic diagram of a relationship among a target frame, a calibration area, a corner point, and a key point according to an embodiment of this application.

In this embodiment of this application, a key feature point is not limited to a central point, and may be another point inside the target frame. For example, in pedestrian detection, because a detected object is a pedestrian, a position of each part of the pedestrian and a target frame is basically fixed. A key feature point may be specified as a point of a head position of the pedestrian, and in this case, a position of a calibration area may be defined as a head position, as shown in FIG. 13. It should be noted that center pooling that is used to extract a key point feature is also applicable to extracting a key feature point in the head, and a calibration area definition formula may be used to make a corresponding parameter adjustment, so that the area approaches the head.

In this implementation, the electronic device determines the calibration area based on the size of the target frame, so that a relatively small calibration area can be generated in a relatively large target frame, a relatively large calibration area can be generated in a relatively small target frame, and an erroneous target frame can be removed.

In the foregoing embodiment, a manner of processing an input image to obtain a corner point feature map is not described in detail. In the embodiments of this application, the electronic device may process an input image through corner pooling or a cascade corner pooling to obtain a corner point feature map. The following describes, with reference to the accompanying drawings, a manner of performing cascade corner pooling on the input image to obtain a corner point feature map.

Embodiment 4

Figure 14A:
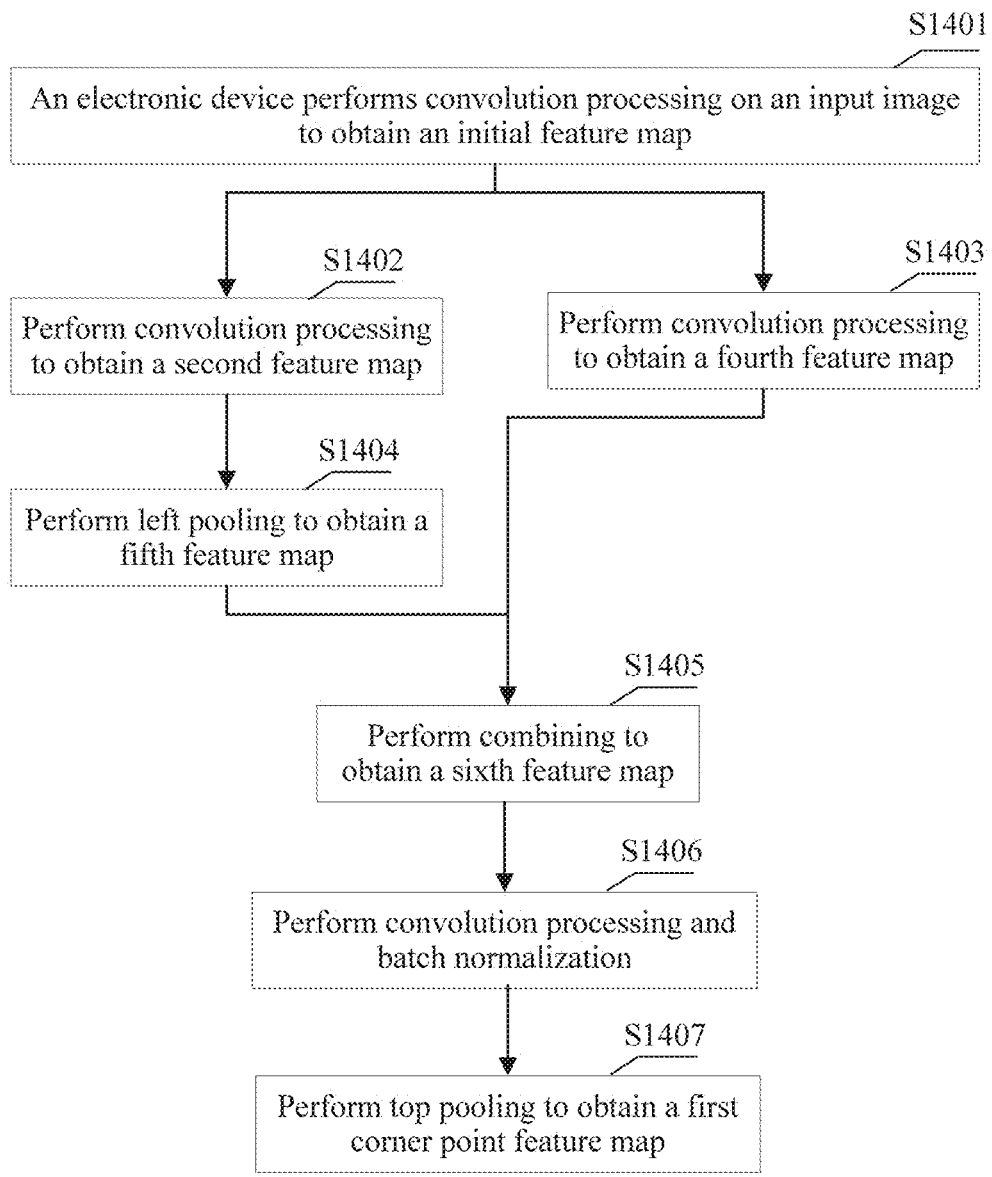

FIG. 14A is a flowchart of a corner point feature extraction method according to Embodiment 4 of this application. The method may include the following steps.

S1401. An electronic device performs convolution processing on an input image to obtain an initial feature map.

Figures 1, 14B:
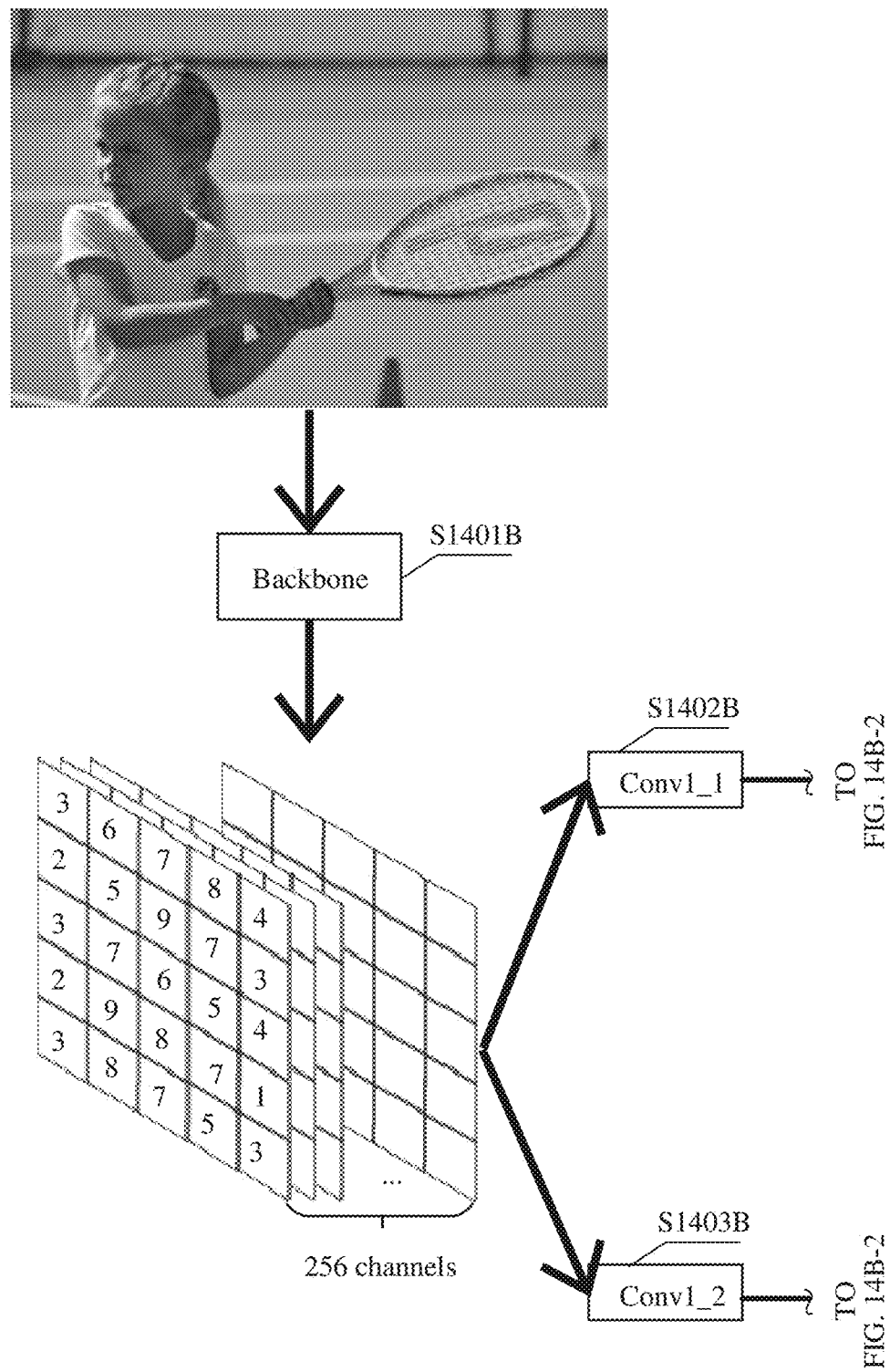
Figures 2, 14B:
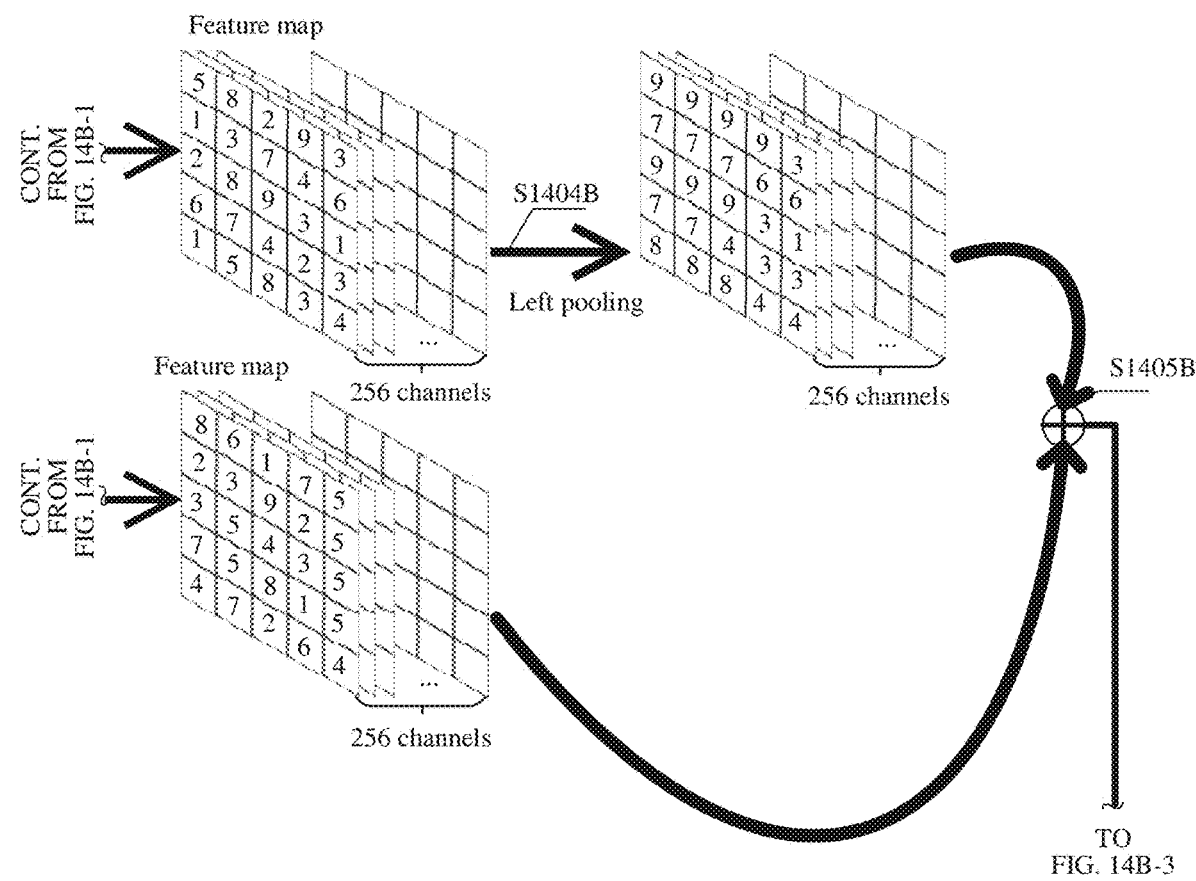
Figures 3, 14B:
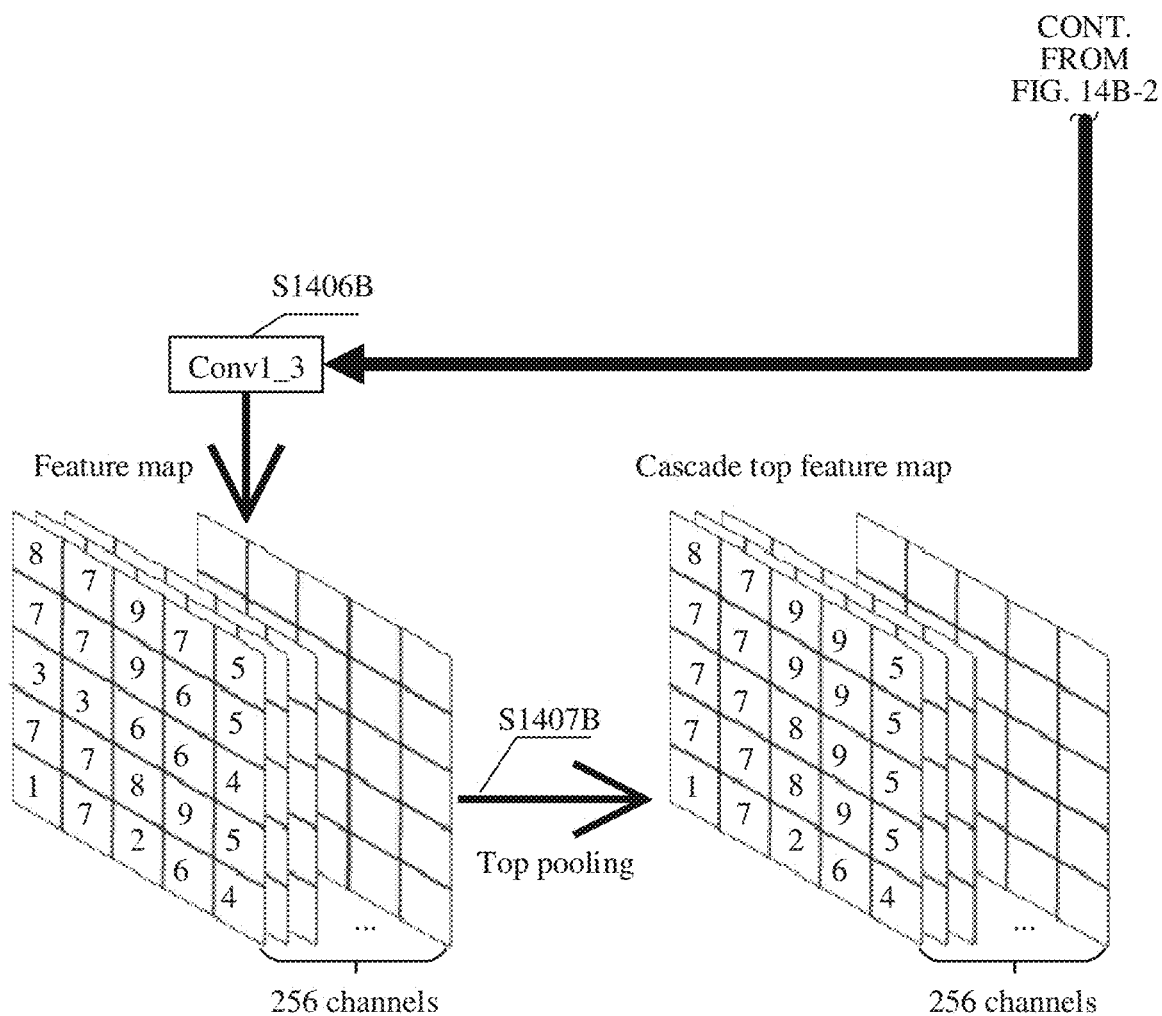

Optionally, the electronic device inputs the input image into a backbone network of a convolutional neural network, and performs convolution processing to obtain an initial feature map. FIG. 14B-1 to FIG. 14B-3 are an example of a method procedure in FIG. 14A.

S1402. The electronic device performs first convolution processing on the initial feature map to obtain a second feature map.

That the electronic device performs first convolution processing on the initial feature map to obtain a second feature map may be: first performing convolution processing on the initial feature map using a first convolution kernel to obtain a first intermediate feature map, then performing batch normalization processing on the first intermediate feature map to obtain a second intermediate feature map, and finally processing the second intermediate feature map using a linear rectification function (Rectified Linear Unit (ReLU)), which is also referred to as a rectified linear unit, to obtain the second feature map.

S1403. The electronic device performs third convolution processing on the initial feature map to obtain a fourth feature map.

That the electronic device performs third convolution processing on the initial feature map to obtain a fourth feature map may be: first performing convolution processing on the initial feature map using a third convolution kernel to obtain a third intermediate feature map, then performing batch normalization processing on the third intermediate feature map to obtain a fourth intermediate feature map, and finally processing the fourth intermediate feature map using a ReLU to obtain the fourth feature map. The third convolution kernel is different from the first convolution kernel. It may be understood that implementations of S1403 and S1402 are similar, and a difference lies in that convolution kernels used in S1403 and S1402 are different.

S1404. The electronic device performs left pooling on the second feature map to obtain a fifth feature map.

Figure 15A:
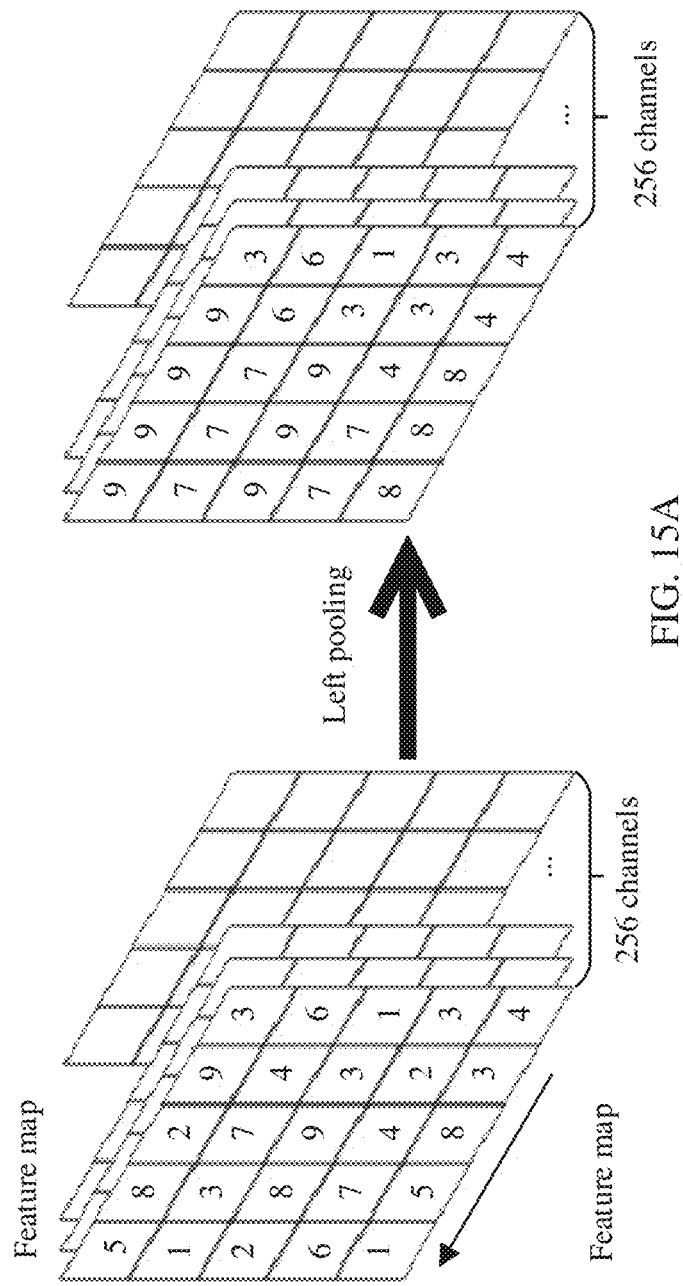
FIG. 15A is a schematic diagram of performing left pooling on a feature map according to an embodiment of this application.
Figure 15B:
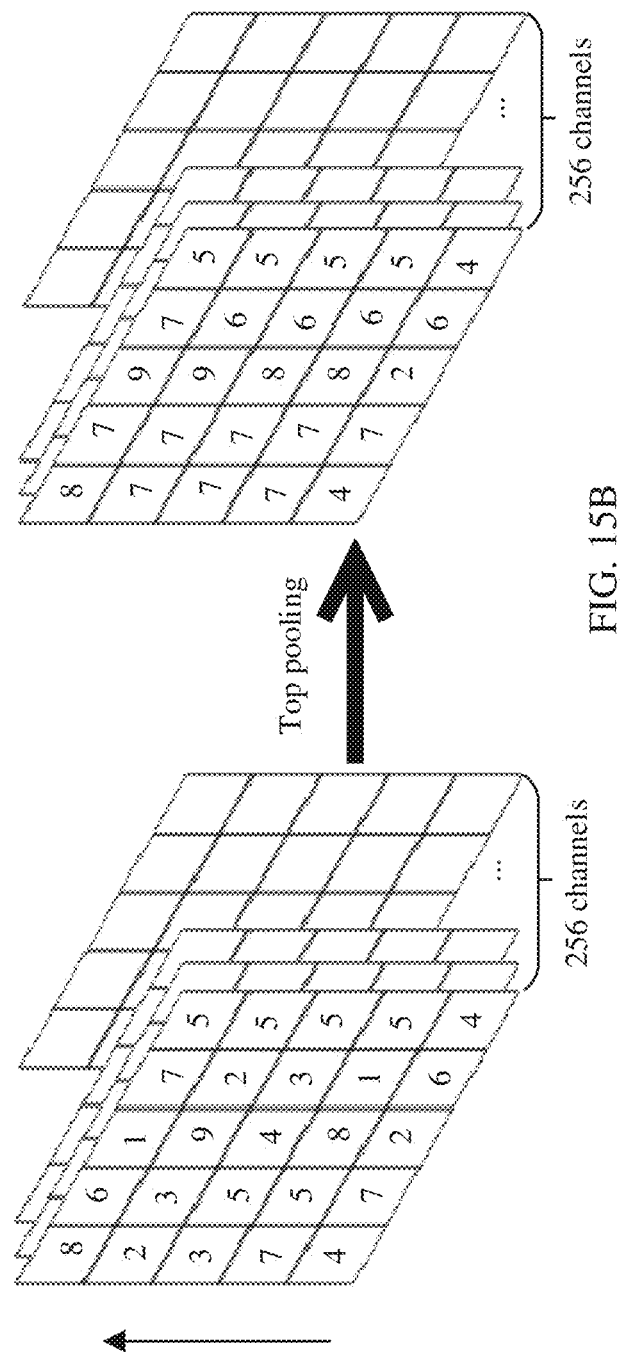
FIG. 15B is a schematic diagram of performing top pooling on a feature map according to an embodiment of this application.

Left pooling on a feature map may be selecting a maximum value in a sliding range after sliding from right to left among elements (also referred to as feature scores) at each row of the feature map. Right pooling on a feature map may be selecting a maximum value in a sliding range after sliding from left to right among elements at each row of the feature map. Top pooling on a feature map may be selecting a maximum value in a sliding range after sliding from bottom to top among elements at each column of the feature map. Bottom pooling on a feature map may be selecting a maximum value in a sliding range after sliding from top to bottom among elements at each column of the feature map. FIG. 15A is a schematic diagram of performing left pooling on a feature map according to an embodiment of this application. FIG. 15B is a schematic diagram of performing top pooling on a feature map according to an embodiment of this application.

S1405. The electronic device combines the fifth feature map and the fourth feature map to obtain a sixth feature map.

That the electronic device combines the fifth feature map and the fourth feature map to obtain a sixth feature map may be adding elements with same coordinates in the fourth feature map and the fifth feature map. A size of the fourth feature maps is the same as a size of the fifth feature map.

S1406. The electronic device performs convolution processing and batch normalization processing on the sixth feature map to obtain a processed sixth feature map.

S1407. The electronic device performs top pooling on the processed sixth feature map to obtain a first corner point feature map.

It may be understood that the electronic device may perform convolution processing on the input image in a similar manner to obtain a second corner point feature map. Replacing the left pooling in S1404 with right pooling and replacing the top pooling in S1407 with bottom pooling are a method procedure of performing convolution processing on the input image to obtain the second corner point feature map. The electronic device may also process the initial feature map in a corner pooling manner to obtain a corner point feature map. A principle of cascade corner pooling is that a maximum boundary value of an object is first extracted from a feature map, then a maximum value is further extracted from an interior in the maximum boundary value, and the maximum value and the maximum boundary value are added, thereby providing richer semantic information of an associated object for a corner point feature.

In this embodiment of this application, a corner point feature is extracted in a cascade corner pooling manner, which not only provides semantic information of an edge of an object for the corner point feature, but also provides rich semantic information of an interior of the object, so that a corner point is better detected.

In the foregoing embodiment, a manner of processing the input image to obtain a key point feature map is not described in detail. In the embodiments of this application, the electronic device may process the input image through center pooling, to obtain a key point feature map. The following describes, with reference to the accompanying drawings, a manner of performing center pooling on the input image to obtain a key point feature map.

Embodiment 5

Figure 16A:
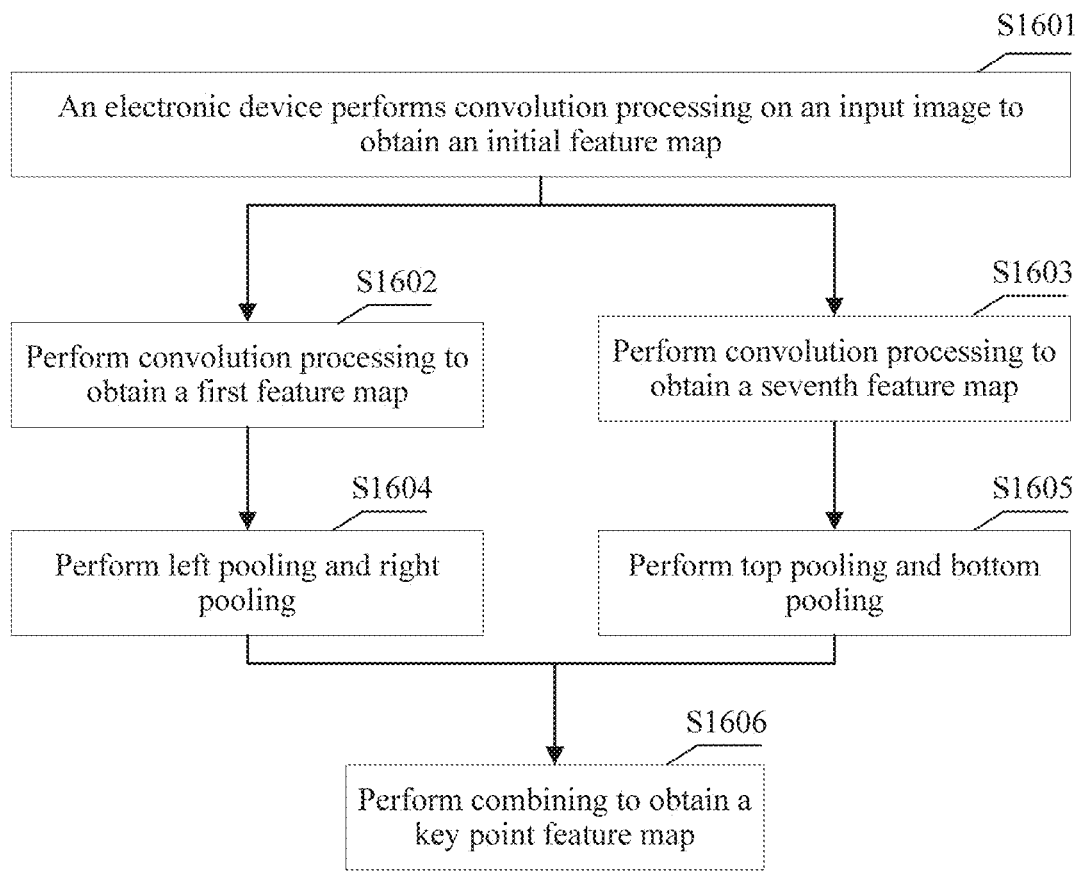
FIG. 16A is a flowchart of a key point feature extraction method according to an embodiment of this application.

FIG. 16A is a flowchart of a key point feature extraction method according to Embodiment 4 of this application. The method may include the following steps.

S1601. An electronic device performs convolution processing on an input image to obtain an initial feature map.

S1602. The electronic device performs fourth convolution processing on the initial feature map to obtain a first feature map.

Figure 16B:
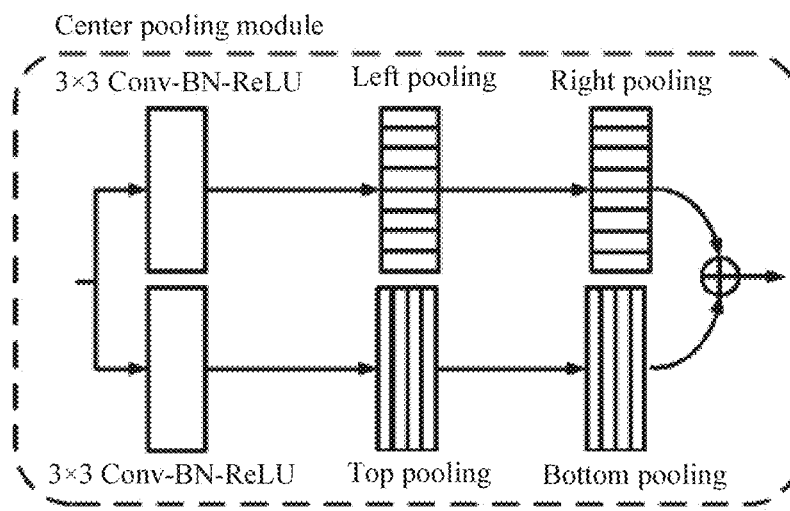
FIG. 16B is a schematic diagram of a key point feature extraction process according to an embodiment of this application.

That the electronic device performs fourth convolution processing on the initial feature map to obtain a first feature map may be: first performing convolution processing on the initial feature map using a fourth convolution kernel to obtain a first reference feature map, then performing batch normalization processing on the first reference feature map to obtain a second reference feature map, and finally processing the second reference feature map using a ReLU to obtain the first feature map. FIG. 16B is a schematic diagram of a key point feature extraction process according to Embodiment 4 of this application. As shown in FIG. 16B, a center pooling module in the electronic device is configured to implement S1602 to S1606. The center pooling module may be hardware, or may be a function module implemented by a processor in the electronic device. In FIG. 16B, Cony represents a convolution operation, and BN represents a batch normalization operation.

S1603. The electronic device performs fifth convolution processing on the initial feature map to obtain a seventh feature map.

That the electronic device performs fifth convolution processing on the initial feature map to obtain a seventh feature map may be: first performing convolution processing on the initial feature map using a fifth convolution kernel to obtain a third reference feature map, then performing batch normalization processing on the third reference feature map to obtain a fourth reference feature map, and finally processing the fourth reference feature map using a ReLU to obtain the seventh feature map. The fourth convolution kernel is different from the fifth convolution kernel.

S1604. The electronic device performs left-pooling and right-pooling on the first feature map to obtain a first key point feature map.

The electronic device may first perform the left pooling on the first feature map, and then perform right pooling on the first feature map obtained after the left pooling, or may perform the right pooling on the first feature map, and then perform left pooling on the first feature map obtained after the right pooling.

S1605. The electronic device performs top-pooling and bottom-pooling on the seventh feature map to obtain a second key point feature map.

The electronic device may first perform the top pooling on the seventh feature map, and then perform bottom pooling on the seventh feature map obtained after the top pooling, or may perform the bottom pooling on the seventh feature map, and then perform top pooling on the seventh feature map obtained after the bottom pooling.

S1606. The electronic device combines the first key point feature map and the second key point feature map to obtain a key point feature map.

That the electronic device combines the first key point feature map and the second key point feature map to obtain a key point feature map may be adding elements with same coordinates in the first key point feature map and the second key point feature map. A size of the first key point feature map is the same as a size of the second key point feature map. In this embodiment of this application, a key point feature means an internal point feature. Maximum values in a horizontal direction and maximum values in a vertical direction of an internal point are extracted through center pooling, and the internal point feature can be efficiently and accurately extracted. Center pooling enables an internal point feature to possibly obtain more significant semantic information easy to be distinguished from another category, thereby facilitating better detection of an internal point.

In this embodiment of this application, the electronic device may accurately extract a key point feature by performing center pooling on the input image to obtain a key point heatmap.

The target detection method provided in the embodiments of this application may be applied in scenarios such as an image processing scenario, an intelligent robot interaction scenario, and a self-driving scenario. The following describes an embodiment of application of the target detection method provided in the embodiments of this application in the self-driving scenario.

Embodiment 6

Figure 17:
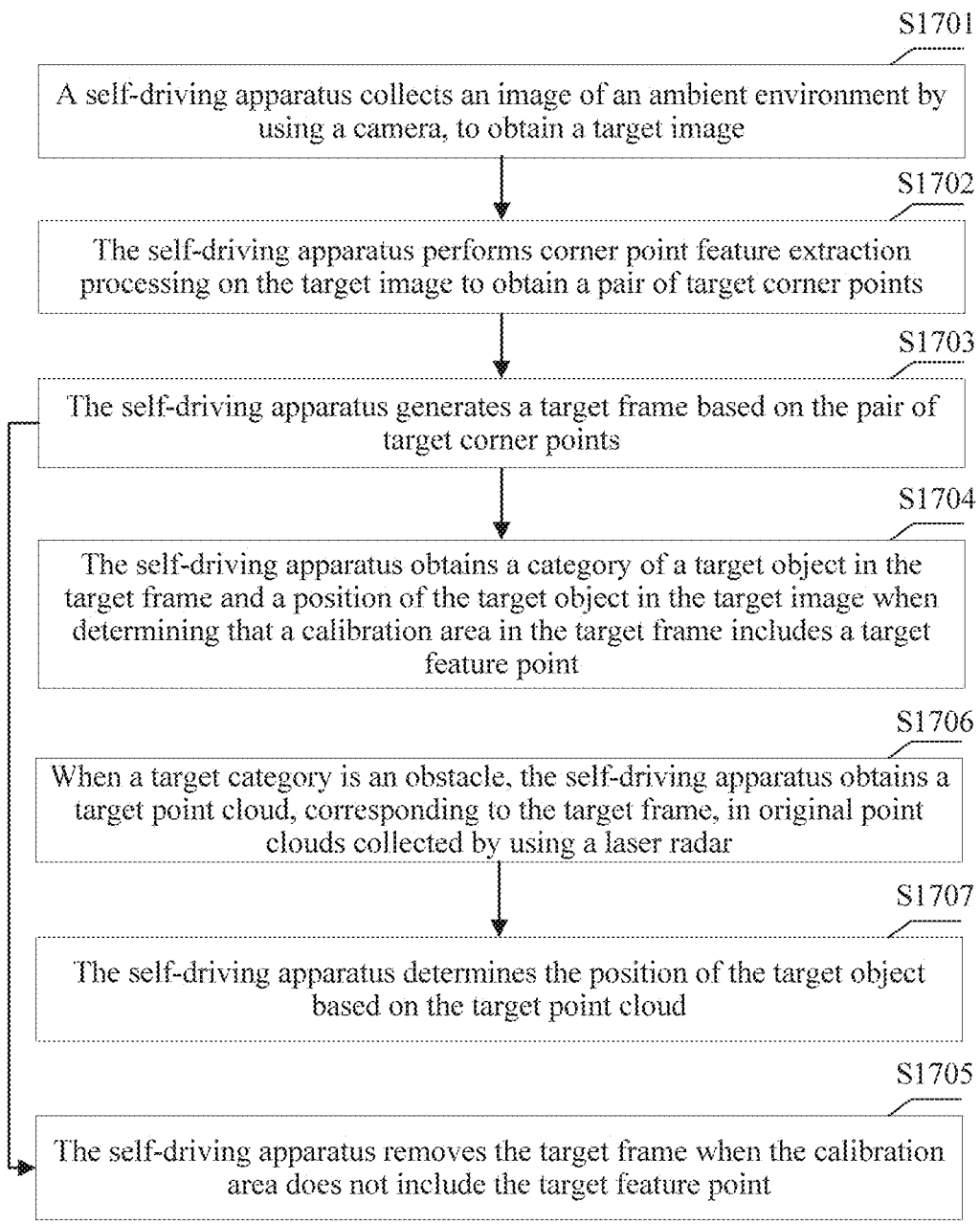
FIG. 17 is another flowchart of a target detection method according to an embodiment of this application.

FIG. 17 shows another target detection method according to an embodiment of this application. The method may include the following steps.

S1701. A self-driving apparatus collects an image of an ambient environment using a camera, to obtain a target image.

The self-driving apparatus may collect an image of the ambient environment in real time or almost in real time using the camera. The self-driving apparatus may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of the present disclosure.

S1702. The self-driving apparatus performs corner point feature extraction processing on the target image to obtain a pair of target corner points.

The pair of target corner points include a first corner point and a second corner point, both the first corner point and the second corner point correspond to a target category, and the first corner point is a top-left corner point in the target image and the second corner point is a bottom-right corner point in the target image, or the first corner point is a top-right corner point in the target image and the second corner point is a bottom-left corner point in the target image. An implementation of S1702 is similar to an implementation of S1101.

S1703. The self-driving apparatus generates a target frame based on the pair of target corner points.

The target frame is a rectangular frame, and the first corner point and the second corner point correspond to two vertices on a diagonal line of the target frame. An implementation of S1703 is similar to an implementation of S1102.

S1704. The self-driving apparatus obtains a category of a target object in the target frame and a position of the target object in the target image when determining that a calibration area in the target frame includes a target feature point.

The target feature point is a feature point obtained by performing key point feature extraction processing on the target image and corresponds to the target category, and the target object belongs to the target category. Optionally, before performing S1704, the self-driving apparatus may perform key point feature extraction processing on the input image to obtain a position and a category of each key feature point in the input image. The target feature point is included in the key feature points.

S1705. The self-driving apparatus removes the target frame when the calibration area does not include the target feature point.

An implementation of S1705 is similar to an implementation of S1104.

S1706. When the target category is an obstacle, the self-driving apparatus obtains a target point cloud, corresponding to the target frame, in original point clouds collected using a laser radar.

Each point in the original point clouds corresponds to one pixel in the target image, and all pixels in the target image that correspond to all points in the target point cloud are located in the target frame. The self-driving apparatus may collect point cloud data in real time or almost in real time using the laser radar to position an object in the ambient environment based on the point cloud data.

S1707. The self-driving apparatus determines the position of the target object based on the target point cloud.

In actual application, the self-driving apparatus may obtain target frames corresponding to a plurality of objects in the image by performing S1701 to S1704, and may position the objects based on a correspondence between a target frame corresponding to each object in the image and point cloud data. It may be understood that the self-driving apparatus may position obstacles in the ambient environment by performing S1701 to S1707, and further execute a corresponding driving policy to avoid the obstacles. In the field of self-driving, a common technology is used to determine the position of the target object based on the target point cloud. Details are not described herein. In actual application, the self-driving apparatus may send the collected image and the point cloud data to a server, and the server performs S1702 to S1707 to obtain the position of the target object, and sends position information of the target object to the self-driving apparatus.

In this embodiment of this application, it is determined whether a calibration area in each target frame includes a key feature point, an erroneous target frame can be effectively removed, and target detection accuracy can be improved.

Figure 18:
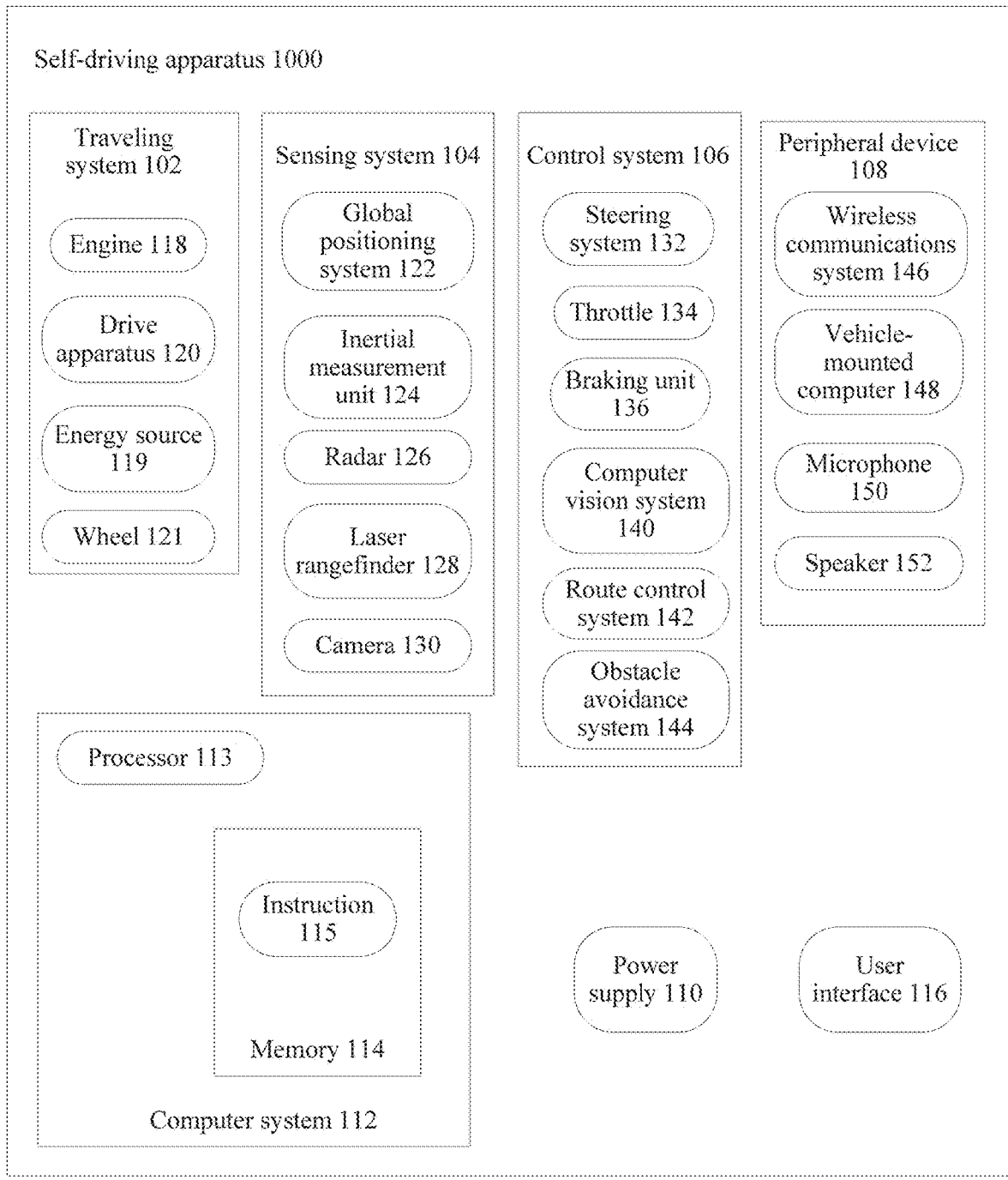
FIG. 18 is a functional block diagram of a self-driving apparatus according to an embodiment of this application.

FIG. 18 is a functional block diagram of a self-driving apparatus 1000 according to an embodiment of this application. In an embodiment, the self-driving apparatus 1000 is configured to a fully or partially self-driving mode. For example, the self-driving apparatus 1000 may control the self-driving apparatus 1000 while in the self-driving mode, and through a manual operation, may determine a current status of the self-driving apparatus 1000 and a current status of an ambient environment of the self-driving apparatus 1000, determine possible behavior of at least one another vehicle in the ambient environment, determine a confidence level corresponding to a possibility of performing the possible behavior of the another vehicle, and control the self-driving apparatus 1000 based on determined information. When the self-driving apparatus 1000 is in the self-driving mode, it may be set that the self-driving apparatus 1000 may operate in a case of not interacting with a person.

The self-driving apparatus 1000 may include various subsystems, such as a traveling system 102, a sensor system 104, a control system 106, one or more peripheral devices 108, and a power supply 110, a computer system 112, and a user interface 116. Optionally, the self-driving apparatus 1000 may include more or less subsystems, and each subsystem may include a plurality of elements. In addition, each subsystem and element of the self-driving apparatus 1000 may be interconnected in a wired or wireless manner.

The traveling system 102 may include a component that powers the self-driving apparatus 1000 for movement. In an embodiment, the propulsion system 102 may include an engine 118, an energy source 119, a drive apparatus 120, and a wheel/tire 121. The engine 118 may be an internal combustion engine, a motor, an air compression engine, or a combination of other types of engines, such as a hybrid engine including a gasoline engine and a motor and a hybrid engine including an internal combustion engine and an air compression engine. The engine 118 converts the energy source 119 into mechanical energy.

Examples of the energy source 119 include gasoline, diesel, other petroleum-based fuel, propane, other compressed gas-based fuel, ethanol, a solar panel, a battery, and other power supply. The energy source 119 may also provide energy for another system of the self-driving apparatus 1000.

The drive apparatus 120 may transfer mechanical power from the engine 118 to the wheel 121. The drive apparatus 120 may include a gearbox, a differential gear, and a drive shaft. In an embodiment, the drive apparatus 120 may further include another component, such as a clutch. The drive shaft may include one or more shafts that may be coupled to one or more wheels 121.

The sensor system 104 may include several sensors that sense information about an environment around the self-driving apparatus 1000. For example, the sensor system 104 may include a positioning system 122 (the positioning system may be a global positioning system (GPS), or may be a BEIDOU system or another positioning system), an inertial measurement unit (IMU) 124, a radar 126, a laser rangefinder 128, and a camera 130. The sensor system 104 may further include sensors of an internal system of the monitored self-driving apparatus 1000 (for example, an in-vehicle air quality monitor, a fuel gauge, and an engine oil temperature gauge). One or more pieces of sensor data from these sensors can be used to detect objects and their corresponding features (a position, a shape, a direction, a speed, or the like). Such detection and recognition are key functions for a safe operation of the autonomous self-driving apparatus 1000.

The positioning system 122 may be configured to estimate a geographical position of the self-driving apparatus 1000. The IMU 124 is configured to sense a position and a direction change of the self-driving apparatus 1000 based on an inertial acceleration. In an embodiment, the IMU 124 may be a combination of an accelerometer and a gyroscope.

The radar 126 may use a radio signal to sense an object in an environment around the self-driving apparatus 1000.

The laser rangefinder 128 may use a laser to sense an object in an environment in which the self-driving apparatus 1000 is located. In some embodiments, the laser rangefinder 128 may include one or more laser sources, laser scanners, one or more detectors, and other system components. In some embodiments, in addition to sensing an object, the laser ranger 128 may be a laser radar (light detection and ranging (LiDAR)). The laser radar is a radar system that detects a feature quantity such as a position and a speed of a target by emitting a laser beam. The laser radar may transmit a sounding signal (a laser beam) to a target (namely, an obstacle) or a direction, and then compare a received signal (a target echo) reflected from the target with a transmit signal. After proper processing, related information about the target can be obtained, for example, a point cloud that represents a surface feature of the target can be obtained. The point cloud is a set of massive points that represent target spatial distribution and a target surface feature in a same spatial reference system. The point cloud in this application may be a point cloud obtained according to a laser measurement principle, and includes three-dimensional coordinates of each point.

The camera 130 may be configured to capture a plurality of images of an environment around the self-driving apparatus 1000. The camera 130 may be a static camera or a video camera. The camera 130 may capture a plurality of images of an environment around the self-driving apparatus 1000 in real time or periodically.

The control system 106 controls operations of the self-driving apparatus 1000 and components of the self-driving apparatus 1000. The control system 106 may include various components, including a steering system 132, a throttle 134, a braking unit 136, a computer vision system 140, a route control system 142, and an obstacle avoidance system 144.

The steering system 132 is operable to adjust a forward direction of the self-driving apparatus 1000. For example, in an embodiment, the steering system 132 may be a steering wheel system.

The throttle 134 is configured to: control an operating speed of the engine 118 and further control a speed of the self-driving apparatus 1000.

The braking unit 136 is configured to control the self-driving apparatus 1000 to decelerate. The braking unit 136 may use friction to slow the wheel 121. In other embodiments, the braking unit 136 may convert kinetic energy of the wheel 121 into a current. The braking unit 136 may also use another form to slow a rotation speed of the wheel 121 to control the speed of the self-driving apparatus 1000.

The computer vision system 140 is operable to process and analyze images captured by the camera 130 to recognize objects and/or features in an environment around the self-driving apparatus 1000. The objects and/or features may include traffic signals, road boundaries, and obstacles. The computer vision system 140 may use an object recognition algorithm, a self-driving method, a structure from motion (SFM) algorithm, video tracking, and other computer vision technologies. In some embodiments, the computer vision system 140 may be configured to: map an environment, track an object, estimate a speed of an object, and so on. The computer vision system 140 may use the point cloud obtained by the laser radar and an image of an ambient environment obtained by the camera to position an obstacle.

The route control system 142 is configured to determine a traveling route of the self-driving apparatus 1000. In some embodiments, the route control system 142 may determine a traveling route for the self-driving apparatus 1000 in combination with data from the sensor 138, the GPS 122, and one or more predetermined maps.

The obstacle avoidance system 144 is configured to recognize, evaluate, and avoid or bypass, in another manner, potential obstacles in an environment of the self-driving apparatus 100.

In an instance, the control system 106 may add or alternatively include components other than those shown and described. Alternatively, some of the components shown above may be reduced.

The self-driving apparatus 1000 interacts with an external sensor, another vehicle, another computer system, or a user using the peripheral device 108. The peripheral device 108 may include a wireless communications system 146, a vehicle-mounted computer 148, a microphone 150, and/or a speaker 152.

In some embodiments, the peripheral device 108 provides means for a user of the self-driving apparatus 1000 to interact with the user interface 116. For example, the vehicle-mounted computer 148 may provide information for the user of the self-driving apparatus 1000. The user interface 116 may further operate the vehicle-mounted computer 148 to receive an input from the user. The vehicle-mounted computer 148 may perform an operation using a touchscreen. In other cases, the peripheral device 108 may provide means for communicating by the self-driving apparatus 1000 with another device located in the vehicle. For example, the microphone 150 may receive audio (for example, a voice command or another audio input) from the user of the self-driving apparatus 1000. Similarly, the speaker 152 may output audio to the user of the self-driving apparatus 1000.

The wireless communications system 146 may communicate wirelessly with one or more devices directly or through a communications network. For example, the wireless communications system 146 may use third generation (3G) cellular communications, fourth generation (4G) cellular communications such as Long-Term Evolution (LTE), or fifth generation (5G) cellular communications. The wireless communications system 146 may communicate with a wireless local area network (wireless local area network, (WLAN)) using WiFi. In some embodiments, the wireless communications system 146 may communicate directly with a device through an infrared link, BLUETOOTH, or ZIGBEE. Other wireless protocols, for example, various vehicle communications systems, such as the wireless communications system 146, may include one or more dedicated short range communications (DSRC) devices, and the devices may include public and/or private data communication between the vehicle and/or roadside stations.

The power supply 110 may supply power to various components of the self-driving apparatus 1000. In an embodiment, the power supply 110 may be a rechargeable lithium ion or lead-acid battery. One or more battery packs of such a battery may be configured as a power supply to supply power to various components of the self-driving apparatus 1000. In some embodiments, the power supply 110 and the energy source 119 may be implemented together, as in some all-electric cars.

Some or all functions of the self-driving apparatus 1000 are controlled by the computer system 112. The computer system 112 may include at least one processor 113. The processor 113 executes an instruction 115 stored in a non-transient computer-readable medium such as a data storage apparatus 114. The computer system 112 may be further a plurality of computing devices that control an individual component or a subsystem of the self-driving apparatus 1000 in a distributed manner.

The processor 113 may be any conventional processor, such as a commercially available central processing unit (CPU). Alternatively, the processor may be a dedicated device such as an ASIC or another hardware-based processor. Although FIG. 18 functionally shows a processor, a memory, and other components of the computer system 112 in a same block, a person of ordinary skill in the art should understand that the processor, a computer, or the memory may actually include a plurality of processors, computers, or memories that may or may not be stored in a same physical housing. For example, the memory may be a hard disk drive or another different storage medium located in a housing of the computer system 112. Thus, it is understood that references to the processor or the computer include references to a set of processors or computers or memories that may or may not operate in parallel. Unlike using a single processor to perform the steps described herein, some components, such as steering components and deceleration components, may have respective processors. The processor performs only calculation related to component-specific functions.

In the aspects described herein, the processor may be located far away from the self-driving apparatus and communicate wirelessly with the self-driving apparatus. In other aspects, some operations in a process described herein are performed on the processor disposed in the self-driving apparatus, and other operations are performed by a remote processor, including performing necessary steps for performing a single operation.

In some embodiments, the data storage apparatus 114 may include an instruction 115 (for example, program logic), and the instruction 115 may be executed by the processor 113 to perform various functions of the self-driving apparatus 1000, including those functions described above. The data storage apparatus 114 may also include additional instructions, including instructions to send data to, receive data from, interact with, and/or control one or more of the propulsion system 102, the sensor system 104, the control system 106, and the peripheral device 108.

In addition to the instruction 115, the data storage apparatus 114 may further store data, such as a road map, route information, and a position, a direction, a speed, and other information of a vehicle. The information may be used by the self-driving apparatus 1000 and the computer system 112 during operation in an autonomous mode, a semi-autonomous mode and/or a manual mode of the self-driving apparatus 1000.

The user interface 116 is configured to provide information for or receive information from the user of the self-driving apparatus 1000. Optionally, the user interface 116 may include one or more input/output devices within a set of peripheral devices 108, such as a wireless communications system 146, a vehicle-mounted computer 148, a microphone 150, and a speaker 152.

The computer system 112 may control functions of the self-driving apparatus 1000 based on inputs received from each of the subsystems (for example, the traveling system 102, the sensor system 104, and the control system 106) and from the user interface 116. For example, the computer system 112 may use inputs from the control system 106 to control the steering unit 132 to avoid an obstacle detected by the sensor system 104 and the obstacle avoidance system 144. In some embodiments, the computer system 112 is operable to provide control over many aspects of the self-driving apparatus 1000 and the subsystems of the self-driving apparatus 1000.

Optionally, one or more of the foregoing components may be installed separately from the self-driving apparatus 1000 or associated with the self-driving apparatus 1000. For example, the data storage apparatus 114 may be partially or completely separated from the self-driving apparatus 1000. The foregoing components may be communicatively coupled together in a wired and/or wireless manner.

Optionally, the foregoing components are merely examples. In actual application, components in the foregoing modules may be added or deleted based on an actual requirement. FIG. 18 should not be understood as a limitation on this embodiment of this application.

A self-driving vehicle traveling on a road, such as the foregoing self-driving apparatus 1000, may recognize an object in an ambient environment of the self-driving apparatus 1000 to determine an adjustment on a current speed. The object may be another vehicle, a traffic control device, or another type of object. In some examples, each recognized object may be considered independently and may be used to determine the speed to be adjusted by the self-driving vehicle, based on respective features of the object, such as a current speed of the object, an acceleration of the object, or a spacing between the object and the vehicle.

Optionally, the self-driving apparatus 1000 or a computing device associated with the self-driving apparatus 1000 (for example, the computer system 112, the computer vision system 140, and the data storage apparatus 114 in FIG. 18) may predict behavior of the recognized object based on the features of the recognized object and a status of the ambient environment (for example, traffic, rain, and ice on a road). Optionally, recognized objects depend on behavior of each other. Therefore, all recognized objects may be considered together to predict behavior of a single recognized object. The self-driving apparatus 1000 can adjust a speed of the self-driving apparatus 1000 based on the predicted behavior of the recognized object. In other words, the self-driving vehicle can determine, based on the predicted behavior of the object, a specific stable state to which the vehicle needs to be adjusted (for example, acceleration, deceleration, or stop). In this process, another factor may also be considered to determine a speed of the self-driving apparatus 1000, such as a lateral position of the self-driving apparatus 1000 in a traveling road, a curvature of the road, and static and dynamic object proximity.

In addition to providing instructions for adjusting the speed of the self-driving vehicle, the computing device may further provide instructions for modifying a steering angle of the self-driving apparatus 1000, so that the self-driving vehicle follows a given track and/or maintains safe lateral and longitudinal distances from an object near the self-driving vehicle (for example, a car in an adjacent lane on a road).

The foregoing self-driving apparatus 1000 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of the present disclosure.

Figure 19:
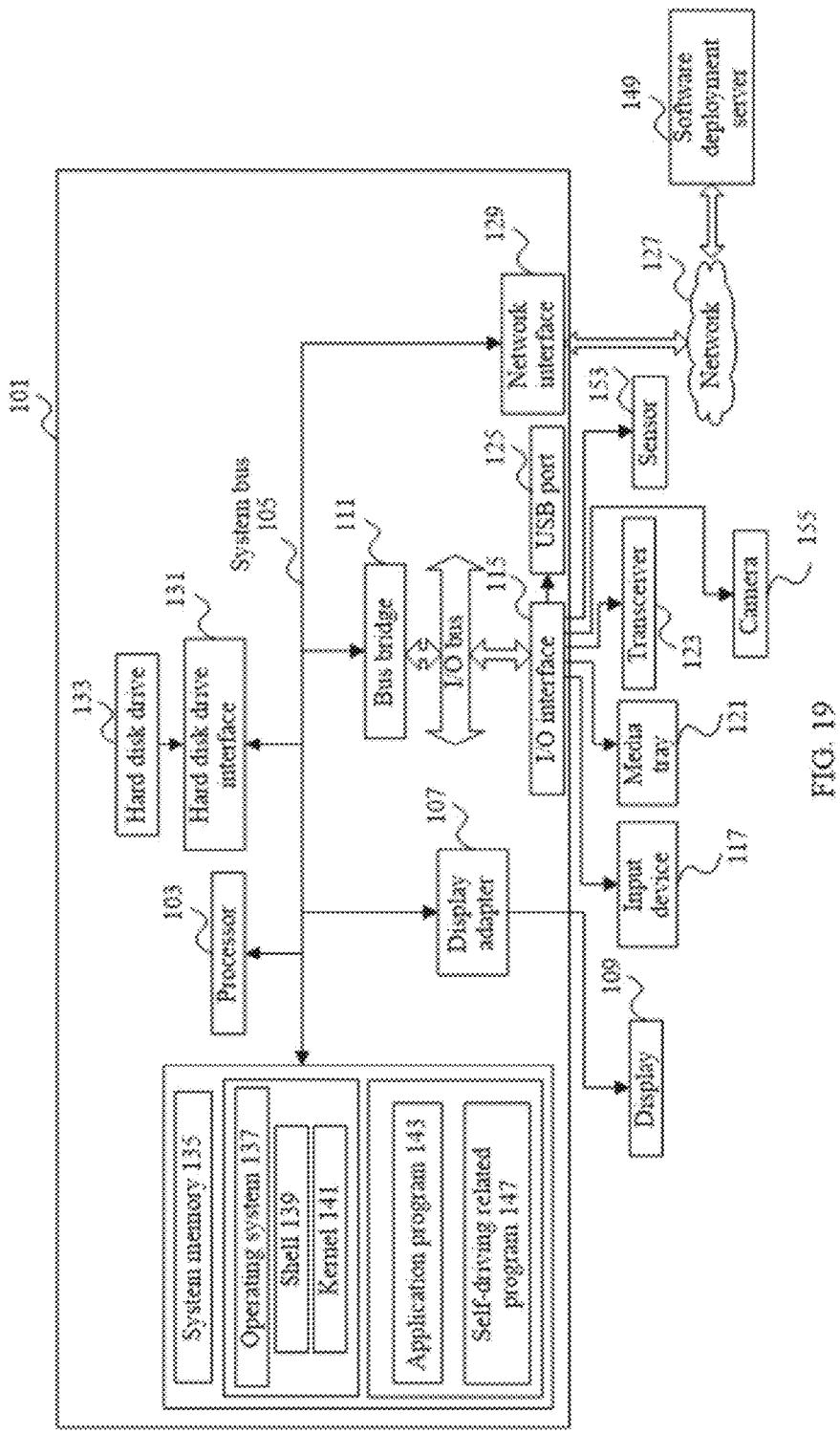
FIG. 19 is a schematic structural diagram of a self-driving system according to an embodiment of this application.

FIG. 18 is a functional block diagram of the self-driving apparatus 1000, and the following describes a self-driving system 101. FIG. 19 is a schematic structural diagram of a self-driving system according to an embodiment of this application. In FIG. 18 and FIG. 19, the self-driving apparatus 1000 is described from different perspectives. As shown in FIG. 19, a computer system 101 includes a processor 103, and the processor 103 is coupled to a system bus 105. The processor 103 may be one or more processors, and each processor may include one or more processor cores. A display adapter (video adapter) 107, where the display adapter may drive the display 109, and the display 109 is coupled to the system bus 105. The system bus 105 is coupled to an I/O bus 113 using a bus bridge 111. An I/O interface 115 is coupled to the I/O bus. The I/O interface 115 communicates with a plurality of I/O devices, such as an input device 117 (such as a keyboard, a mouse, or a touchscreen), a multimedia tray (media tray) 121, such as a compact disc read only memory (CD-ROM) or a multimedia interface. The I/O devices are a transceiver 123 (may send and/or receive a radio communication signal), a camera 155 (may capture static and dynamic digital video images), and an external universal serial bus (USB) interface 125. Optionally, an interface connected to the I/O interface 115 may be a USB interface.

The processor 103 may be any conventional processor, including a reduced instruction set computing (RISC) processor, a complex instruction set computing (CISC) processor, or a combination of the foregoing processors. Optionally, the processor may be a dedicated apparatus such as an application-specific integrated circuit (ASIC). Optionally, the processor 103 may be a neural-network processing unit (NPU) or a combination of a neural-network processing unit and the foregoing conventional processor. Optionally, a neural-network processing unit is mounted onto the processor 103.

The computer system 101 may communicate with a software deployment server 149 using a network interface 129. The network interface 129 is a hardware network interface, for example, a network adapter. A network 127 may be an external network, such as the Internet, or may be an internal network, such as the Ethernet or a virtual private network. Optionally, the network 127 may be a wireless network, such as a WiFi network or a cellular network.

A hard disk drive interface is coupled to the system bus 105. A hardware drive interface is connected to a hard disk drive. A system memory 135 is coupled to the system bus 105. Data running in the system memory 135 may include an operating system 137 and an application program 143 of the computer system 101.

The operating system includes a shell 139 and a kernel 141. The shell 139 is an interface between a user and the kernel of the operating system. The shell 139 is an outermost layer of the operating system. The shell 139 manages interaction between the user and the operating system: waiting for input of the user, explaining the input of the user to the operating system, and processing various output results of the operating system.

The kernel 141 includes parts of the operating system that are configured to manage a memory, a file, a peripheral, and a system resource. Directly interacting with hardware, the kernel of the operating system usually runs processes, provides inter-process communication, and provides CPU time slice management, interruption, memory management, IO management, and the like.

The application program 141 includes a self-driving related program, for example, a program for managing interaction between the self-driving apparatus and an obstacle on a road, a program for controlling a traveling route or a speed of the self-driving apparatus, and a program for controlling interaction between the self-driving apparatus 1000 and another self-driving apparatus on a road. The application program 141 also exists in a system of a software deployment server (deploying server) 149. In an embodiment, when the application program 141 needs to be executed, the computer system 101 may download the application program 141 from the software deployment server 149.

A sensor 153 is associated with the computer system 101. The sensor 153 is configured to detect an ambient environment of the computer system 101. For example, the sensor 153 may detect an animal, a car, an obstacle, or a crosswalk. Further, the sensor may detect an ambient environment of the foregoing animal, car, obstacle, crosswalk, or the like, for example, the ambient environment of the animal, such as another animal appearing around the animal, a weather condition, and brightness of the ambient environment. Optionally, if the computer system 101 is located in the self-driving apparatus, the sensor may be a camera, a laser radar, an infrared sensor, a chemical detector, a microphone, or the like. When being activated, the sensor 153 senses information at preset intervals and provides the sensed information for the computer system 101 in real time or almost in real time. Optionally, the sensor may include a laser radar. The laser radar may provide the obtained point cloud for the computer system 101 in real time or almost in real time. A series of obtained point clouds are provided for the computer system 101. A point cloud obtained each time corresponds to one time stamp. Optionally, the camera provides the obtained image for the computer system 101 in real time or almost in real time, and each frame of image corresponds to one time stamp. It should be understood that the computer system 101 may obtain an image sequence from the camera.

Optionally, in various embodiments described in this specification, the computer system 101 may be located far away from the self-driving apparatus, and may communicate wirelessly with the self-driving apparatus. The transceiver 123 may send a self-driving task, sensor data collected by the sensor 153, and other data to the computer system 101, and may further receive a control instruction sent by the computer system 101. The self-driving apparatus may execute the control instruction received by the transceiver from the computer system 101, and perform a corresponding driving operation. In other aspects, some of the processes described herein are performed on a processor disposed in the self-driving vehicle, and other operations are performed by a remote processor, including performing actions required to perform a single operation.

In a self-driving process, the self-driving apparatus needs to determine positions of a vehicle, a pedestrian, and another obstacle in a timely manner in an ambient environment to perform a corresponding driving operation to avoid a vehicle, a pedestrian, and another obstacle in the ambient environment. In actual application, the self-driving apparatus may position a vehicle, a pedestrian, and another obstacle in the ambient environment based on a point cloud and an image collected by the self-driving apparatus. Alternatively, the self-driving apparatus may send driving information (including the point cloud and the image collected by the self-driving apparatus) of the self-driving apparatus to a server, so that the server positions, based on the point cloud and the image collected by the self-driving apparatus, the vehicle, the pedestrian, and the another obstacle in the ambient environment of the self-driving apparatus, and controls the self-driving apparatus to perform a corresponding driving operation.

In the foregoing embodiments, the target detection method and the training method are described, and the following describes structures of a training device and an electronic device that implement the methods.

Figure 20:
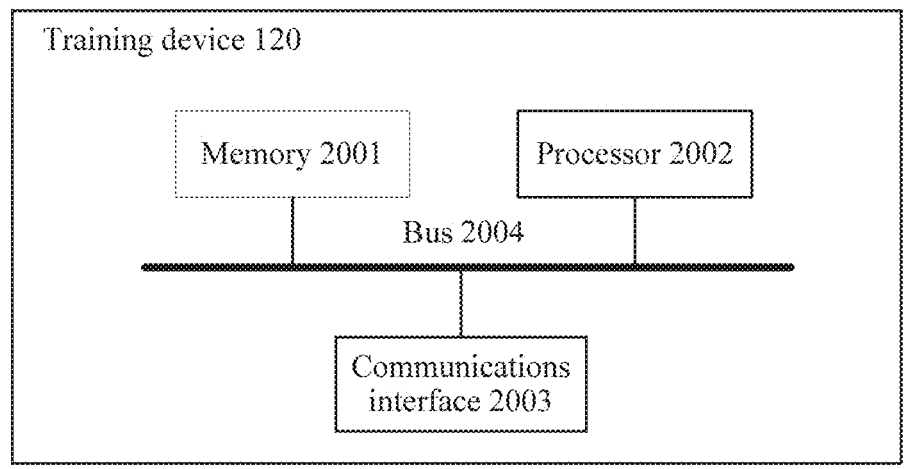
FIG. 20 is a schematic diagram of a hardware structure of a training device according to an embodiment of this application.

FIG. 20 is a schematic diagram of a hardware structure of a training device according to an embodiment of this application. The training device 120 shown in FIG. 20 (the training device 120 may be specifically a computer device) includes a memory 2001, a processor 2002, a communications interface 2003, and a bus 2004. The memory 2001, the processor 2002, and the communications interface 2003 implement mutual communication connection using the bus 2004.

The memory 2001 may be a read-only memory (ROM), a static storage device, a dynamic storage device, or a random access memory (RAM). The memory 2001 may store a program. When the program stored in the memory 2001 is executed by the processor 2002, the processor 2002 and the communications interface 2003 are configured to perform the steps of the training method for a convolutional neural network in the embodiments of this application.

The processor 2002 may be a general-purpose central processing unit, a microprocessor, an ASIC, a graphics processing unit (GPU), or one or more integrated circuits and is configured to execute a related program to implement functions that need to be executed by units in the training apparatus for a convolutional neural network in the embodiments of this application, or perform the training method for a convolutional neural network in the method embodiments of this application.

The processor 2002 may be further an integrated circuit chip and has a signal processing capability. In an implementation process, the steps of the training method for a convolutional neural network in this application may be completed using an integrated logic circuit of hardware in the processor 2002 or an instruction in a form of software. The processor 2002 may be further a general-purpose processor, a digital signal processor (DSP), an ASIC, a field programmable gate array (FPGA), another programmable logic device, a discrete gate, a transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished using a hardware decoding processor, or may be executed and accomplished using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 2001. The processor 2002 reads information from the memory 2001, and completes, in combination with hardware thereof, functions that need to be executed by units included in the training device for a convolutional neural network in the embodiments of this application, or performs the training method for a convolutional neural network in the method embodiments of this application.

The communications interface 2003 uses, by way of example without limitation, a transceiver apparatus such as a transceiver to implement communication between the training device 120 and another device or communications network. For example, training data (for example, the input image in Embodiment 1 of this application) may be obtained through the communications interface 2003.

The bus 2004 may include a path for transferring information between components (for example, the memory 2001, the processor 2002, and the communications interface 2003) of the training device 120.

Figure 21:
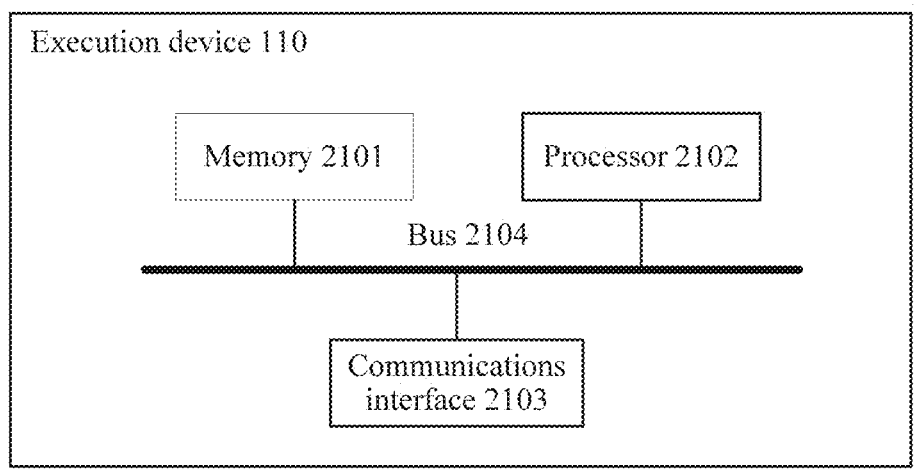
FIG. 21 is a schematic diagram of a hardware structure of an electronic device according to an embodiment of this application.

FIG. 21 is a schematic diagram of a hardware structure of an electronic device (namely, an execution device 120) according to an embodiment of this application. The execution device 110 shown in FIG. 21 (the execution device 110 may be specifically a computer device) includes a memory 2101, a processor 2102, a communications interface 2103, and a bus 2104. The memory 2101, the processor 2102, and the communications interface 2103 implement mutual communication connection using the bus 2104.

The memory 2101 may be a ROM, a static storage device, a dynamic storage device, or a RAM. The memory 2101 may store a program. When the program stored in the memory 2101 is executed by the processor 2102, the processor 2102 and the communications interface 2103 are configured to perform the steps of the target detection method in the embodiments of this application.

The processor 2102 may be a general-purpose central processing unit, a microprocessor, an application-specific integrated circuit, a graphics processing unit, or one or more integrated circuits and is configured to execute a related program to implement functions that need to be executed by the electronic device in the embodiments of this application, or perform the target detection method in the method embodiments of this application.

The processor 2102 may be further an integrated circuit chip and has a signal processing capability. In an implementation process, the steps of the convolutional neural network-based image processing method in this application may be completed using an integrated logic circuit of hardware in the processor 2102 or an instruction in a form of software. The processor 2102 may be further a general-purpose processor, a digital signal processor, an application-specific integrated circuit, a field programmable gate array, another programmable logic device, a discrete gate, or a transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished using a hardware decoding processor, or may be executed and accomplished using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 2101. The processor 2102 reads information from the memory 2101, and completes, in combination with hardware thereof, functions that need to be executed by units included in the electronic device in the embodiments of this application, or performs the target detection method in the method embodiments of this application.

The communications interface 2103 uses, by way of example without limitation, a transceiver apparatus such as a transceiver to implement communication between the execution device 110 and another device or communications network. For example, training data (for example, the input image in the embodiments of this application) may be obtained through the communications interface 2103.

The bus 2104 may include a path for transferring information between components (for example, the memory 2101, the processor 2102, and the communications interface 2103) of the execution device 110.

It should be noted that although only the memory, the processor, and the communications interface are shown on the training device 120 and the execution device 110 shown in FIG. 20 and FIG. 21, in a specific implementation process, a person skilled in the art should understand that the training device 120 and the execution device 110 further include another component necessary for normal running. In addition, a person skilled in the art should understand that, based on a specific requirement, the training device 120 and the execution device 110 may further include a hardware component for implementing another additional function. In addition, a person skilled in the art should understand that the training device 120 and the execution device 110 may include only components necessary for implementing this embodiment of this application, and do not need to include all the components shown in FIG. 20 or FIG. 21.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A target detection method, comprising:
    performing corner point feature extraction processing on an input image to obtain a pair of target corner points, wherein the pair comprises a first corner point and a second corner point, wherein both the first corner point and the second corner point correspond to a target category, wherein the first corner point is a top-left corner point in the input image while the second corner point is a bottom-right corner point in the input image or the first corner point is a top-right corner point in the input image while the second corner point is a bottom-left corner point in the input image;
    generating a target frame based on the pair, wherein the target frame is a rectangular frame, and wherein the first corner point and the second corner point correspond to two vertices on a diagonal line of the target frame;
    performing key point feature extraction processing on the input image to obtain a target feature point of the target frame; and
    outputting a target detection result of a target object when a calibration area in the target frame comprises the target feature point,
    wherein the input image comprises the target object,
    wherein a category of the target object is the target category,
    wherein the target feature point corresponds to the target category, and
    wherein the target detection result comprises position information of the target frame, the target category, or a confidence level of the target frame.

2. The target detection method according to claim 1, wherein after generating the target frame based on the pair, the method further comprises removing the target frame when the calibration area does not comprise the target feature point.

3. The target detection method according to claim 1, wherein before determining that the calibration area in the target frame comprises the target feature point, the method further comprises:
    performing the key point feature extraction processing on the input image to obtain positions and categories of key feature points in the input image, wherein the key feature points comprise the target feature point;

obtaining at least one key feature point corresponding to the target category from the key feature points;

determining whether a first key feature point located in the calibration area exists in the at least one key feature point; and determining that the calibration area comprises the target feature point when the first key feature point exists in the at least one key feature point.

4. The target detection method according to claim 3, further comprising:

performing the key point feature extraction processing on the input image to obtain a key point heatmap, wherein a size of the key point heatmap is different from a size of the input image; and mapping coordinates corresponding to the key feature points in the key point heatmap to the input image to obtain the positions and the categories.

5. The target detection method according to claim 4, further comprising:

performing key point feature extraction on the input image to obtain a key point feature map, wherein the key point feature map represents the key feature points; and performing convolution processing on the key point feature map to obtain the key point heatmap.

6. The target detection method according to claim 5, wherein performing the key point feature extraction on the input image to obtain the key point feature map comprises:

performing convolution processing on the input image to obtain an initial feature map; and performing center pooling processing on the initial feature map to obtain the key point feature map by:

performing left pooling and right pooling on the initial feature map to obtain a first key point feature map;

performing top pooling and bottom pooling on the initial feature map to obtain a second key point feature map; and combining the first key point feature map and the second key point feature map to obtain the key point feature map.

7. The target detection method according to claim 6, further comprising:

performing convolution processing on the initial feature map to obtain a first feature map; and sequentially performing the left pooling and the right pooling on the first feature map to obtain the first key point feature map or sequentially performing the right pooling and the left pooling on the first feature map to obtain the first key point feature map.

8. The target detection method according to claim 7, further comprising:

performing the convolution processing on the input image to obtain the initial feature map;

performing cascade corner pooling processing on the initial feature map to obtain a first corner point feature map and a second corner point feature map, wherein the first corner point feature map represents each top-left corner point or each top-right corner point of the input image, wherein the second corner point feature map represents each bottom-right corner point or each bottom-left corner point of the input image, and wherein performing the cascade corner pooling processing comprises:

performing first convolution processing on the initial feature map to obtain a second feature map;

performing left pooling and top pooling on the second feature map to obtain the first corner point feature map;

performing second convolution processing on the initial feature map to obtain a third feature map; and performing right pooling and bottom pooling on the third feature map to obtain the second corner point feature map;

performing convolution processing on the first corner point feature to obtain a first corner heatmap, wherein the first corner heatmap represents a position and a category of each top-left corner point or each bottom-right corner point;

separately performing convolution processing on the second corner point feature map to obtain a second corner heatmap, wherein the second corner heatmap represents a position and a category of each bottom-right corner point or each top-left corner point; and obtaining corner points corresponding to a same category in the first corner heatmap and the second corner heatmap, to obtain the pair of.

9. The target detection method according to claim 8, further comprising:

performing third convolution processing on the initial feature map to obtain a fourth feature map;

performing the left pooling on the second feature map to obtain a fifth feature map;

combining the fifth feature map and the fourth feature map to obtain a sixth feature map; and performing top pooling on the sixth feature map to obtain the first corner point feature map.

10. The target detection method according to claim 9, wherein before performing top pooling on the sixth feature map to obtain the first corner point feature map, the method further comprises performing convolution processing and batch normalization on the sixth feature map to obtain a processed sixth feature map, and wherein the target detection method further comprises performing top pooling on the processed sixth feature map to obtain the first corner point feature map.

11. The target detection method according to claim 1, wherein after generating the target frame based on the pair, the method further comprises:

using a first area in the target frame as the calibration area when a size of the target frame exceeds a target threshold; and using a second area in the target frame as the calibration area when the size of the target frame does not exceed the target threshold, wherein a ratio of the second area to an area of the target frame is greater than a ratio of the first area to the area of the target frame.

12. The target detection method according to claim 11, wherein both a central point of the first area and a central point of the second area coincide with a central point of the target frame, and wherein both the first area and the second area are rectangular areas.

13. A target detection method, comprising:

collecting an image of an ambient environment using a camera to obtain a target image;

performing corner point feature extraction processing on the target image to obtain a pair of target corner points, wherein the pair comprises a first corner point and a second corner point, wherein both the first corner point and the second corner point correspond to a target category, wherein the first corner point is a top-left corner point in the target image while the second corner point is a bottom-right corner point in the target image or the first corner point is a top-right corner point in the target image while the second corner point is a bottom-left corner point in the target image;

generating a target frame based on the pair, wherein the target frame is a rectangular frame, and wherein the first corner point and the second corner point correspond to two vertices on a diagonal line of the target frame;

performing key point feature extraction processing on the target image to obtain a target feature of the target frame; and obtaining a category of a target object in the target frame and a position of the target object in the target image when a calibration area in the target frame comprises a target feature point, wherein the target feature point corresponds to the target category, and wherein the target object belongs to the target category.

14. The target detection method according to claim 13, wherein after generating the target frame based on the pair, the method further comprises removing the target frame when the calibration area does not comprise the target feature point.

15. The target detection method according to claim 13, wherein before determining that the calibration area in the target frame comprises the target feature point, the method further comprises:

performing the key point feature extraction processing on the target image to obtain positions and categories of key feature points in the target image, wherein the key feature points comprise the target feature point;

obtaining at least one key feature point corresponding to the target category from the key feature points;

determining whether a first key feature point located in the calibration area exists in the at least one key feature point; and determining that the calibration area comprises the target feature point when the first key feature point located in the calibration area exists in the at least one key feature point.

16. The target detection method according to claim 13, further comprising:

obtaining a target point cloud corresponding to the target frame in original point clouds collected using a laser radar when the target category is an obstacle, wherein each point in the original point clouds corresponds to one pixel in the target image, and wherein all pixels in the target image that correspond to all points in the target point cloud are located in the target frame; and determining a position of the target object based on the target point cloud.

17. A training method, comprising:

inputting a training sample into a convolutional neural network for processing to obtain a target processing result, wherein the target processing result comprises a first corner heatmap, a second corner heatmap, an embedding vector map, a first offset matrix, a second offset matrix, a reference key point heatmap, and a third offset matrix, wherein the first corner heatmap represents a position and a category of each top-left corner point in the training sample, wherein the second corner heatmap represents a position and a category of each bottom-right corner point in the training sample, wherein the embedding vector map represents a matching status between each top-left corner point and each bottom-right corner point, wherein the first offset matrix represents an offset value lost when the training sample is mapped to the first corner heatmap, wherein the second offset matrix represents an offset value lost when the training sample is mapped to the second corner heatmap, wherein the reference key point heatmap represents a position and a category of each key point in the training sample, and wherein the third offset matrix represents an offset value lost when the training sample is mapped to the reference key point heatmap;

determining a loss corresponding to the training sample based on the target processing result and a standard result, wherein the standard result is a processing result expected to be obtained in response to processing the training sample using the convolutional neural network; and updating a parameter of the convolutional neural network through an optimization algorithm using the loss corresponding to the training sample.

18. The training method according to claim 17, wherein the standard result comprises a first standard corner heatmap, a second standard corner heatmap, a first standard offset matrix, a second standard offset matrix, a standard key point heatmap, and a third standard offset matrix, wherein the first standard corner heatmap represents a real position and category of each top-left corner point, wherein the second standard corner heatmap represents a real position and category of each bottom-right corner point, wherein the first standard offset matrix represents a real offset value lost when the training sample is mapped to the first corner heatmap, wherein the second standard offset matrix represents a real offset value lost when the training sample is mapped to the second corner heatmap, wherein the standard key point heatmap represents a real position and category of each key point, and wherein the third standard offset matrix represents a real offset value lost when the training sample is mapped to the standard key point heatmap, and wherein the training method further comprises:

calculating a first loss representing a difference between the first corner heatmap and the first standard corner heatmap;

calculating a second loss representing a difference between the second corner heatmap and the second standard corner heatmap;

calculating a third loss based on the embedding vector map and a score loss function, wherein the score loss function is configured to reduce a distance between vectors of a pair of corner points belonging to a same category to be as small as possible and increase a distance between vectors of corner points belonging to different categories to be as large as possible;

calculating a fourth loss representing a difference between the first offset matrix and the first standard offset matrix;

calculating a fifth loss representing a difference between the second offset matrix and the second standard offset matrix;

calculating a sixth loss representing a difference between the third offset matrix and the third standard offset matrix;

calculating a seventh loss representing a difference between the reference key point heatmap and the standard key point heatmap; and using a weighted sum of the first loss, the second loss, the third loss, the fourth loss, the fifth loss, the sixth loss, and the seventh loss as the loss corresponding to the training sample.

19. An electronic device, comprising:
a processor; and
a memory coupled to the processor and configured to store program code, wherein the processor is configured to execute the program code, which causes the processor to be configured to:
perform corner point feature extraction processing on an input image to obtain a pair of target corner points, wherein the pair comprise a first corner point and a second corner point, wherein both the first corner point and the second corner point correspond to a target category, wherein the first corner point is a top-left corner point in the input image while the second corner point is a bottom-right corner point in the input image or the first corner point is a top-right corner point in the input image while the second corner point is a bottom-left corner point in the input image;
generate a target frame based on the pair, wherein the target frame is a rectangular frame, and wherein the first corner point and the second corner point correspond to two vertices on a diagonal line of the target frame;
perform key point feature extraction processing on the input image to obtain a target feature point of the target frame; and
output a target detection result of a target object when a calibration area in the target frame comprises the target feature point, wherein the input image comprises the target object, wherein a category of the target object is the target category, wherein the target feature point corresponds to the target category, and wherein the target detection result comprises at least one of position information of the target frame, the target category, and a confidence level of the target frame.

20. The electronic device according to claim 19, wherein the program code further causes the processor to be configured to remove the target frame when the calibration area does not comprise the target feature point after the target frame has been generated based on the pair.

21. The electronic device according to claim 19, wherein the program code further causes the processor to be configured to:
perform the key point feature extraction processing on the input image to obtain positions and categories of key feature points in the input image before it is determined that the calibration area in the target frame comprises the target feature point, wherein the key feature points in the input image comprise the target feature point;
obtain at least one key feature point corresponding to the target category from the key feature points;
determine whether a first key feature point located in the calibration area exists in the at least one key feature point; and
determine that the calibration area comprises the target feature point when the first key feature point exists in the at least one key feature point.

22. The electronic device according to claim 21, wherein the program code further causes the processor to be configured to:
perform the key point feature extraction processing on the input image to obtain a key point heatmap, wherein a size of the key point heatmap is different from a size of the input image; and
map coordinates corresponding to the key feature points in the key point heatmap to the input image to obtain the positions and the categories.

23. The electronic device according to claim 22, wherein the program code further causes the processor to be configured to:
perform key point feature extraction on the input image to obtain a key point feature map, wherein the key point feature map represents the key point features; and
perform convolution processing on the key point feature map to obtain the key point heatmap.

24. The electronic device according to claim 23, wherein the program code further causes the processor to be configured to:
perform convolution processing on the input image to obtain an initial feature map; and
perform center pooling processing on the initial feature map to obtain the key point feature map by:
performing left pooling and right pooling on the initial feature map to obtain a first key point feature map;
performing top pooling and bottom pooling on the initial feature map to obtain a second key point feature map; and
combining the first key point feature map and the second key point feature map to obtain the key point feature map.

25. The electronic device according to claim 24, wherein the program code further causes the processor to be configured to:
perform convolution processing on the initial feature map to obtain a first feature map; and
sequentially perform the left pooling and the right pooling on the first feature map to obtain the first key point feature map or sequentially perform the right pooling and the left pooling on the first feature map to obtain the first key point feature map.

26. The electronic device according to claim 25, wherein the program code further causes the processor to be configured to:
perform the convolution processing on the input image to obtain the initial feature map;
perform cascade corner pooling processing on the initial feature map to obtain a first corner point feature map and a second corner point feature map, wherein the first corner point feature map represents each top-left corner point or each top-right corner point of the input image, wherein the second corner point feature map represents each bottom-right corner point or each bottom-left corner point of the input image, and where the program code to perform the cascade corner pooling processing is further configured to cause the processor to be configured to:
perform first convolution processing on the initial feature map to obtain a second feature map;
perform left pooling and top pooling on the second feature map to obtain the first corner point feature map;
perform second convolution processing on the initial feature map to obtain a third feature map; and
perform right pooling and bottom pooling on the third feature map to obtain the second corner point feature map;
perform convolution processing on the first corner point feature to obtain a first corner heatmap, wherein the first corner heatmap represents a position and a category of each top-left corner point or each bottom-right corner point;

separately perform convolution processing on the second corner point feature map to obtain a second corner heatmap, wherein the second corner heatmap represents a position and a category of each bottom-right corner point or each bottom-left corner point; and obtain corner points corresponding to a same category in the first corner heatmap and the second corner heatmap, to obtain the pair.

27. The electronic device according to claim 26, wherein the program code to perform the cascade corner pooling processing further causes the processor to be configured to perform third convolution processing on the initial feature map to obtain a fourth feature map, and wherein the program code further causes the processor to be configured to:

perform the left pooling on the second feature map to obtain a fifth feature map;

combine the fifth feature map and the fourth feature map to obtain a sixth feature map; and perform top pooling on the sixth feature map to obtain the first corner point feature map.

28. The electronic device according to claim 27, wherein the program code further causes the processor to be configured to:

perform convolution processing and batch normalization on the sixth feature map to obtain a processed sixth feature map before performing the top pooling on the sixth feature map to obtain the first corner point feature map; and perform top pooling on the processed sixth feature map to obtain the first corner point feature map.

29. The electronic device according to claim 19, wherein, after generating the target frame based on the pair, the program code further causes the processor to be configured to:

use a first area in the target frame as the calibration area when a size of the target frame exceeds a target threshold; and use a second area in the target frame as the calibration area when the size of the target frame does not exceed the target threshold, wherein a ratio of the second area to an area of the target frame is greater than a ratio of the first area to the area of the target frame.

30. The electronic device according to claim 29, wherein both a central point of the first area and a central point of the second area coincide with a central point of the target frame, and wherein both the first area and the second area are rectangular areas.

31. A self-driving apparatus, comprising:

a camera configured to collect an image of an ambient environment to obtain a target image;

a processor coupled to the camera, and a memory coupled to the processor and configured to store program code and the target image, wherein the processor is configured to execute the program code, which causes the processor to be configured to:

perform corner point feature extraction processing on the target image to obtain a pair of target corner points, wherein the pair comprises a first corner point and a second corner point, wherein both the first corner point and the second corner point correspond to a target category, wherein the first corner point is a top-left corner point in the target image while the second corner point is a bottom-right corner point in the target image or the first corner point is a top-right corner point in the target image while the second corner point is a bottom-left corner point in the target image;

generate a target frame based on the pair, wherein the target frame is a rectangular frame, and wherein the first corner point and the second corner point correspond to two vertices on a diagonal line of the target frame;

perform key point feature extraction processing on the target image to obtain a target feature of the target frame; and obtain a category of a target object in the target frame and a position of the target object in the target image when a calibration area in the target frame comprises a target feature point, wherein the target feature point corresponds to the target category, and wherein the target object belongs to the target category.

32. The self-driving apparatus according to claim 31, wherein the program code further causes the processor to be configured to remove the target frame when the calibration area does not comprise the target feature point after generating the target frame based on the pair.

33. The self-driving apparatus according to claim 32, wherein, before it is determined that the calibration area in the target frame comprises the target feature point, the program code further causes the processor to be configured to:

perform the key point feature extraction processing on the target image to obtain positions and categories of key feature points in the target image, wherein the key feature points comprise the target feature point; and obtain at least one key feature point corresponding to the target category from the key feature points;

determine whether a first key feature point located in the calibration area exists in the at least one key feature point; and determine that the calibration area comprises the target feature point when the first key feature point located in the calibration area exists in the at least one key feature point.

34. The self-driving apparatus according to claim 31, wherein the self-driving apparatus further comprises a laser radar configured to collect point cloud data to obtain original point clouds, wherein the processor is further configured to:

obtain a target point cloud corresponding to the target frame in the original point clouds collected using the laser radar when the target category is an obstacle, wherein each point in the original point clouds corresponds to one pixel in the target image, and wherein all pixels in the target image that correspond to all points in the target point cloud are located in the target frame; and determine a position of the target object based on the target point cloud.

35. A computer device, comprising:

a processor; and a memory coupled to the processor and configured to store program code, wherein the processor is configured to execute the program code, which causes the processor to be configured to:

input a training sample into a convolutional neural network for processing, to obtain a target processing result, wherein the target processing result comprises a first corner heatmap, a second corner heatmap, an embedding vector map, a first offset matrix, a second offset matrix, a reference key point heatmap, and a third offset matrix, wherein the first corner heatmap represents a position and a category of each top-left corner point in the training sample, wherein the second corner heatmap represents a position and a category of each bottom-right corner point in the training sample, wherein the embedding vector map represents a matching status between each top-left corner point and each bottom-right corner point, wherein the first offset matrix represents an offset value lost when the training sample is mapped to the first corner heatmap, wherein the second offset matrix represents an offset value lost when the training sample is mapped to the second corner heatmap, wherein the reference key point heatmap represents a position and a category of each key point in the training sample, and wherein the third offset matrix represents an offset value lost when the training sample is mapped to the reference key point heatmap;

determine a loss corresponding to the training sample based on the target processing result and a standard result, wherein the standard result is a processing result expected to be obtained in response to processing the training sample using the convolutional neural network; and update a parameter of the convolutional neural network through an optimization algorithm using the loss corresponding to the training sample.

36. The computer device according to claim 35, wherein the standard result comprises a first standard corner heatmap, a second standard corner heatmap, a first standard offset matrix, a second standard offset matrix, a standard key point heatmap, and a third standard offset matrix, wherein the first standard corner heatmap represents a real position and category of each top-left corner point, wherein the second standard corner heatmap represents a real position and category of each bottom-right corner point, wherein the first standard offset matrix represents a real offset value lost when the training sample is mapped to the first corner heatmap, wherein the second standard offset matrix represents a real offset value lost when the training sample is mapped to the second corner heatmap, wherein the standard key point heatmap represents a real position and category of each key point, and wherein the third standard offset matrix represents a real offset value lost when the training sample is mapped to the standard key point heatmap, wherein the program code further causes the processor to be configured to:

calculate a first loss representing a difference between the first corner heatmap and the first standard corner heatmap;

calculate a second loss representing a difference between the second corner heatmap and the second standard corner heatmap;

calculate a third loss based on the embedding vector map and a score loss function, wherein the score loss function is configured to reduce a distance between vectors of a pair of corner points belonging to a same category to be as small as possible and increase a distance between vectors of corner points belonging to different categories to be as large as possible;

calculate a fourth loss representing a difference between the first offset matrix and the first standard offset matrix;

calculate a fifth loss representing a difference between the second offset matrix and the second standard offset matrix;

calculate a sixth loss representing a difference between the third offset matrix and the third standard offset matrix;

calculate a seventh loss representing a difference between the reference key point heatmap and the standard key point heatmap; and use a weighted sum of the first loss, the second loss, the third loss, the fourth loss, the fifth loss, the sixth loss, and the seventh loss as the loss corresponding to the training sample.

37. A computer program product comprising computer-executable instructions stored on a non-transitory computer-readable medium that, when executed by a processor, cause an apparatus to:

perform corner point feature extraction processing on an input image to obtain a pair of target corner points, wherein the pair comprises a first corner point and a second corner point, wherein both the first corner point and the second corner point correspond to a target category, wherein the first corner point is a top-left corner point in the input image while the second corner point is a bottom-right corner point in the input image or the first corner point is a top-right corner point in the input image while the second corner point is a bottom-left corner point in the input image;

generate a target frame based on the pair, wherein the target frame is a rectangular frame, and wherein the first corner point and the second corner point correspond to two vertices on a diagonal line of the target frame;

perform key point feature extraction processing on the input image to obtain a target feature point of the target frame; and output a target detection result of a target object when a calibration area in the target frame comprises the target feature point, wherein the input image comprises the target object, wherein a category of the target object is the target category, wherein the target feature point corresponds to the target category, and wherein the target detection result comprises position information of the target frame, the target category, or a confidence level of the target frame.

38. A chip, comprising:
a processor; and
a data interface coupled to the processor, wherein the processor is configured to execute instructions using the data interface, which cause the processor to be configured to:

perform corner point feature extraction processing on an input image to obtain a pair of target corner points, wherein the pair comprises a first corner point and a second corner point, wherein both the first corner point and the second corner point correspond to a target category, wherein the first corner point is a top-left corner point in the input image while the second corner point is a bottom-right corner point in the input image or the first corner point is a top-right corner point in the input image while the second corner point is a bottom-left corner point in the input image;

generate a target frame based on the pair, wherein the target frame is a rectangular frame, and wherein the first corner point and the second corner point correspond to two vertices on a diagonal line of the target frame;

perform key point feature extraction processing on the input image to obtain a target feature point of the target frame; and output a target detection result of a target object when a calibration area in the target frame comprises the target feature point, wherein the input image comprises the target object, wherein a category of the target object is the target category, wherein the target feature point corresponds to the target category, and wherein the target detection result comprises position information of the target frame, the target category, or a confidence level of the target frame.

* * * * *

UNITED STATES PATENT AND TRADEMARK OFFICE
CERTIFICATE OF CORRECTION

PATENT NO. : 11,132,780 B2  Page 1 of 1
APPLICATION NO. : 16/791806
DATED : September 28, 2021
INVENTOR(S) : Lingxi Xie, Kaiwen Duan and Qi Tian It is certified that error appears in the above-identified patent and that said Letters Patent is hereby corrected as shown below:

In the Claims

Claim 20, Column 57, Line 41: "to remove the" should read "to: remove the"

Claim 31, Column 59, Line 51: "the camera, and" should read "the camera; and"

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*